United States Patent
Asakawa

(10) Patent No.: US 7,313,674 B2
(45) Date of Patent: Dec. 25, 2007

(54) INSTRUCTION CONTROL DEVICE AND METHOD THEREFOR

(75) Inventor: Takeo Asakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 10/747,291

(22) Filed: Dec. 30, 2003

(65) Prior Publication Data

US 2004/0153629 A1    Aug. 5, 2004

Related U.S. Application Data

(62) Division of application No. 09/461,429, filed on Dec. 16, 1999, now Pat. No. 6,807,624.

(30) Foreign Application Priority Data

| Dec. 17, 1998 | (JP) | 10-358926 |
| Dec. 17, 1998 | (JP) | 10-358982 |
| Dec. 17, 1998 | (JP) | 10-358985 |
| Dec. 17, 1998 | (JP) | 10-358995 |
| Dec. 17, 1998 | (JP) | 10-359707 |
| Dec. 17, 1998 | (JP) | 10-359708 |

(51) Int. Cl.
*G06F 9/38* (2006.01)

(52) U.S. Cl. ........... 712/216; 712/217

(58) Field of Classification Search ......... 712/216, 712/217

See application file for complete search history.

(56) References Cited

U.S. PATENT DOCUMENTS 4,992,938 A   2/1991 Cocke et al.
5,564,029 A   10/1996 Ueda et al.
5,600,848 A   2/1997 Sproull et al.

(Continued)

FOREIGN PATENT DOCUMENTS

EP   0 518 420   12/1992

(Continued)

OTHER PUBLICATIONS

Mike Johnson, Superscalar Microprocessor Design, 1991, Prentice-Hall, pp. 46-47).*

(Continued)

*Primary Examiner*—William M. Treat
(74) *Attorney, Agent, or Firm*—Staas & Halsey LLP

(57) ABSTRACT

The present invention relates to an instruction control device, and more particularly to an instruction control device which has achieved a high speed operational processing, such as a reduction in the amount of components, so as to enable an out-of-order instruction execution to thereby execute an instruction processing at high speed in an information processor. An instruction control device having instruction storing means for temporarily storing a plurality of decoded instructions yet unissued to an execution unit; wherein the storing means is constituted such that an arranged order of entries of the storing means indicates a decoded order of decoded instructions stored in the entries; wherein that entry, from which the decoded instruction stored therein has been issued, is deleted; wherein information stored in the entries is shifted among the entries such that the entries storing the unissued instructions constitute entries in a continuous order; and wherein a shifting amount between entries is, at the most, equal to the number of instructions which can be simultaneously decoded.

5 Claims, 54 Drawing Sheets

U.S. PATENT DOCUMENTS

| | | | |
|---|---|---|---|
| 5,625,789 A * | 4/1997 | Hesson et al. | 712/217 |
| 5,634,026 A | 5/1997 | Heaslip et al. | |
| 5,682,521 A | 10/1997 | Kubosawa | |
| 5,708,788 A | 1/1998 | Katsuno et al. | |
| 5,841,999 A | 11/1998 | Le et al. | |
| 5,987,587 A | 11/1999 | Meltzer | |
| 6,016,541 A | 1/2000 | Tashima et al. | |
| 6,112,019 A | 8/2000 | Chamdani et al. | |
| 6,253,287 B1 | 6/2001 | Green | |
| 6,304,955 B1 * | 10/2001 | Arora | 712/217 |

FOREIGN PATENT DOCUMENTS

| | | |
|---|---|---|
| JP | 58-161043 | 9/1983 |
| JP | 60-118932 | 6/1985 |
| JP | 60173634 | 9/1985 |
| JP | 64-17126 | 1/1989 |
| JP | 64-35630 | 2/1989 |
| JP | 01169573 | 7/1989 |
| JP | 2-48733 | 2/1990 |
| JP | 02151930 | 6/1990 |
| JP | 04286028 | 10/1992 |
| JP | 4353928 | 12/1992 |
| JP | 5-342084 | 12/1993 |
| JP | 6067879 | 3/1994 |
| JP | 6-110688 | 4/1994 |
| JP | 7-93152 | 4/1995 |
| JP | 7-271579 | 10/1995 |
| JP | 8-263289 | 10/1996 |
| JP | 09274567 | 10/1997 |
| JP | 10021072 | 1/1998 |
| JP | 10-40103 | 2/1998 |
| JP | 10275078 | 10/1998 |
| JP | 11-110214 | 4/1999 |

OTHER PUBLICATIONS

English translation of Japanese Office Action for JP-10-358985, Notice of Reasons for Rejection dated Feb. 3, 2004.

U.S. Appl. No. 10/747,286, filed Dec. 30, 2003, Takeo Asakawa.

U.S. Appl. No. 10/747,138, filed Dec. 30, 2003, Takeo Asakawa.

* cited by examiner

Fig.4
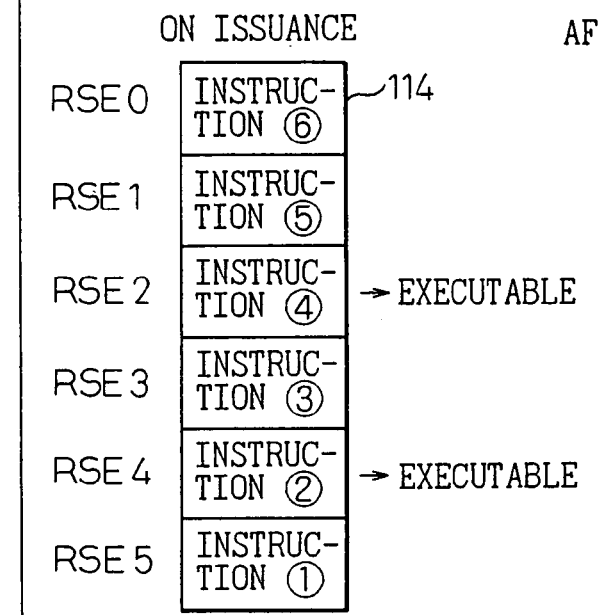
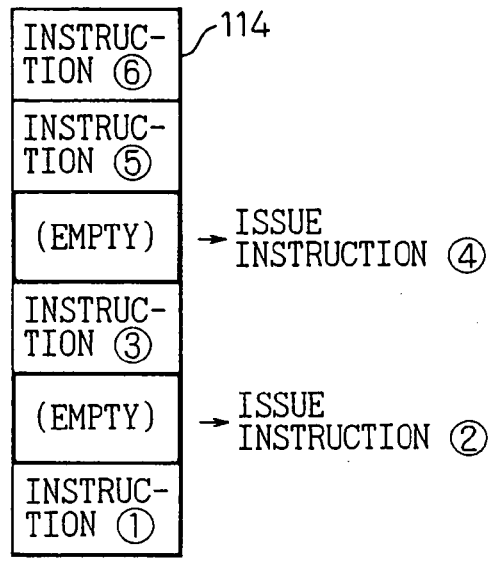
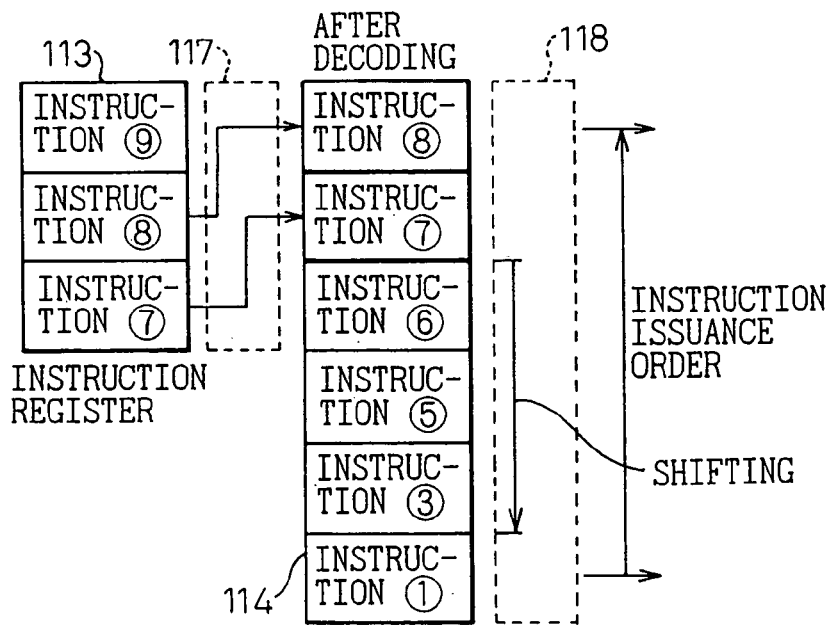

| RSE3-R. | RSE4-R. | RSE5-R. | EX1 | EX2 |
|---|---|---|---|---|
| — | — | 1 | RSE5 | — |
| — | 1 | 0 | RSE4 | — |
| 1 | 0 | 0 | RSE3 | — |
| — | 1 | 1 | RSE5 | RSE4 |
| 1 | 1 | 0 | RSE4 | RSE3 |
| 1 | 0 | 1 | RSE5 | RSE3 |

| IWR0-V | IWR1-V | IWR2-V | RSE-LE | IWR0-REL | IWR1-REL | IWR2-REL |
|---|---|---|---|---|---|---|
| 1 | — | — | 5 | 1 | 0 | 0 |
| 0 | 1 | — | 5 | 0 | 1 | 0 |
| 0 | 0 | 1 | 5 | 0 | 0 | 1 |
| 1 | 1 | — | 4 | 1 | 1 | 0 |
| 1 | 0 | 1 | 4 | 1 | 0 | 1 |
| 0 | 1 | 1 | 4 | 0 | 1 | 1 |
| 1 | 1 | 1 | 3 | 1 | 1 | 1 |

Fig.14

| IWR0-REL | IWR1-REL | IWR2-REL | IWR0-V | RSE-EQ/LE | RSE0 | RSE1 | RSE2 |
|---|---|---|---|---|---|---|---|
| 1 | — | — | — | 5 | — | — | — |
| 1 | — | — | — | 4 | 1 | — | — |
| 1 | — | — | — | 3 | — | — | [1] |
| — | 1 | — | 0 | 4 | — | 1 | — |
| — | 1 | — | — | 3 | — | [1] | — |
| — | 1 | — | 1 | 5 | 1 | — | — |
| — | 1 | — | — | 4 | 1 | — | — |
| — | — | 1 | — | — | [1] | — | — |

| RSE0 | RSE1 | RSE2 | RSE3 | RSE4 | RSE5 | SET |
|---|---|---|---|---|---|---|
| — | — | 1 | 0 | 0 | 0 |  |
| — | — | — | 1 | 0 | 0 | RSE5 |
| — | — | — | — | 1 | 0 |  |
| — | — | — | — | — | 1 |  |

| | | | 222 | |
|---|---|---|---|---|
| RSA0 | BA | XA | ST | V |
| RSA1 | | | | |
| RSA2 | | | | |
| | | | | |

Fig.26

| RSA0_READY | RSA1_READY | RSA2_READY | RSA0_ST | RSA1_ST | RSA2_ST | RSA0_GO1 | RSA1_GO1 | RSA2_GO1 |
|---|---|---|---|---|---|---|---|---|
| 1 | | | 0 | | | 1 | | |
| 0 | 1 | | 0 | 0 | | | 1 | |
| 0 | 0 | 1 | 0 | 0 | 0 | | | 1 |

Fig.28

| RSA0_READY | RSA1_READY | RSA2_READY | RSA0_ST | RSA1_ST | RSA2_ST | RSA0_GO2 | RSA1_GO2 | RSA2_GO2 |
|---|---|---|---|---|---|---|---|---|
| 1 | 1 |   | 1 |   |   | 1 |   |   |
| 1 | 1 |   |   | 1 |   |   | 1 |   |
| 0 | 0 |   |   |   |   |   |   |   |
| 1 | 1 | 1 |   |   | 1 |   |   | 1 |
| 0 | 1 | 1 |   |   |   |   | 1 |   |
| 0 | 0 | 1 |   |   |   |   |   | 1 |

| IWR0_BA_R | IWR0_XA_R | IWR0_V | 0_RSA_GO | 1_RSA_GO | IWR0_GO1 | IWR0_GO2 | IWR0_RSA |
|---|---|---|---|---|---|---|---|
| 1 | 1 | 1 | 1 | 1 | 1 | | |
| 1 | 1 | 1 | 0 | 1 | | 1 | |
| 0 | 0 | 1 | | 0 | | | 1 |

Fig.37

| IWR0_V | IWR0_ST | IWR1_V | IWR1_BA_R | IWR1_XA_R | 0_RSA_GO | 1_RSA_GO | IWR1_GO1 | IWR1_GO2 | IWR1_RSA |
|---|---|---|---|---|---|---|---|---|---|
| 0 | 0 | 1 | 1 | 1 | 1 | 1 | 1 | | |
| 0 | 0 | 1 | 1 | 1 | 1 | 1 | | 1 | |
| 1 | 0 | 1 | 1 | 1 | 1 | 1 | | 1 | |
| | 1 | 1 | 1 | 1 | | | | | |
| | | 1 | 1 | 0 | | | | | 1 |
| | | 1 | 0 | | | | | | 1 |
| 0 | | 1 | | | 1 | | | | 1 |
| 1 | | 1 | | | | 0 | | | 1 |
| | | 1 | | | | | | | 1 |

Fig.59

| P1 | RA1 | UBA1 | P2 | RA2 | UBA2 | DUBA | ENTRY 1 |
|---|---|---|---|---|---|---|---|
| | | | | | | | ENTRY 2 |
| | | | | | | | ENTRY 3 |

| | UBA | P |
|---|---|---|
| GR5 | 1 | 1 |

412

| | P1 | RA1 | UBA1 | P2 | RA2 | UBA2 | DUBA |
|---|---|---|---|---|---|---|---|
| A INSTRUCTION | 0 | 5 | — | 1 | — | 1 | 1 |
| | | | | | | | |

Fig.61

|  | UBA | P |
|---|---|---|
| GR5 | 2 | 1 |

411

412

|  | P1 | RA1 | UBA1 | P2 | RA2 | UBA2 | DUBA |
|---|---|---|---|---|---|---|---|
| A INSTRUCTION | 0 | 5 | – | 1 | – | 1 | 1 |
| A INSTRUCTION | 1 | 5 | 1 | 1 | – | 2 | 2 |
|  |  |  |  |  |  |  |  |

INSTRUCTION CONTROL DEVICE AND METHOD THEREFOR

This application is a Divisional Application of Ser. No. 09/461,429, filed Dec. 16, 1999 now U.S. Pat. No. 6,807,624.

BACKGROUND OF THE INVENTION

1. Field of the Invention

The present invention relates to an instruction control device and a method therefor and, more particularly, to an instruction control device and a method for enabling an out-of-order instruction execution so as to execute instruction processing at high speed in an information processor.

2. Description of the Related Art

"Out-of-order instruction execution processing" means processing wherein those executable instructions, the inputted data for which have been completely collected, are occasionally executed in an order or sequence different from that instructed by a program. It is noted that the executions of instructions are performed in an arbitrary order in themselves, but instructions are executed such that resources, such as memory areas and register contents accessible from the program, are referred to and updated in the order instructed by the program so as to guarantee the processing results.

In an information processor in which an out-of-order instruction execution is permitted so as to execute an instruction processing at high speed, decoded instructions are once stored into decoded instruction storing means called a reservation station after the respective instruction decoding cycles. Next, irrespectively of a decoding order of the stored instructions, the decoded instruction, a source operand of which has been enabled, is selected and then the reservation station issues the instruction to an operator (such as computer, calculator).

However, in such a conventional instruction control device, there have been problems, as follows:

(1) In the conventional device, it has been necessary to distribute an instruction decoded information from an instruction register and an instruction decoded completion signal from a controlling unit, toward all entries within the reservation station. As a result, there were problems in that the sizes of logical circuits and intra-chip wiring areas are increased. There has been therefore caused problems that action delays are prolonged and more cycles are required.

Further, in the conventional device, there have been provided instruction order identifiers for respective entries so as to determine an instruction decoding order, and these identifiers must be compared with one another by means of a hardware comparator. As a result, there were also problems in that the aforementioned sizes and number of cycles are increased.

(2) If there exists an address dependency between instructions which request memory accesses, it should be guaranteed that the memory is referred to in a programmed order. However, if an address calculation and a request are performed in an out-of-order manner, there has been conventionally caused such a situation that, particularly when data are fetched by a succeeding instruction (such as LOAD instruction) from a memory area which has been updated by a preceding instruction (such as STORE instruction), the address of the preceding instruction is obtained after the fetch request of the succeeding instruction has been completed. Thus, it has been required to once cancel the succeeding instruction, and to newly refetch the succeeding instruction and decode the same again for re-execution thereof, thereby causing a problem that the execution speed of the memory operation instruction is considerably lowered.

(3) In the conventional device, in case that a preceding instruction executes an instruction such as a floating-point multiplication having longer operation cycles, there has been performed such processing that the starting of calculations of succeeding instructions are collectively held or stopped, and thereby the calculation result of the preceding instruction having longer operation cycles is forwarded to the succeeding instructions at predetermined later timings, respectively. Inherently, instructions should be executed independently from one another when no register interferences exist in an information processing that allows an out-of-order instruction execution, except that there exists register interference between instructions. Further, in such information processing, such as multiplier and adder processes within a CPU, should be capable of being parallelly operated, respectively, since they are provided as hardware different from each other. However, there has been a problem in conventional pipeline processing that instruction issuances are equally delayed after a multiply instruction processing as described above. This considerably reduces an operation efficiency such as of a product sum operation in which multiplication and addition are frequently repeated, as in a scientific calculation.

(4) In order to efficiently perform an out-of-order instruction execution at high speed, there is used a register renaming technique which guarantees that the register contents are referred to and updated in the programmed order. The register renaming technique is adapted to rename a logical register to allocate the logical register to physical registers or memories different from each other, to thereby allow a parallel execution of processings from a plurality of instructions when such processings can be executed independently from each other, even if the same register is competely used by the plurality of instructions. This is very effective mechanism for operating simple instructions at high speed.

According to such a technique, there can be performed an inter-register-register instruction, by forwarding processing, at high speed. However, concerning an inter-register-memory instruction, so as to guarantee that memory contents are referred to and updated in the programmed order, fetch access to the memory is conventionally delayed until data are stored into a cache memory. This results in reduction in operation performance.

SUMMARY OF THE INVENTION

In view of the conventional problems as described above, it is therefore an object of the present invention to provide an instruction control device and a method therefor which restricts the number of entries within a reservation station for storing decoded instructions upon issuance of the decoded instructions from an instruction register toward the reservation station, to thereby reduce the amount of hardware and cycle times. Further, it is also an object of the present invention to provide an instruction control device and a method therefor which deletes/compresses those entries issued to an execution unit so as to keep an instruction decoded order within the reservation station, to thereby eliminate the necessity of hardware for performing comparison processing relating to instruction order identifiers.

To this end, according to the present invention, there is provided an instruction control device and a method therefor, having instruction storing means for temporarily storing a plurality of decoded instructions as yet unissued to an execution unit; wherein the storing means is constituted such that an arranged order of entries of the storing means indicates a decoded order of decoded instructions stored in the entries; wherein that entry, from which the decoded instruction stored therein has been issued, is deleted; wherein information stored in the entries is shifted among the entries such that the entries storing the unissued instructions constitute entries in a continuous order; and wherein a shifting amount between entries is at the most equal to the number of instructions which can be simultaneously decoded.

In view of the above problem (2), it is a further object of the present invention to provide an instruction control device and a method therefor which controls an address calculation start time point of an instruction issued by the reservation station by making use of simple decoding means, so as to prevent an address calculation request of a succeeding instruction from getting ahead of or surpassing that of a preceding instruction, to thereby allow a high speed calculation execution of a LOAD instruction succeeding to a STORE instruction.

To this end, according to the present invention, there is provided an instruction control device, and a method therefor, comprising: a reservation station having a flag indicating a STORE instruction; a table indicating a usability of a source operand of an instruction stored in the reservation station; and instruction issuance control means; wherein the instruction issuance control means performs an instruction issuance from the reservation station at the time when the table indicates that a source operand is useable; and wherein, when the instruction issuance control means has detected an issuance of a STORE instruction by the flag, the instruction issuance control means makes a fetch request of a succeeding instruction to wait until an address calculation and a request of the STORE instruction are completed.

In view of the above problem (3), it is another object of the present invention to provide an instruction control device, and a method therefor, which has commonly used input and output registers and which parallelly executes respective calculations at suitable timings, so as to reduce an operation delay, to thereby allow high-speed pipeline processing.

To this end, according to the present invention, there is provided an instruction control device, and a method therefor, comprising: a table indicative of usabilities of source operands, respectively; and groups of operators, each of the groups of operators commonly using an input register and an output register and operating at numbers of operation cycles different from one another; wherein instruction issuances, from a reservation station for storing a plurality of decoded instructions, are performed at the times that source operands are indicated to be useable, respectively; and wherein operations on the operators are parallelly performed, by validating the indications of useabilities of the source operands at different timings of the groups of operators.

In view of the above problem (4), it is a further object of the present invention to provide an instruction control device, and a method therefor, which includes means by which a fetch access of a succeeding instruction to a pertinent data can be immediately executed by virtue of forwarding processing without waiting until the pertinent data is stored into a cache memory by a preceding instruction even in an inter-register-memory instruction, to thereby remarkably improve an operation performance. It is yet another object of the present invention to provide an instruction control device and a method therefor which allows an immediate fetch access of a succeeding instruction to the pertinent data by virtue of the forwarding processing, even in an inter-memory-memory instruction.

To this end, according to the present invention, there is provided an instruction control device, and a method therefor, for an information processor including: a plurality of register update buffers for temporarily storing a result of an instruction execution and for updating a general purpose register at the time of completion of the instruction execution; an update buffer address table for indicating into which register update buffer the data for updating a designated general purpose register is stored; a register update pending table for indicating that an update of a designated general purpose register is pending; and a reservation station for storing a general purpose register address, a register update buffer address outputted from the update buffer address table corresponding to the general purpose register, and an update pending designation of the general purpose register; wherein the information processor adopts as a source data, a designated register update buffer when the update pending designation is ON, or a designated general purpose register when the update pending designation is OFF; the method comprising the steps of: storing a fetch data into a register update buffer and using the fetch data, if storing of a memory area is not performed in a preceding instruction, at the time of execution of an instruction which requires the fetch data from a memory, as a source data of an operation; copying an update pending designation for designating a storing register, a register update buffer address and a general purpose register buffer address, from a reservation station by which a preceding instruction is preserved, toward a fetch data designating information area of the reservation station by which an operational instruction is stored, when the storage into a memory area is performed in the preceding instruction and the store destination address is equal to a taking-out destination address of the fetch data; and the operational instruction using a storing register designated at a preceding STORE instruction, instead of a data fetched from a memory.

BRIEF DESCRIPTION OF THE DRAWINGS

The present invention will be more clearly understood from the description as set forth below with reference to the accompanying drawings.

FIG. 4 is a view showing an example of a processing action of a reservation station;

FIG. 14 is a view showing a logical table for FIG. 13;

FIG. 26 is a view showing a logical table for FIG. 25;

FIG. 28 is a view showing a logical table for FIG. 27;

FIG. 37 is a view showing a logical table for FIG. 36;

FIG. 59 is a view showing an example of an extended reservation station;

FIG. 60 is a view showing a data setting example at timing 1 of FIG. 58;

FIG. 61 is a view showing a data setting example at timing 2 of FIG. 58;

DESCRIPTION OF THE PREFERRED EMBODIMENTS

In the following embodiments of the present invention, there will be firstly and briefly described an invention related to the present invention, and then the present invention will be described, in order to clarify the present invention.

There will be firstly described a first embodiment of the present invention. This embodiment corresponds to the aforementioned problem (1).

Figure 1:
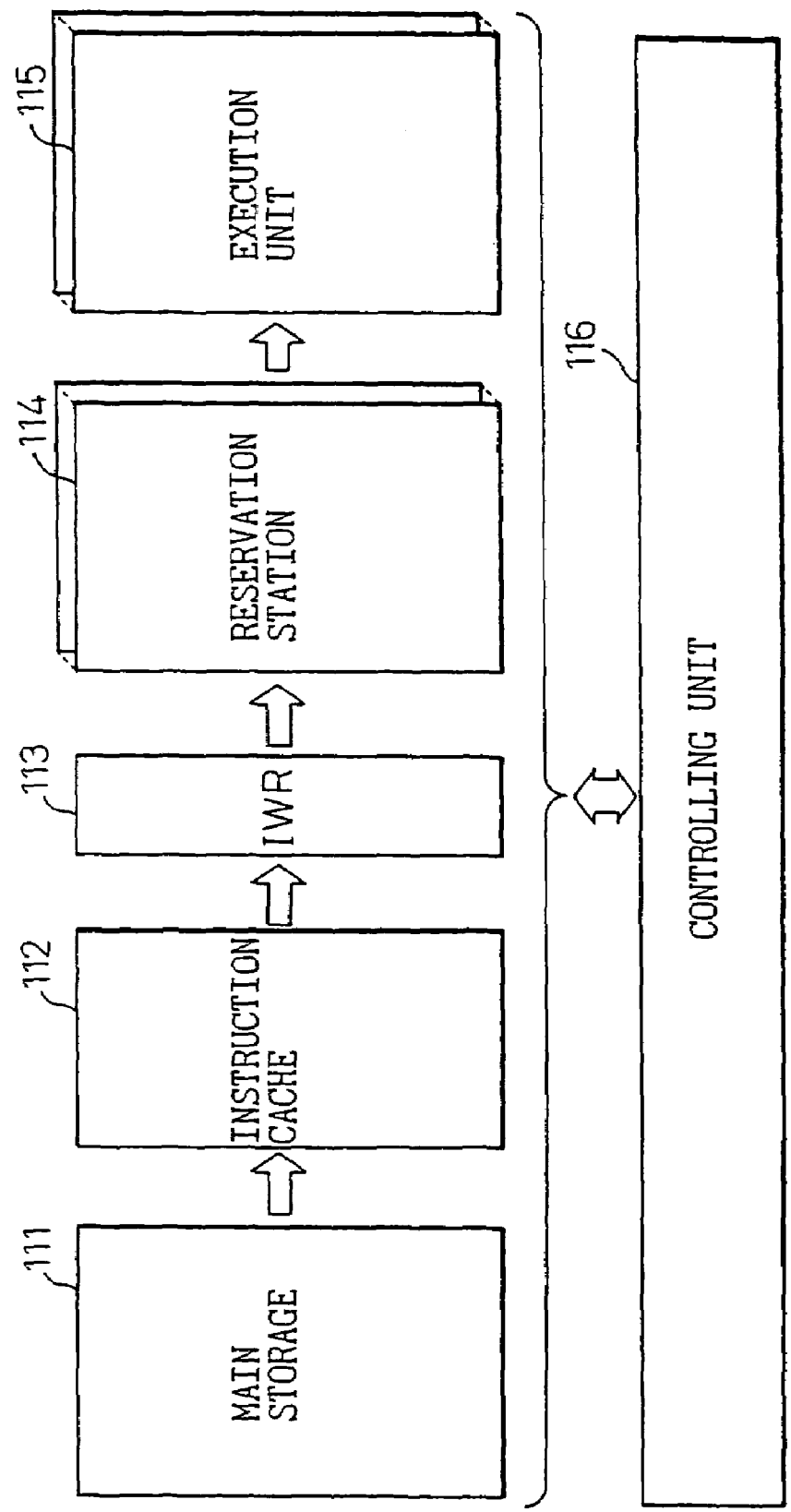
FIG. 1 a view showing an outline of an instruction processing constitution in an instruction processing device.

FIG. 1 is a view showing an outline of an instruction processing constitution in an instruction processing device.

In FIG. 1, there is transferred a program instruction stored in a main storage 111 comprising a mass storage memory such as DRAM, into a high-speed accessible instruction cache 112. Instruction register (IWR) 113 simultaneously fetches one or more instructions from the instruction cache 112, and these instructions are decoded by an instruction decoder within a controlling unit 116 and stored into a reservation station 114 for a while.

At the time when an execution unit 115, which executes a processing corresponding to a source operand and an operation code to be used by each instruction, has been enabled, the reservation station 114 issues those enabled instructions therein toward the execution unit 115 at the next step, irrespectively of the instruction decoded order of the instruction register 113. The execution unit 115 executes a high speed operation processing utilizing a pipeline, based on the issued instructions. The controlling unit 116 administrates and controls the actions of the above described functional blocks 111 through 115.

Further, in a processor of a superscalar type, there are provided reservation station 114 and execution unit 115 for each of processing functions such as integer operational processing and floating-point operation processing, and there are simultaneously and parallelly executed multiple instructions corresponding to each of them. In the controlling unit 116, there are performed processings (not shown) such as pre-decoding, instruction flow control, register renaming, and branch prediction, so as to perform the high speed execution of the out-of-order instruction execution processing.

Figure 2:
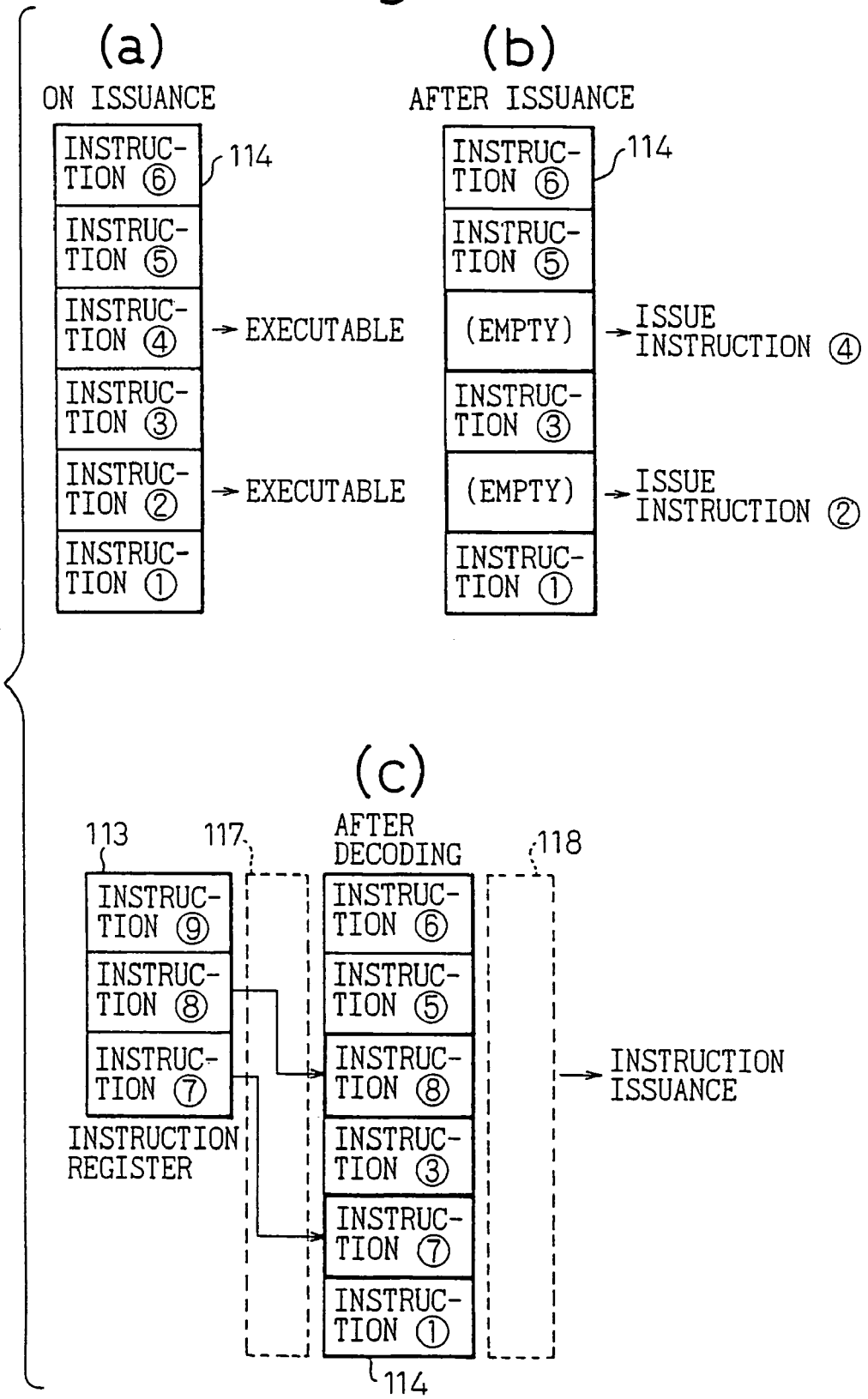
FIG. 2 is a view showing an example of a processing action in a conventional reservation station.

FIG. 2 shows an example of a processing action in a conventional reservation station.

In example (a), decoded instructions from the instruction (IWR) register 113 are stored in six entries of the reservation station 114. The numbers ① through ⑥ attached to the decoded instructions, respectively, indicate that those instructions have been decoded in the order of the number ① to the number ⑥. Thus, the instruction ① is the most formerly decoded one, and the instruction ⑥ is the most lately decoded one.

Further, the case (a) shows a situation where the instructions ② and ④ have been enabled, i.e., have been brought into an executable condition, in advance of other instructions. In this situation, as shown in (b), the instructions ② and ④ are immediately issued to the execution unit 115 and executed thereby, irrespectively of the decoded order ① to ⑥ of the instructions. As a result, those entries of the reservation station 114 which have stored the issued instructions ② and ④ (as shown in thick lines in the figure) will be emptied.

Thereafter, there are stored subsequent new decoded instructions ⑦ and ⑧ from the instruction (IWR) register 113, into the emptied entries. Note, the instruction (IWR) register 113 in this example is capable of simultaneously fetching three instructions from the instruction cache 112. The controlling unit 116 administrates accessible sources (such as memory area and registers), and provides that instruction to start the above described processing for which the input data have been completely collected.

In the conventional device, in this way, it has been required to distribute the instruction decoded information from the instruction register 113 and the instruction decoding completed signal by the controlling unit 116, toward all the entries within the reservation station 114. As such, there is a problem of increasing the sizes of logical circuits for distribution shown within a dotted frame 117 in (c) and intra-chip wiring areas. As a result, there has been caused such a problem that an action delay is prolonged and more cycles are required.

Further, as apparent from (b) and (c), the instruction decoded order is not guaranteed on the reservation station 114. As such, there have been conventionally provided instruction order identifiers (IID's) for the respective entries so as to determine the instruction decoded order, and these identifiers have been compared with one another by making use of a hardware comparator (dotted line frame 118 in (c)). As a result, there have been also problematically increased the aforementioned amounts as well as the cycle times.

Figure 3:
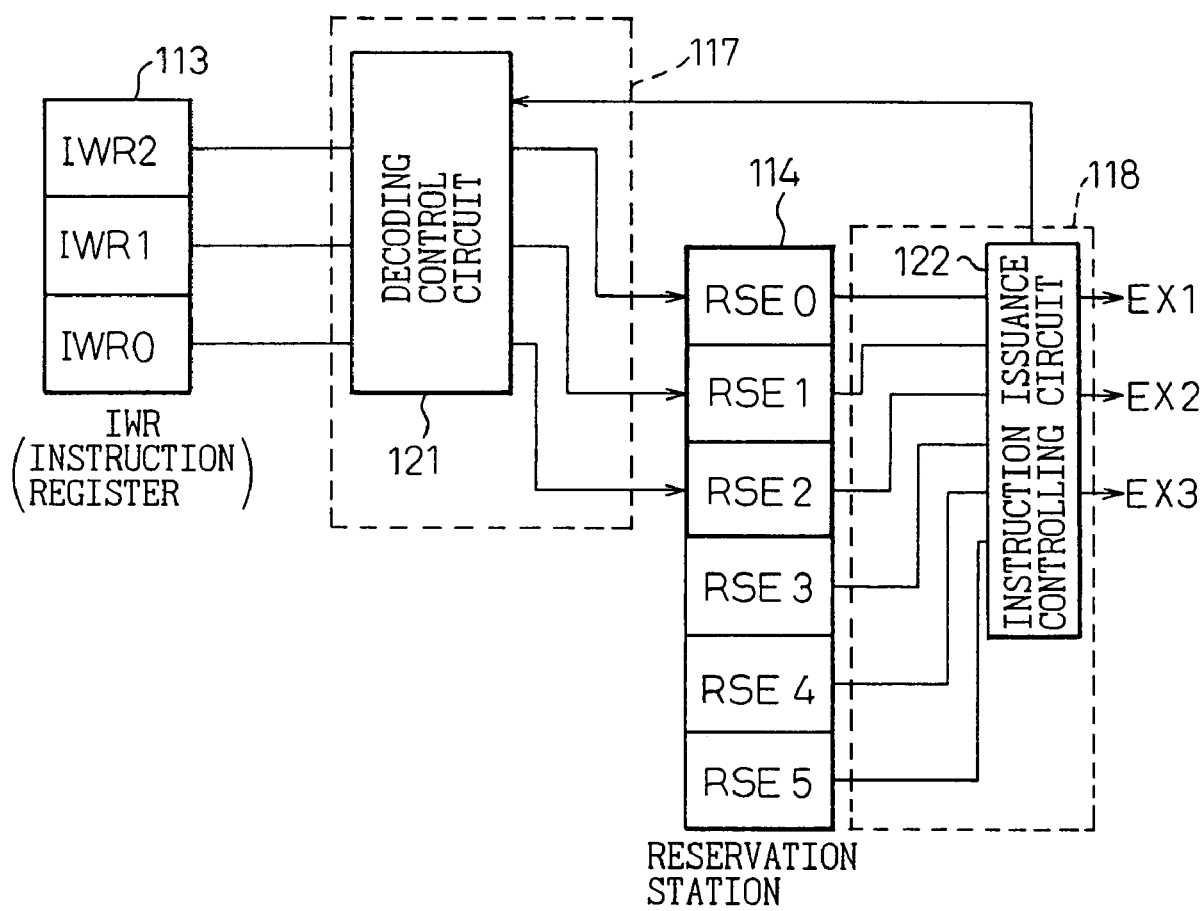
FIG. 3 is a view showing a constitutional example of an instruction control device according to a first embodiment of the present invention.

FIG. 3 shows a constitutional example of an instruction control device according to a first embodiment of the present invention.

In FIG. 3, the instruction (IWR) register 113 fetches a plurality of instructions from the instruction cache 112 of FIG. 1 and stores them into registers IWR0, IWR1 and IWR2 in the instructed order (instruction decoding order). In this embodiment, there is constituted such that three instructions can be simultaneously decoded at the maximum.

There has been included a part of a function of a decoding control circuit 121 within the controlling unit 116, in the example of FIG. 1. Here, the decoding control circuit 121 performs a controlling action specific to the present invention, so that the decoding control circuit 121 is depicted as being included in the circuit 117 of the aforementioned (c) of FIG. 2, also in a sense for relating to (c). Similarly, instruction issuance control circuit 122 is also depicted as being included within the circuit 118 of (c).

The decoding control circuit 121 receives instructions from the instruction (IWR) register 113 to thereby determine the number of decoded instructions, and determines which instructions are to be stored into entries RSE0 through RSE5, respectively, of the reservation station 114. Further, the decoding control circuit 121 receives the number of issued instructions issued from the instruction issuance control circuit 118 toward the execution unit 115, and updates a yet unissued instruction storing entries number counter within the circuit 121 to be described later.

The reservation station 114 is constituted of 6 entries in this embodiment, such that the lower the entry, the older the instruction decoded order (i.e., the entry RSE5 is the oldest). The instruction issuance control circuit 122 is constituted to issue up to three instructions (EX1, EX2, EX3) in the decoded order, toward the execution unit, from those issuable instructions within the six entries within the reservation station 114. Further, as described above, the number of simultaneously issued instructions is notified to the decoding control circuit 121.

Here, before explaining the embodiment of the present invention in detail, there will be explained a basic action of the instruction control device according to the present invention with reference to FIG. 4 and FIG. 5 for better understanding.

FIG. 4 shows an example of a processing action of the reservation station in the present invention. FIG. 5 shows an example of a basic processing flow of the instruction control device according to the present invention.

In (a), the decoded instructions from the instruction (IWR) register 113 are stored in the six entries of the reservation station 114. The instruction ① has been decoded most formerly, and the instruction ⑥ has been decoded most lately. Since the decoded instructions ② and ④ have been brought into an executable condition in advance of the remaining instructions, they are immediately issued to the execution unit 115 and executed thereby, irrespectively of the instruction decoded order ① to ⑥ as shown in (b). Up to this is identical with (a) and (b) of FIG. 2.

At (c) of FIG. 4, there is performed an action specific to the present invention. Firstly, two entries, which have been emptied at (b), are deleted and compressed. Namely, newer decoded instructions are stored into the emptied entries RSE2 and RSE4 in a manner successively shifted from the upper side of FIG. 4. As a result, in this embodiment, the instructions ①, ③, ⑤ and ⑥ are stored into the entries RSE5, RSE4, RSE3 and RSE2, respectively, in the order of instruction decoded order, i.e., in the order from the oldest to the latest.

Secondly, there are stored the succeeding decoded instructions ⑦ and ⑧ from the instruction register 113, into the upper side entries RSE0 and RSE1 which have been emptied by the instruction shifting action as described above. As is also apparent from (c), by performing the above first and second actions, those entries within the reservation station 114, into which the instruction register 113 aims to store decoded instructions, are fulfilled or satisfied by the three entries RSE0 through RSE2 at the maximum.

Further, also upon issuance of executable instructions from the reservation station 114 to the execution unit 115, the instruction decoded order can be guaranteed by simply and sequentially issuing the executable instructions from the entry RSE5 side (from the lower side). As a result, (i) the conventionally required logical circuits and intra-chip wiring area for allowing all the decoded instructions to be stored in the entries RSE0 through RSE5 can be remarkably reduced, and (ii) the instruction order identifiers and hardware for determining the instruction decoded order within the reservation station 114 can be eliminated.

Figure 5:
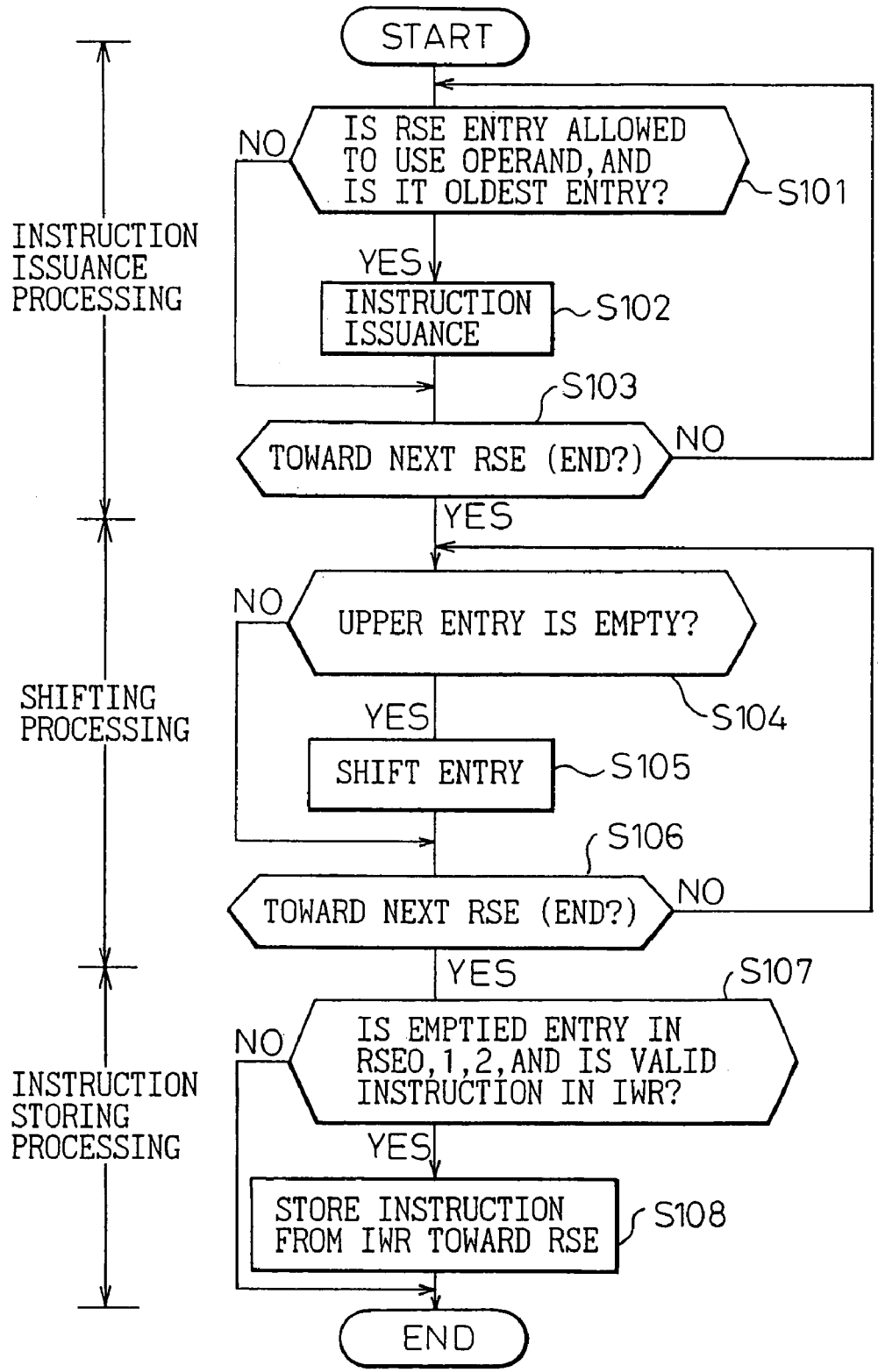
FIG. 5 is a view showing an example of a basic processing flow of the instruction control device.

FIG. 5 shows a flow of the action of the above described instruction control device according to the present invention. At steps S101 through S103, those of entries RSE0 through RSE5, the operands of which have been brought into an executable condition, are sequentially issued to the execution unit 115, in the order from the foremost decoded one (i.e., from the lower side of FIG. 4). Next at steps S104 through S106, still filled entries are moved (shifted) to those entries emptied by the instruction issuance at the steps S104 through S106 in a manner from the upper side toward the lower side, to thereby delete and compress those emptied entries from which instructions have been already issued.

Lastly, at steps S107 and S108, when at least one of entries RSE0 through RSE2 has been emptied and the instruction register 113 includes a valid instruction, the decoded instructions are stored into the entries RSE2 through RSE0 in the order from the oldest.

Figure 6:
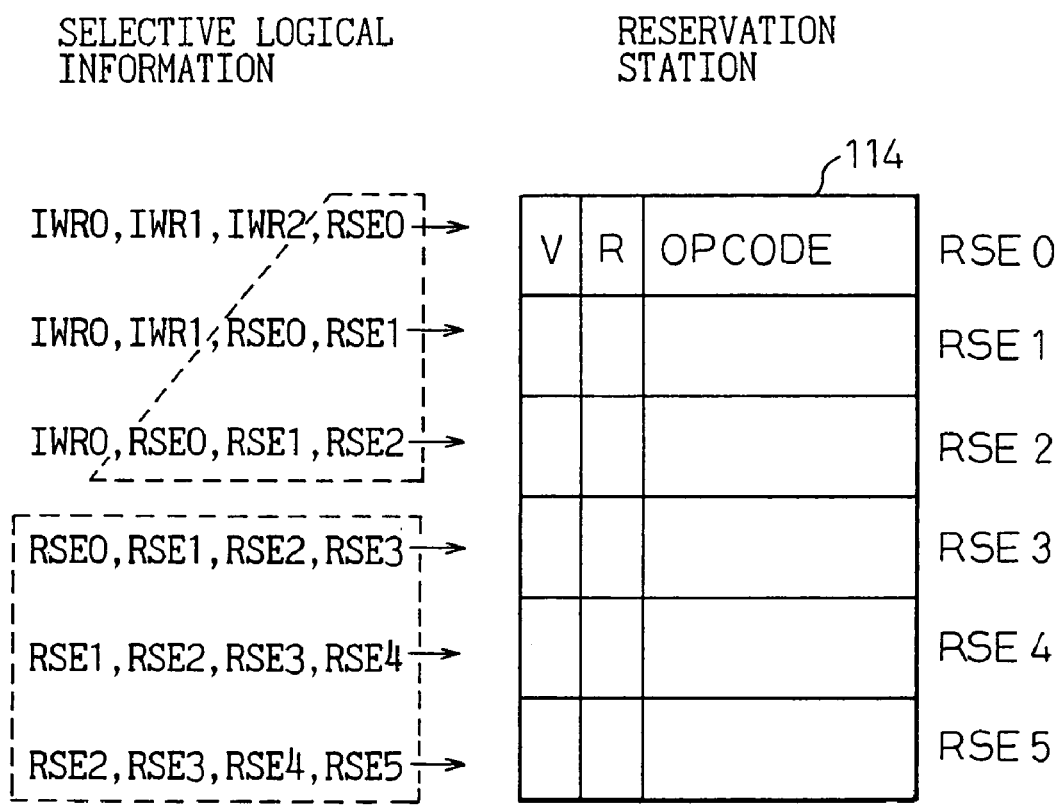
FIG. 6 is a view showing a constitutional example of the reservation station of FIG. 3.

FIG. 6 shows a constitutional example of the reservation station 114 used in the embodiment of FIG. 3.

As shown at the right side of FIG. 6, the reservation station 114 preserves a V bit indicative of validity (V=1 (occupied)/0 (empty)) of a pertinent entry, an R bit indicative of useability (R=1 (executable)/0 (unexecutable)) of the entry, and OPCODE indicative of an instruction content, for each of the entries within reservation station 114.

Further, according to the constitution of the present invention as shown at the left side of FIG. 6, corresponding data can be stored into that entry which has been selected by a selection signal established from four inputs. Here, IWR0 through IWR2 are validity information of instructions stored from the instruction register 113, and RSE0 through RSE5 are validity information of entries of the reservation station 114. There will be explained hereinafter in detail the embodiment of FIG. 3, including the functional action of these informations.

Figures 7, 8:
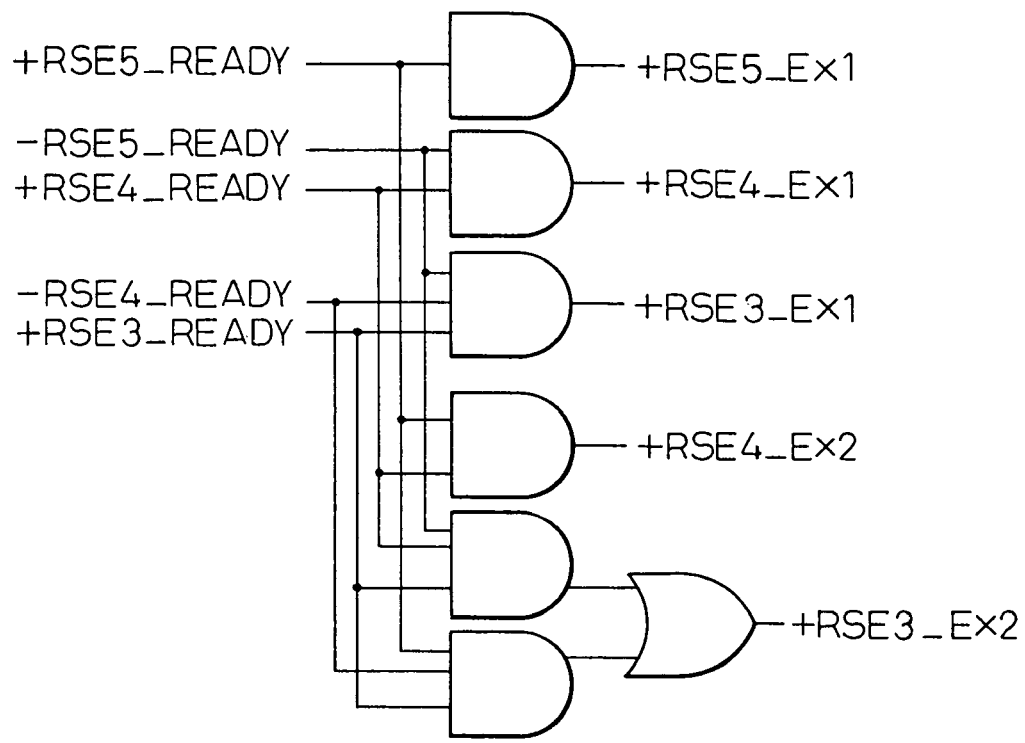
FIG. 7 is a view showing a constitutional example of an instruction issuance control circuit of FIG. 3.
FIG. 8 is a view showing a logical table for FIG. 7.

FIG. 7 shows a constitutional example of the instruction issuance control circuit 122 of FIG. 3. FIG. 8 shows a logical table for FIG. 7.

In FIG. 7, +READY signal is generated from a logical product of the V bit and R bit of FIG. 6. For example, the entry RSE5 of the reservation station 114 becomes issuable, when an +RSE5_READY signal=1 because V=1 (occupied) and R=1 (executable).

Further, +RSE5_EX1 is a signal (EX1) which indicates that the entry RSE5 is issuable and has the oldest decoded order (i.e., most formerly decoded), while +RSE4_EX2 is a signal (EX2) which indicates that the entry RSE4 is issuable and has a second oldest decoded order. Other signals can be described in the same manner. As explained up to now, those instructions within the reservation station 114 are always arranged in the decoded order from the oldest, according to the present invention.

As a result, there can be readily determined an instruction issuance priority order, by a simple combination of READY signals of respective entries as shown in FIG. 7. For example, in case of +RSE5_READY (=1) and +RSE4_READY (=1) as shown in a dotted line frame of FIG. 8, RSE5 is an EX1 signal and RSE4 is an EX2 signal. In this way, there are fully eliminated conventional instruction order identifiers (IID's) and a comparator thereof. Note, although there has not been explained an EX3 signal (indicative of the third oldest decoded order), this can be apparently constituted similarly to the above.

Figure 9:
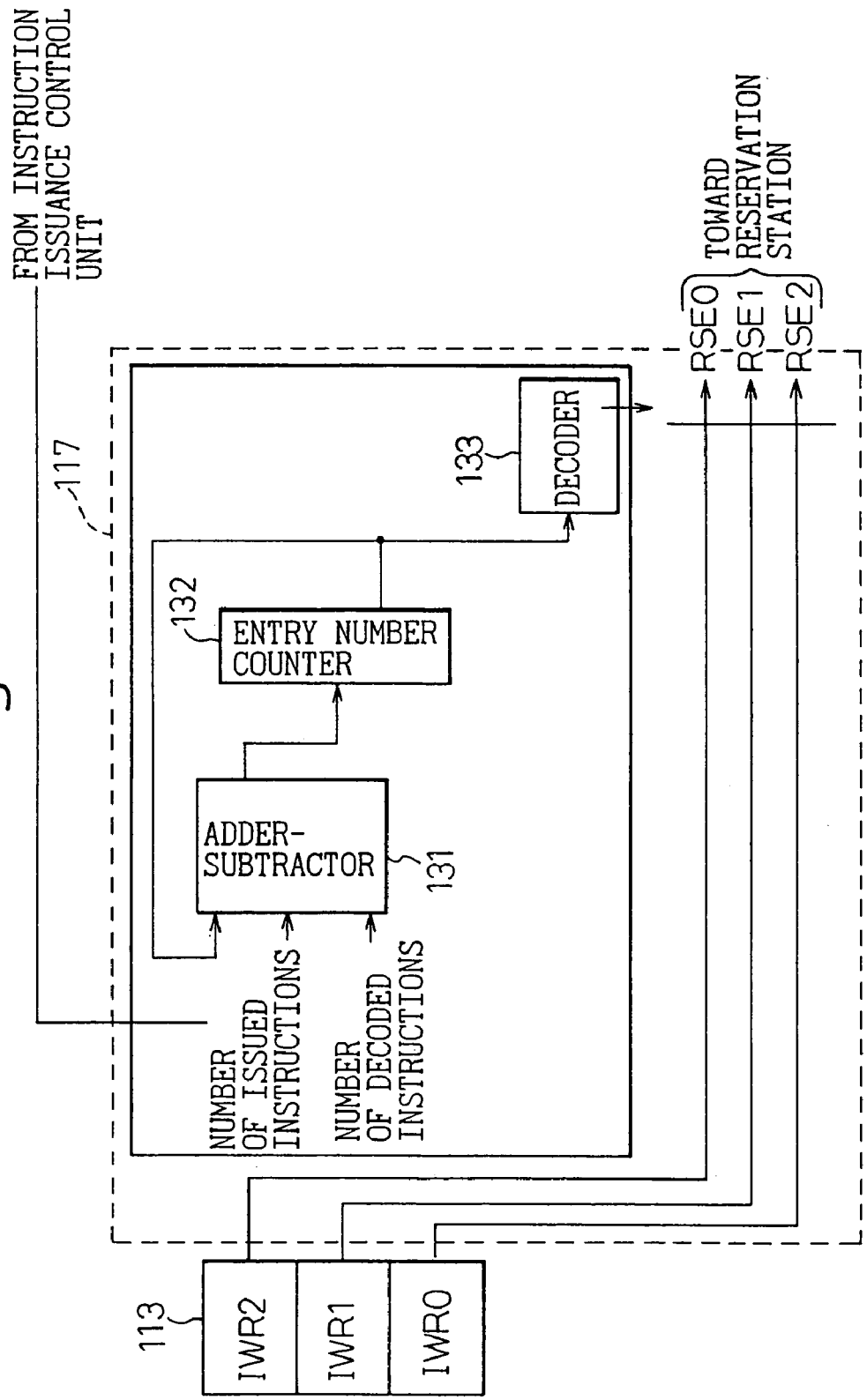
FIG. 9 is a view showing a constitutional example of a decryption controlling circuit shown in FIG. 3.
Figure 10:
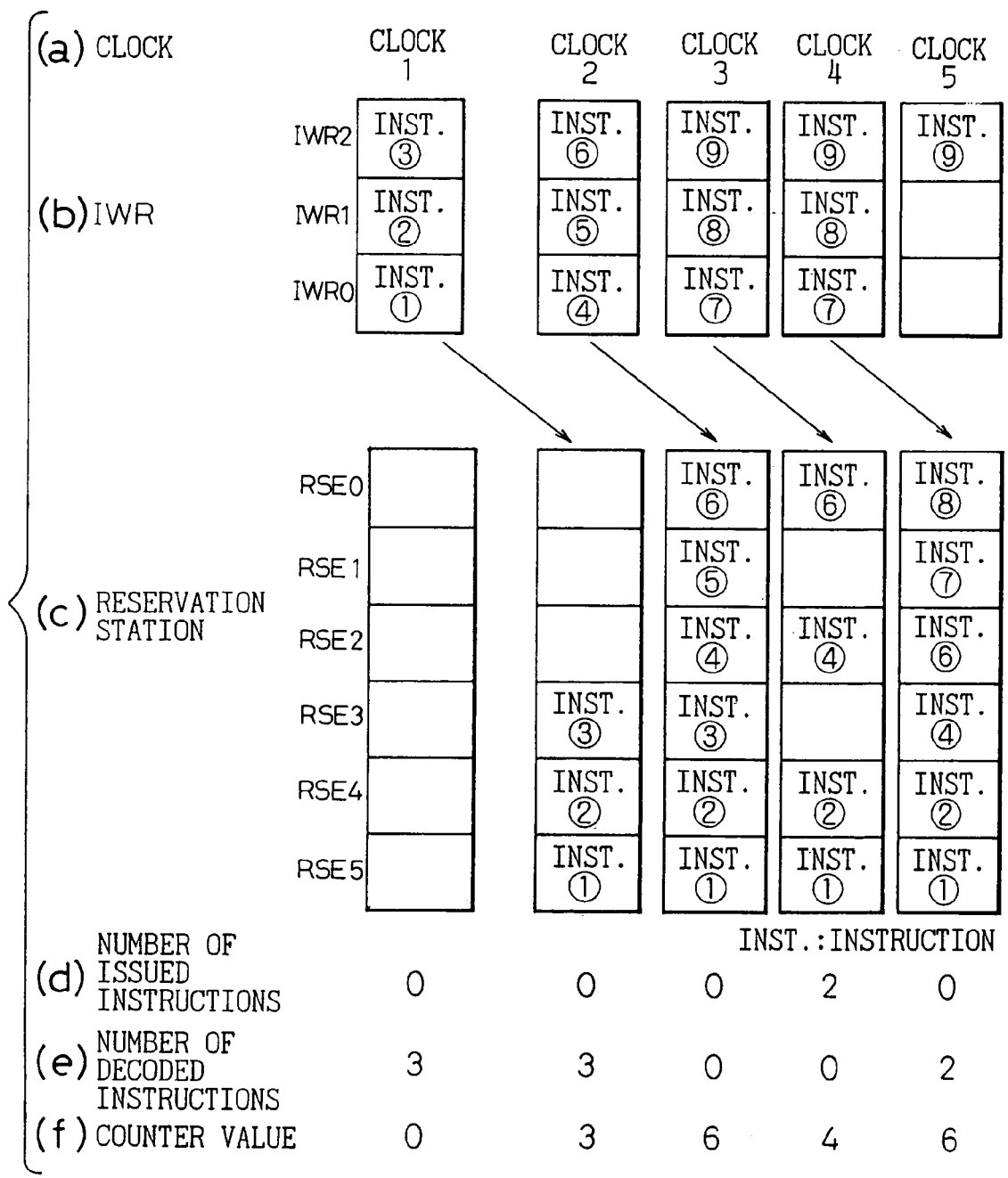
FIG. 10 is a view showing an example of an action of the circuit shown in FIG. 9.

FIG. 9 shows a constitutional example of the decoding control circuit 121 of FIG. 3. FIG. 10 shows an example of an action of FIG. 9.

As shown in FIG. 9, the decoding control circuit 121 comprises: an adder-subtractor 131 which successively adds or accumulates the number of decoded instructions and subtracts therefrom the number of issued instructions; an entry number counter 132 for preserving the result; and a decoder 133. This decoder 133 produces the number of decoded instructions from: a signal obtained by decoding the contents of the entry number counter 132; and the validity bits of the IWR0 to IWR2 of the instruction register 113; and produces a store destination entry number selection signal of a decoded instruction to be given from the instruction register 113 to the reservation station 114 based on the number of decoded instructions.

FIG. 10 shows an example of a relation between the number of decoded instructions, the number of issued instructions, and the entry number counter value.

In FIG. 10, (a) through (c) are identical with those shown in FIG. 4. The number of issued instructions at (d) indicates the number of instructions issued from the reservation station 114 to the execution unit 115, and is provided by the instruction issuance control circuit 122. Further, the number of decoded instructions at (e) is given as an output of the above described decoder 133, and indicates the number of decoded instructions of the instruction register 113. The value at (f) of the entry number counter 132 indicates the number of entries which are being used (i.e., which store decoded instructions, respectively) within the reservation station 114. Namely, the entry number counter value=((the number of instruction decoding)−(the number of issued instructions)).

Figures 11, 12:
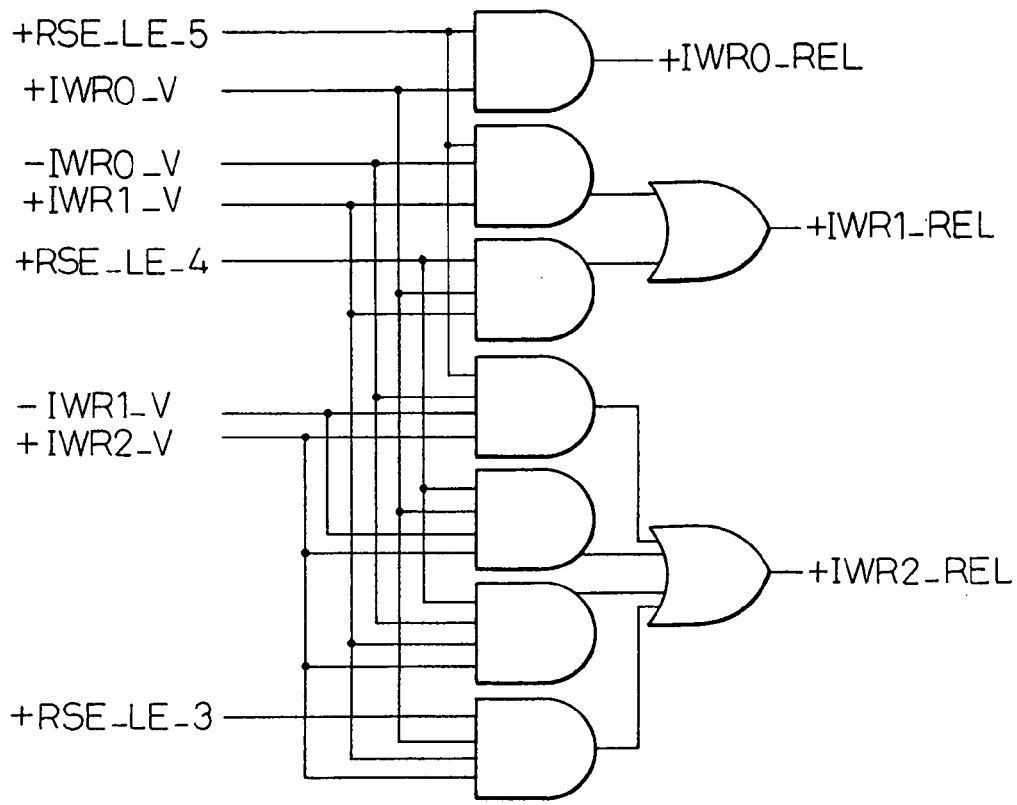
FIG. 11 is a view showing an example of a decoded instruction number generating circuit.
FIG. 12 is a view showing a logical table for FIG. 11.

FIG. 11 shows an example of a decoded instruction number generating circuit at the decoder 133. FIG. 12 shows a logical table for FIG. 11.

Here, +IWR0_V is a signal indicating that a valid signal exists on the IWR0. Further, −IWR0_V signal indicates that the IWR0 is empty. +IWR0_REL is a signal indicating that the decoding of instruction on the IWR0 of the instruction register 113 has been completed. Other signals can be described in the same manner.

Further, +RSE_LE_5 is a signal indicating that the entry number counter value is equal to or less than "5". As shown in FIG. 12, one decoded instruction is generated in case of +RSE_LE_5, and two or three decoded instructions are generated in case of +RSE_LE_4 and +RSE_LE_3, respectively.

Figure 13:
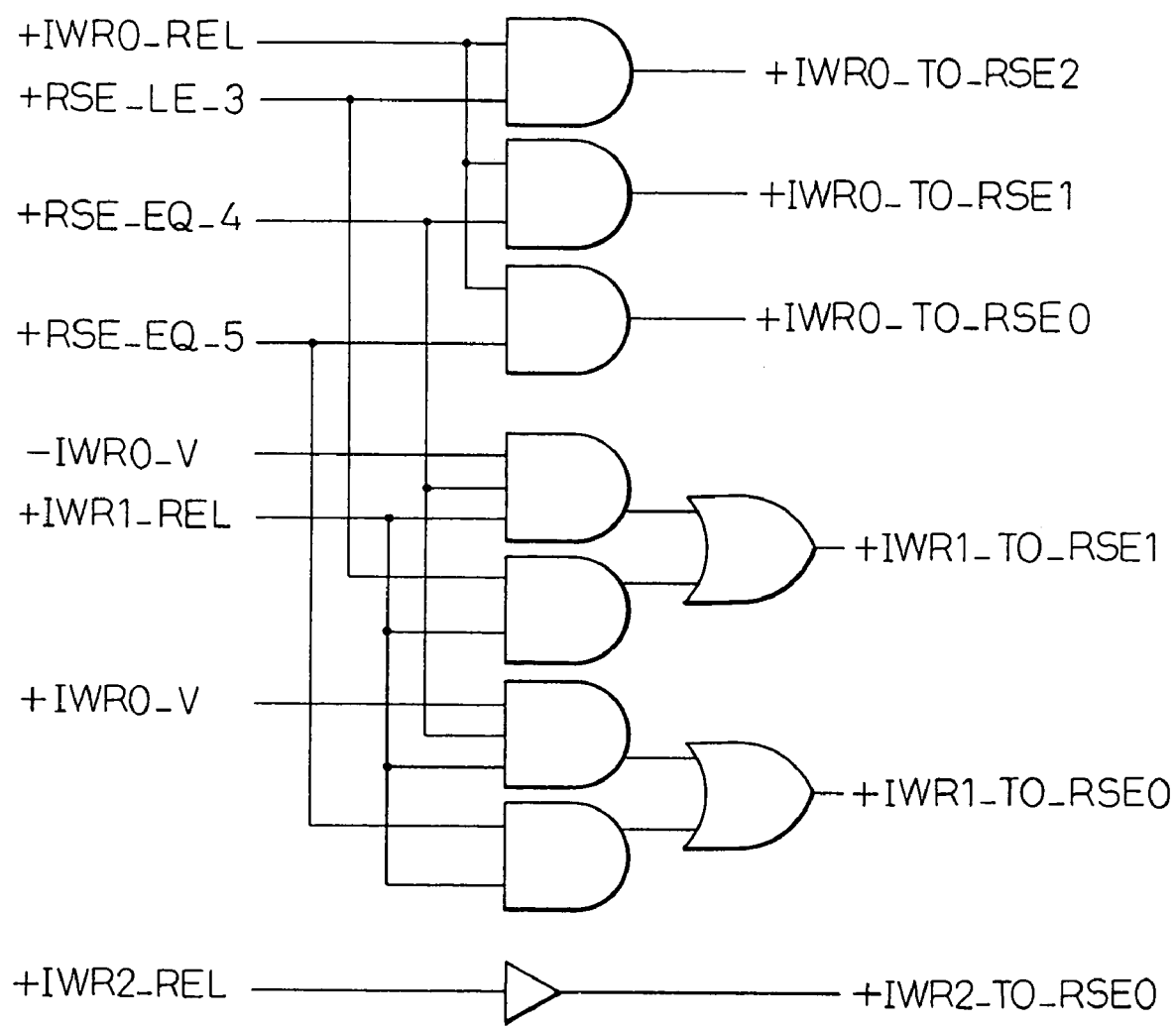
FIG. 13 is a view showing an example of a store destination entry number selection signal generation circuit for decoded instructions.

FIG. 13 shows an example of a store destination entry number selection signal generation circuit for decoded instructions, to be arranged at the next step of the decoded instruction number generating circuit in the decoder 133. FIG. 14 shows a logical table for FIG. 13.

Here, +RSE_EQ_4 is a signal indicating that the entry number counter value is equal to "4". Further, at the output side, +IWR0_TO_RSE2 is a signal indicating that the instruction on the IWR0 of the instruction register 113 is stored in the RSE2 of the reservation station 114. Other signals can be described in the same manner.

As shown in FIG. 14, there is selected either one of three entries RSE0 through RSE2 of the reservation station 114 which stores decoded instructions from the instruction register 113; such as making use of +IWR0_REL signal generated by the decoded instruction number generating circuit described in FIG. 11, and making use of the decoded signal of the entry number counter value and of the validity signal of IWR0. The examples shown by dotted line frames in FIG. 14 combinedly indicate a situation where all of the three decoded instructions IWR0 to IWR2 are simultaneously stored into the entries RSE2 through RSE0 of the reservation station 114, respectively.

As described above, the amount 117 can be restricted to the minimum according to the present invention, by selecting an input information from the maximum number of simultaneously decodable instructions. Further, the machine cycle time can be reduced, by limiting distributing destination of the decoded instructions to thereby reduce a gate delay.

Figures 15, 16:
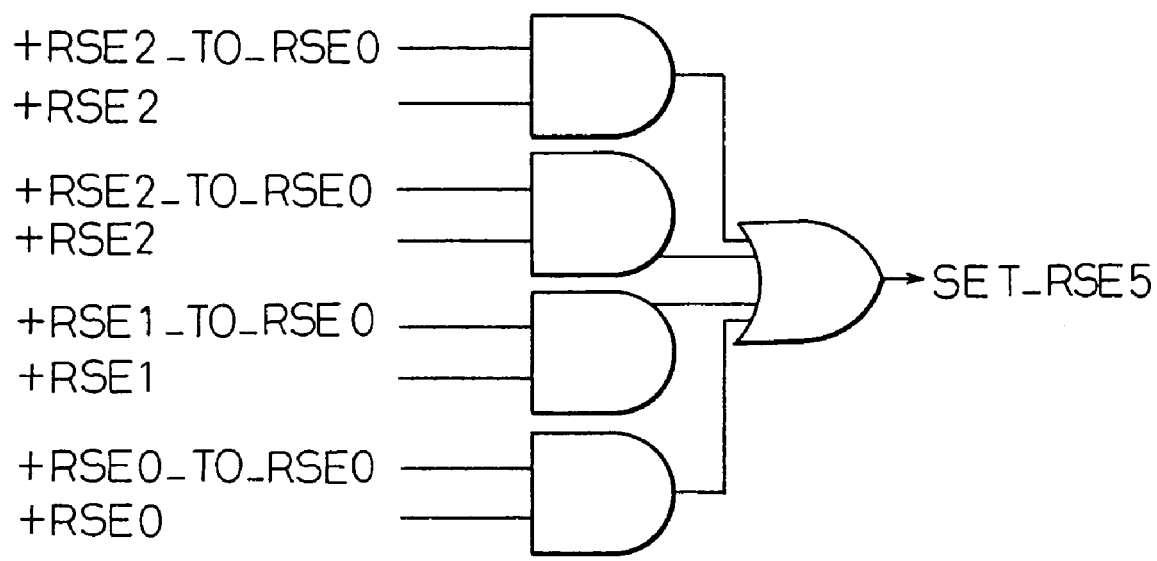
FIG. 15 is a view showing an example of a selection circuit.
FIG. 16 is a view showing a logical table for FIG. 15.

FIG. 15 shows an example of a selection circuit of emptied entries within the reservation station 114. FIG. 16 shows a logical table for FIG. 15.

Here, +RSE2_TO_RSE5 is turned ON when RSE3, RSE4 and RSE5 are empty; +RSE3_TO_RSE5 is turned ON when RSE4 and RSE5 are empty; +RSE4_TO_RSE5 is turned ON when RSE5 is empty; and +RSE5_TO_RSE5 is turned ON when RSE5 is valid. In this way, respective input selection signals can be readily prepared from the validity information of the entries. SET_RSE5 is a signal indicating that the data is set at the entry RSE5.

In this embodiment, the number of instructions which are simultaneously issued to the execution unit 115 is at most three, and this number is also the largest number of instructions which can be simultaneously decoded. Thus, there are detected three higher entries inclusive of the pertinent entry itself, taking into consideration a case that the simultaneously issued three instructions were stored in three continuous entries. The instruction shifting action between entries is not explained here, since it is a known data transferring process between registers.

According to the present invention as described above, it becomes possible to constitute a high speed reservation station with a minimum amount of hardware.

There will be described hereinafter a second embodiment of the present invention. This embodiment corresponds to the problem (2) noted above.

Figure 17:
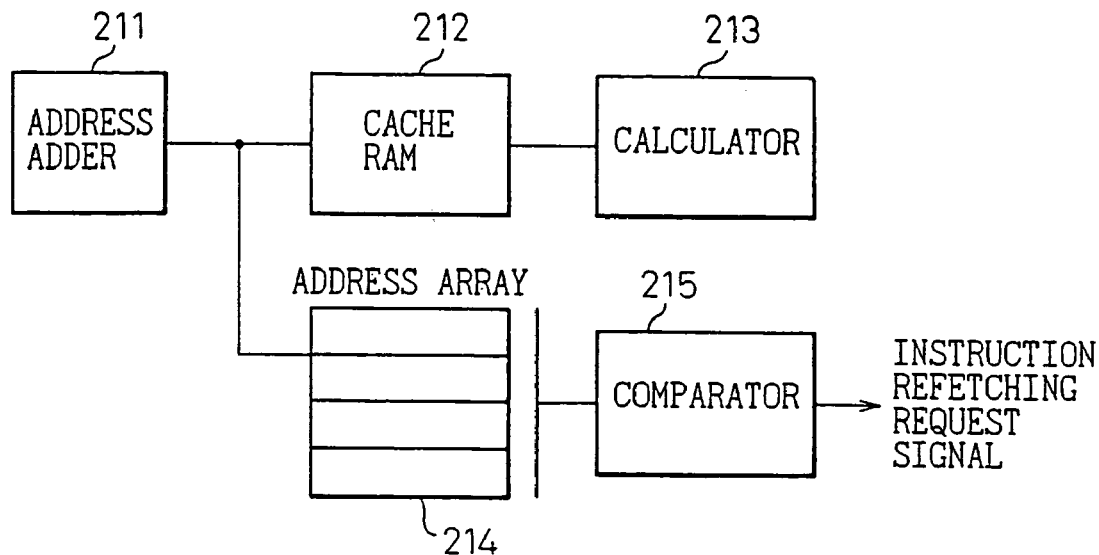
FIG. 17 is a view showing a constitutional example, of a conventional instruction control device.

FIG. 17 shows a constitutional example of a conventional instruction control device.

In FIG. 17, register contents are added by an address adder 211 to thereby generate a memory address. This address is sent to a cache RAM 212, and a corresponding memory content is read out and supplied to an operator 213. Simultaneously, the address is stored into an address array 214, so as to be used for checking address dependency.

Figure 18:
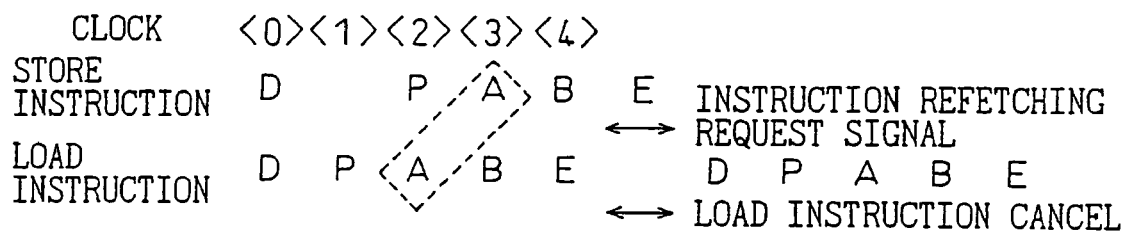
FIG. 18 is a view showing an example of a time chart of execution of a conventional operational instruction including a STORE instruction.
Figure 19:
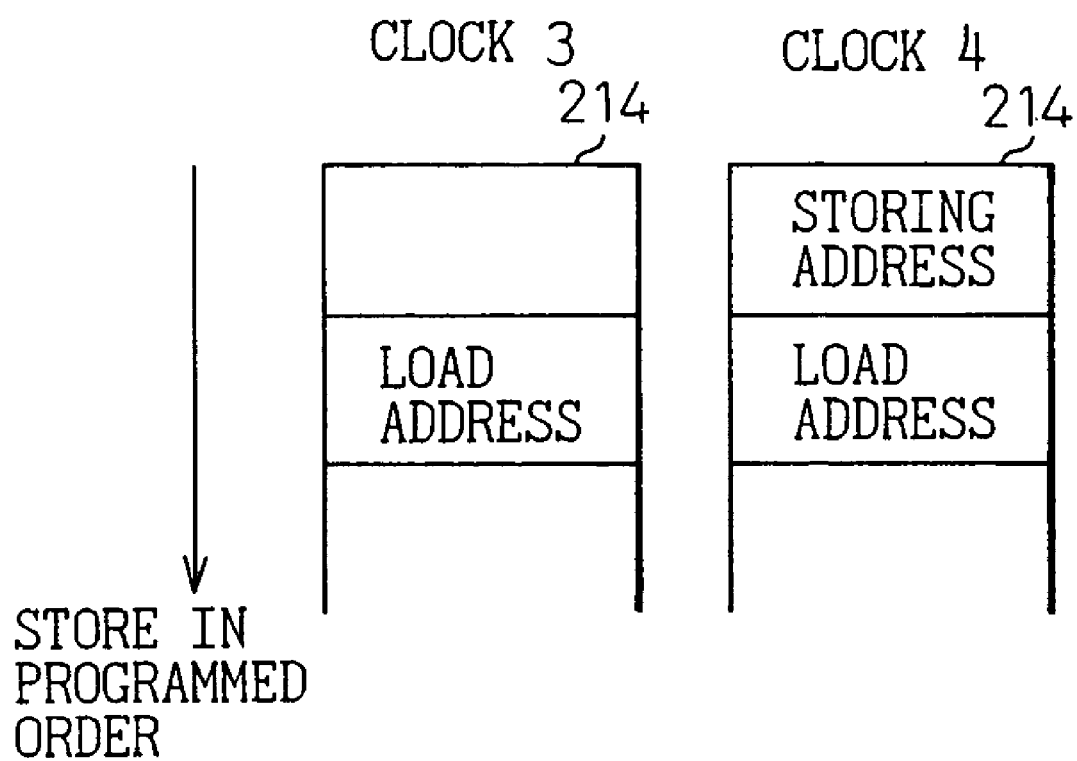
FIG. 19 is a view showing an example of address data to be stored into an address array upon accessing to a cache RAM of FIG. 18.

FIG. 18 shows an example of a time chart of a conventional instruction execution including a STORE instruction which is a memory operation instruction. FIG. 19 shows an example of address data to be stored into the address array 214 upon accessing to a cache RAM.

In FIG. 18, a D cycle is an instruction decoding cycle, a P cycle is a priority cycle, an A cycle is an address calculation and memory request cycle, a B cycle is a cache RAM access cycle, and an E cycle is an operation cycle.

In this example, there is shown a situation where an address of a preceding STORE instruction is obtained after a fetch request of a succeeding LOAD instruction has been completed, as a result of address calculations and requests performed in an out-of-order manner. Instructions are stored into the address array 214, in accordance with a programmed order. Thus, for the succeeding LOAD instruction as shown in FIG. 19, there is performed an address calculation and corresponding memory request at a clock 2, and the load address of the succeeding instruction is stored into an address storing position of a latter stage, at a next clock 3. Concerning the preceding STORE instruction, its storing address is stored into a storing position of a former stage of the address array 214, at a next clock 4.

At clock 4, comparator 215 in FIG. 17 compares a memory access address of the succeeding instruction with a store access address of the preceding instruction on the address array 214, and outputs an instruction refetch request signal if a coinciding ones exist. As a result, the succeeding LOAD instruction is once cancelled by the output of such a signal, and the cancelled succeeding instruction is fetched after the preceding STORE instruction has been executed. Conventionally, by such a processing, there is guaranteed a memory reference in a programmed order, even when there exists an address dependency between memory access requesting instructions (relationship between "store" and "fetch"). Since the succeeding instruction is once cancelled and later re-executed, there has been caused a problem that the execution speed of the memory operation instructions inclusive of a STORE instruction is considerably reduced.

Figure 20:
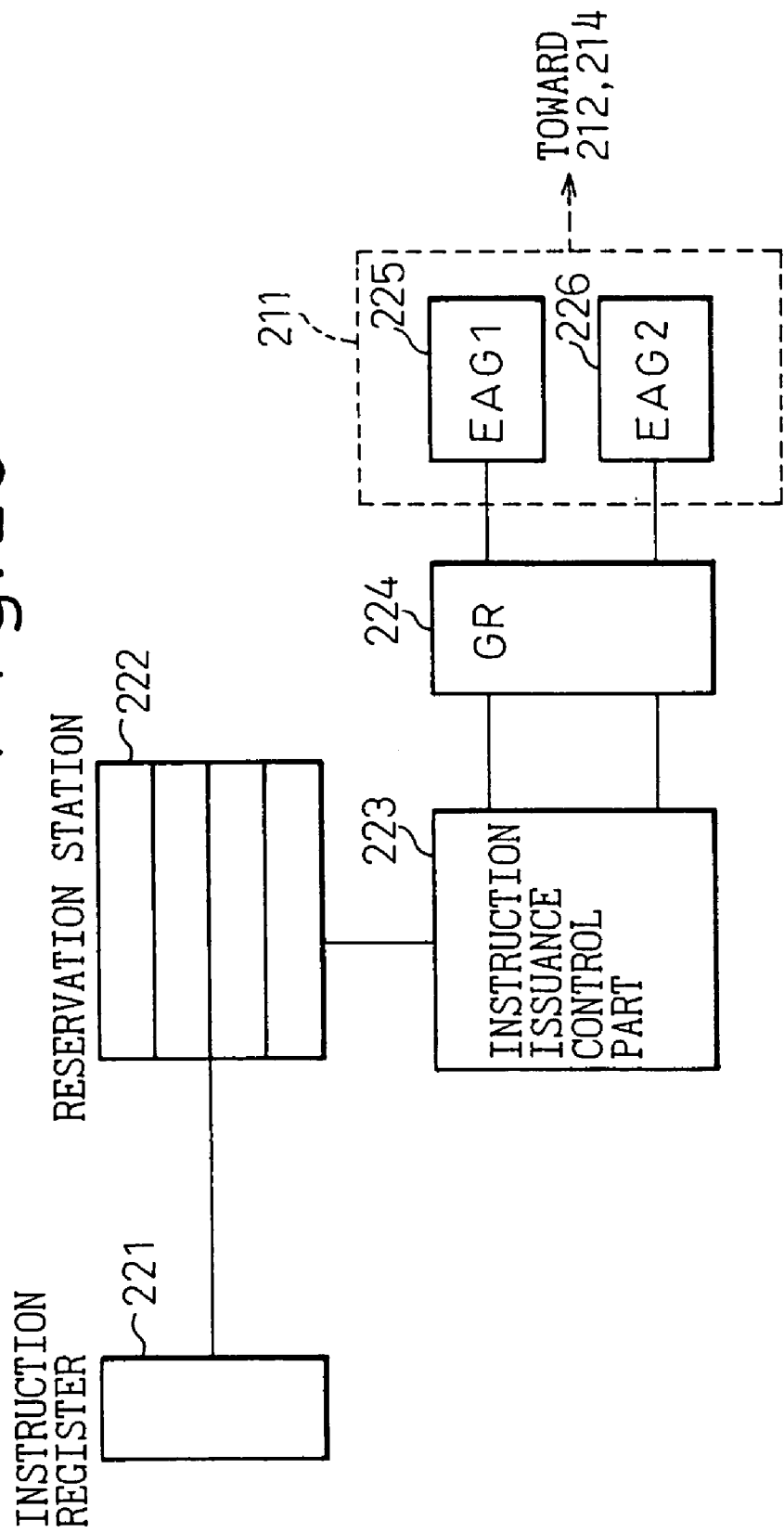
FIG. 20 is a view showing an example of basic constitution of an instruction control device according to a second embodiment of the present invention.

FIG. 20 shows an example of basic constitution of an instruction control device according to a second embodiment of the present invention.

In FIG. 20, an instruction in an instruction register 221 is decoded and stored into a reservation station 222. Instruction issuance control part 223 selects two instructions, for which the sources on the reservation station 222 have been completely collected, and issues them to address adders (EAG1) 225 and (EAG2) 226.

The instructions issued to the address adders 225 and 226 include register addresses as necessary information, respectively, for address calculation. Based on the respective register addresses, there is accessed a general purpose register (GR) 224, and the contents read out, thereby are sent to the corresponding address adders (EAG1) 225 and (EAG2) 226, respectively. The address adders 225 and 226 correspond to the address adder 211 shown in FIG. 17, and the outputs of them are supplied to the cache RAM 212 and to the address array 214 as conventional.

Figures 21, 22:
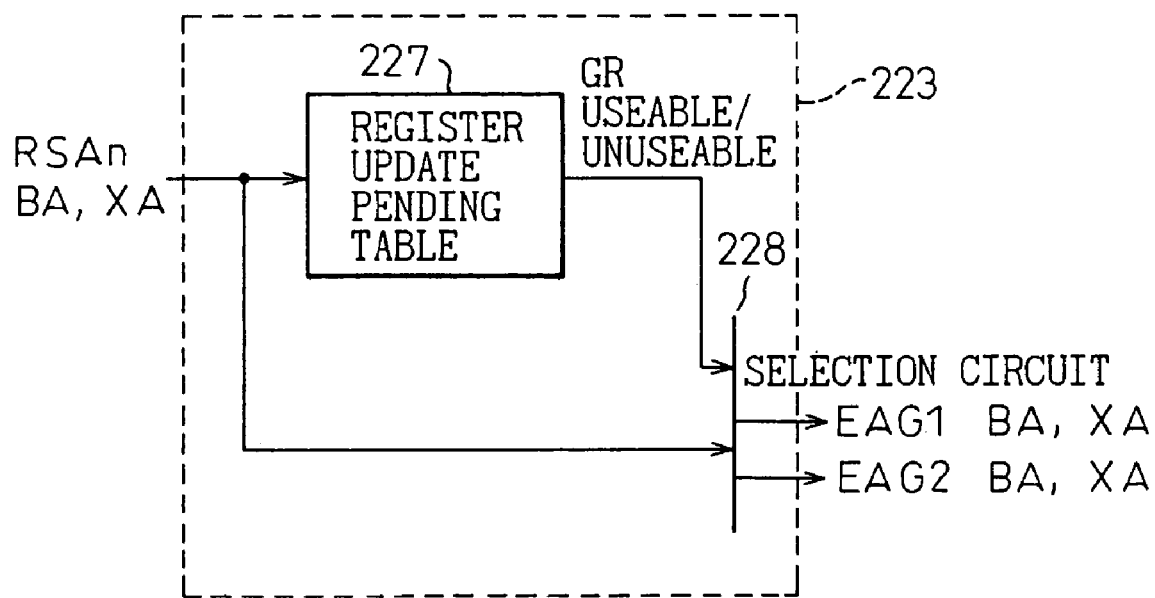
FIG. 21 is a view showing a constitutional example of a reservation station.
FIG. 22 is a view showing a constitutional example of an instruction issuance control part.

FIG. 21 shows a constitutional example of the reservation station. FIG. 22 shows a constitutional example of the instruction issuance control part 223.

In FIG. 21, those decoded instructions from the instruction register 221 are once stored into the respective entries (RSA0, RSA1, RSA2, . . . ) in a decoded order. Each of the entries includes a base register number (BA), an index register number (XA), and a validity flag (V). Further, there is particularly provided a store flag (ST).

Based on the base register number and the index register number of each of the entries on the reservation station 222, the instruction issuance control part 223 in FIG. 22 looks up a register update pending table 227, and outputs a signal indicative of whether the general purpose register 224 to be used by an instruction within each entry is useable or not. For example, in a case that the base register number (BA) and the index register number (XA) are constituted of 4 bits, it is possible to designate 16 pieces of general purpose registers, separately for each of the register numbers. The register update pending table 227 indicates whether a pertinent general purpose register is being updated by a preceding instruction, and indicates that, if the pertinent register is being used, this register is not useable by a succeeding instruction.

Selection circuit 228 decodes a signal from the register update pending table 227, and duly accesses a useable general purpose register 224 based on the decoded signal. The contents read out therefrom are selectively outputted to the address adders 225 and 226 of the next step.

Figure 23:
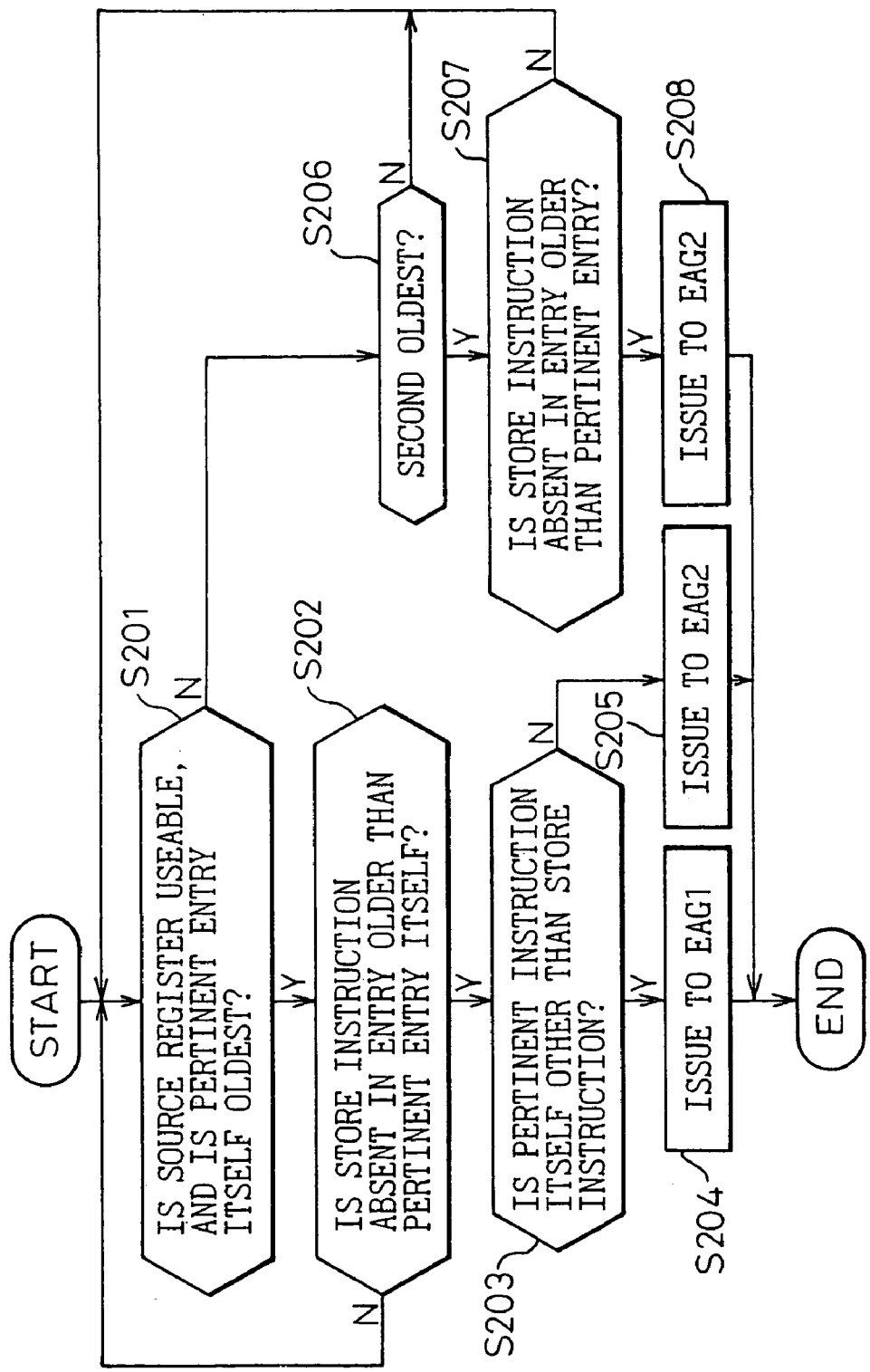
FIG. 23 is a view showing an action flow example (1) of a selection circuit.

FIG. 23 shows an action flow example of the selection circuit 228.

This embodiment will be described hereinafter, supposing that the three entries RSA0 to RSA2 on the reservation station 222 are established in the instruction decoded order, and an instruction having the oldest decoded order is stored into RSA0 and an instruction having the newest decoded order is stored into RSA2.

In FIG. 23, there is looked up, by the register update pending table 227, the usability of a source register of each of instructions stored in the entries RSA0 to RSA2 of the reservation station 222. Further, it is judged whether the pertinent instruction is that (i.e., preceding instruction) of the oldest entry among the instructions the source registers of which are useable (step S201).

Next, it is judged whether a STORE instruction is absent in an entry older than the pertinent entry itself, and it is judged whether the pertinent instruction itself is other than a STORE instruction (steps S202 and S203). As a result, the pertinent instruction is issued to the address adder (EAG1) 225 when the pertinent instruction is not a STORE instruction (ST=0) (step S204), and to the address adder (EAG2) 226 when the pertinent instruction is a STORE instruction (ST=1) (step S205). On the other hand, when the pertinent instruction is that in a second oldest entry a source register of which is useable, and when a STORE instruction is absent in an entry older than the pertinent entry itself, the pertinent instruction is issued to the address adder (EAG2) 226 (steps S206 to S208). Issuances of those other than these instructions are temporarily stopped.

FIGS. 24 through 29 cooperatively show an example of a decoder of the selection circuit for realizing the flow of FIG. 23.

Figure 24:
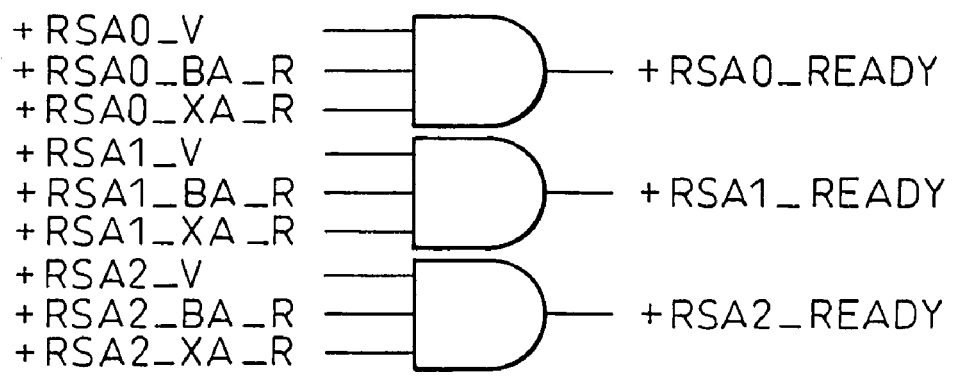
FIG. 24 is a view showing a constitutional example (1-1) of the selection circuit.

In FIG. 24, there are generated +RSAx_READY signals (x=0 to 2) indicating that source data of entries RSA0 to RSA2 are useable, respectively, of the reservation station 222. Here, +RSAx_V signal indicates that an instruction of its corresponding entry is valid (V=1), and +RSAx_BA_R signal and +RSAx_XA_R signal indicate that the base register and index register of an instruction of a corresponding entry are useable (READY) as a result that such registers have been looked up by means of the register update pending table 227.

Figure 25:
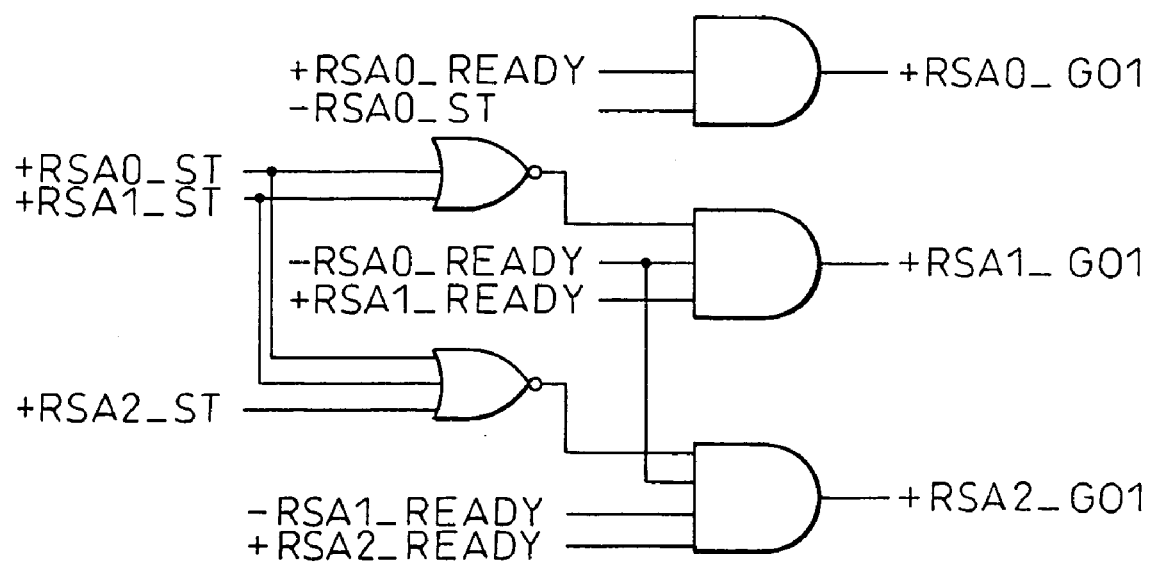
FIG. 25 is a view showing a constitutional example (1-2) of the selection circuit.

FIG. 25 shows an example of a decoder for selecting the address adder (EAG1) 225 side (see step S204). Here, +RSAx_G01 signal indicates that the instruction of a corresponding entry is supplied to the EAG1 side. FIG. 26 shows a logical table for FIG. 25. For example, +RSAL_GO1 signal is generated when the pertinent instruction is a second oldest entry the source of which is useable (−RSA0_READY and +RSA1_READY), and there is not a STORE instruction older than the pertinent instruction and the pertinent instruction is not a STORE instruction (−RSA0_ST and −RSA1_ST).

Figure 27:
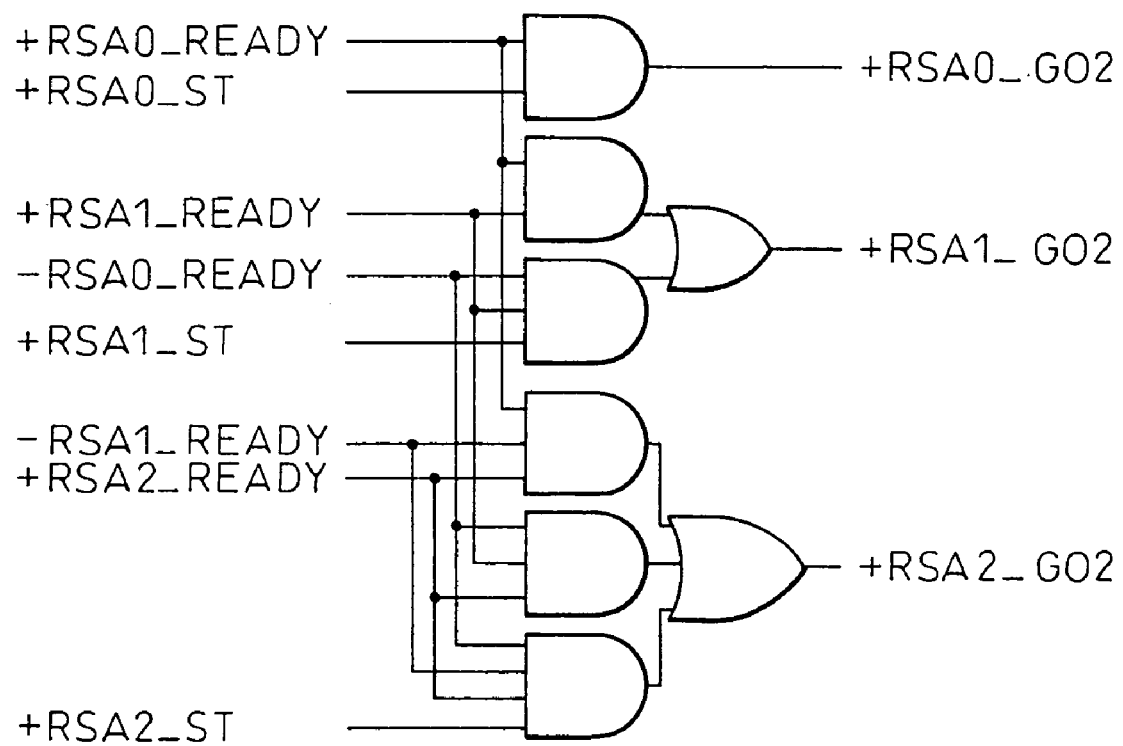
FIG. 27 is a view showing a constitutional example (1-3) of the selection circuit.

FIG. 27 shows an example of a decoder for selecting the address adder (EAG2) 226 side. Here, +RSAx_G02 signal indicates that the instruction of the corresponding entry is supplied to the EAG2 side. FIG. 28 shows a logical table for FIG. 27. As an example, +RSA1_G02 signal is generated for the instruction of RSA1, in the following case.

Namely, the +RSA1_GO2 signal is generated: when the pertinent instruction is in a second oldest entry the source register of which is useable (+RSA0_READY and +RSA1_READY) and the pertinent instruction is not a STORE instruction (−RSA1_ST); or when the pertinent instruction is in the oldest entry the source register of which is useable (−RSA0_READY and +RSA1_READY) and the pertinent instruction is a STORE instruction (+RSA1_ST).

Figure 29:
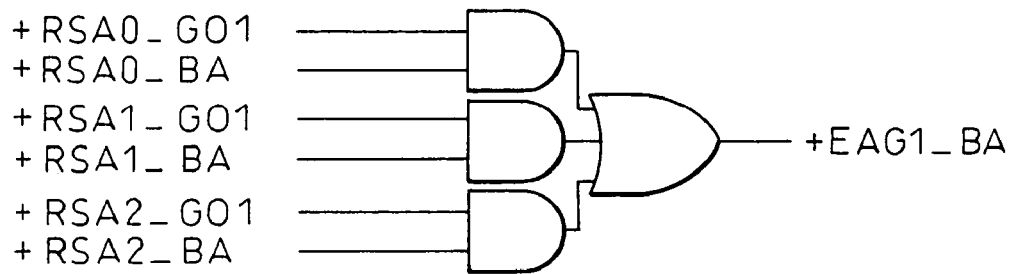
FIG. 29 is a view showing a constitutional example (1-4) of the selection circuit.

FIG. 29 shows an example of a signal (+EAG1_BA) which is a logical product of the aforementioned +RSAx_GO1 signal and +RSAx_BA signal (BA flag), and which outputs a base address to the address adder (EAG1) 225 side. Although not shown in this figure, there is also outputted a +EAG1_XA signal for an index address. The same thing can be said to +EAG2_BA signal and +EAG2_XA signal. These are outputted from the selection circuit 228 of FIG. 22, as an address of the general purpose register 224 of the next stage.

Figure 30:
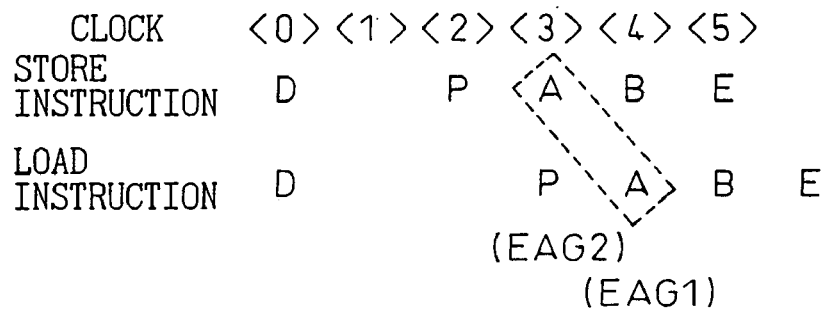
FIG. 30 is a view showing an example of a time chart of execution of an operational instruction.

FIG. 30 shows an example of a time chart of execution of an operational instruction according to the present invention.

According to the selective action flow of FIG. 23, the address information of the STORE instruction of the oldest entry is supplied to the address adder (EAG2) 226 side. Thus, as shown in FIG. 30, the address information of the succeeding LOAD instruction which fetches the addressing destination of the preceding STORE instruction is supplied to the address adder (EAG1) 225 side at the next clock cycle.

Figure 31:
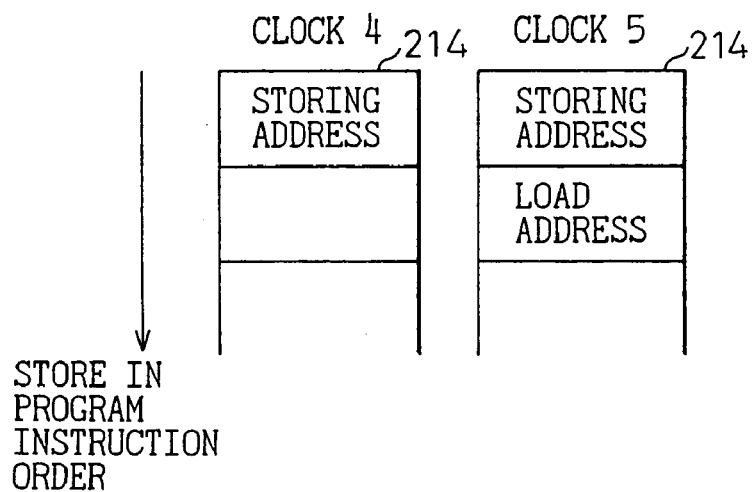
FIG. 31 is a view showing an example of data to be stored into the address array according to FIG. 30.

FIG. 31 shows an example of data to be stored in the address array 214 in FIG. 30. There is absolutely previously obtained the address of the STORE instruction (at clock 4 in this embodiment), and the address of the succeeding LOAD instruction is obtained at the next clock 5. As a result, even if there exists an address dependency between instructions which request memory accesses, there is guaranteed a memory, reference in accordance with a programmed order without re-executing a succeeding instruction like a conventional example. The processing thereafter is thus performed conventionally.

Figure 32:
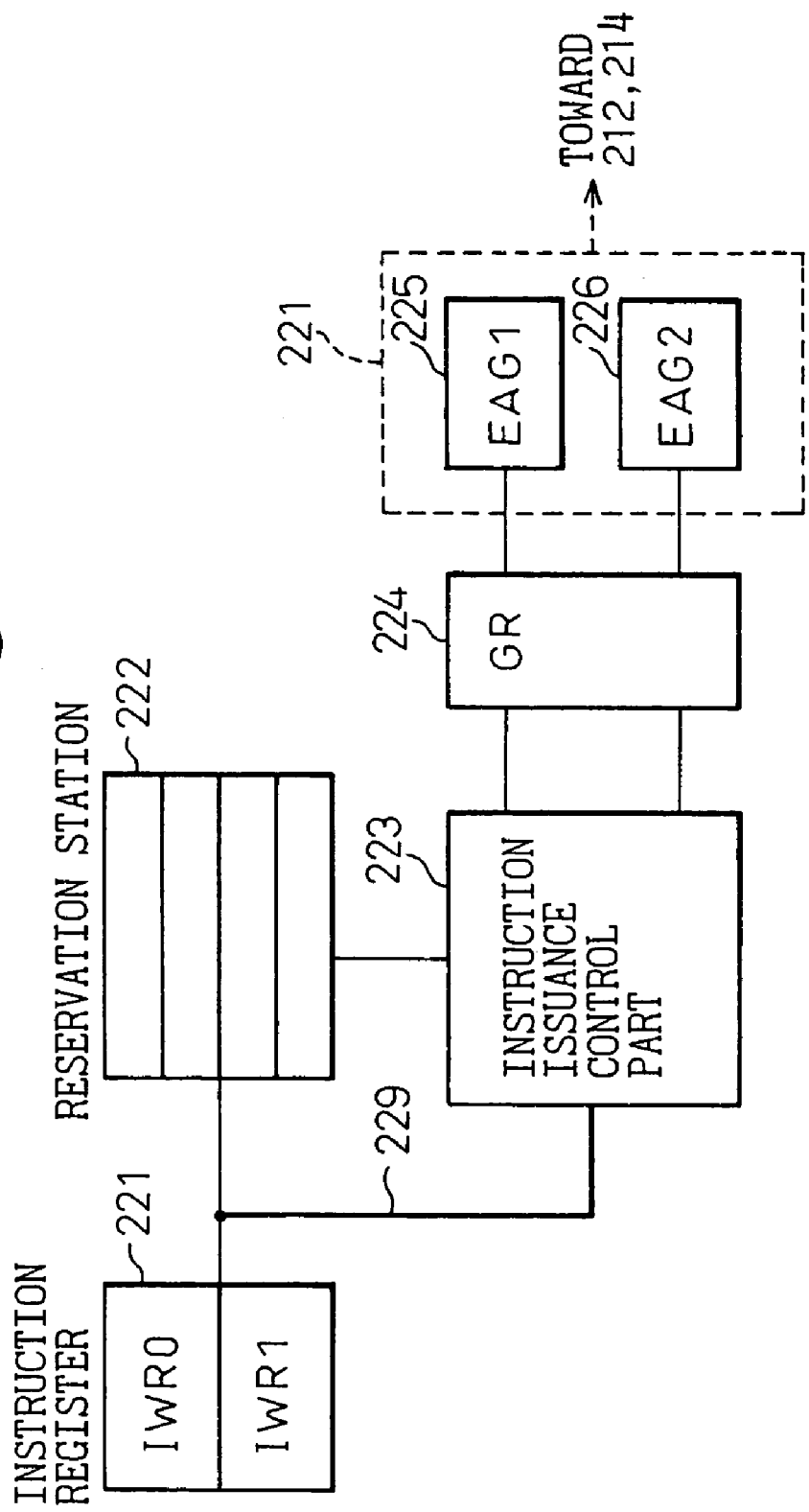
FIG. 32 is a view showing another constitutional example of the instruction control device.

FIG. 32 shows another constitutional example of the second embodiment of the present invention.

The difference between FIG. 32 and the above explained FIG. 20 resides in that the instruction register 221 is constituted to be capable of simultaneously decoding a plurality of instructions, and there is provided a bypass route 229 for directly issuing, under a certain condition, the decoded instructions to the instruction issuance control part 223 without going through the reservation station 222. Here, there is shown an example where the instruction register 221 can simultaneously decode two instructions IWR0 and IWR1.

Figure 33:
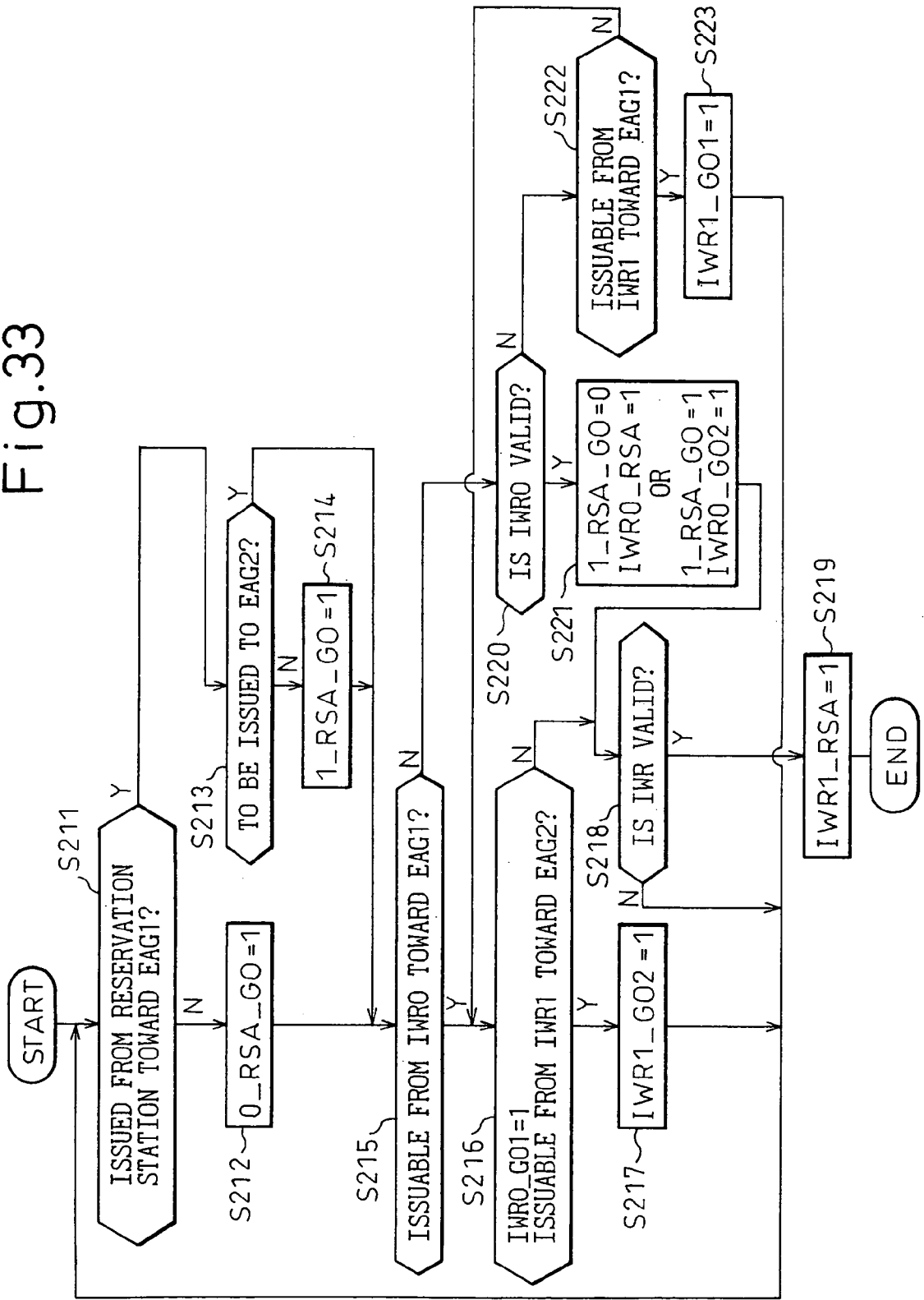
FIG. 33 is a view showing an action flow example (2) of the selection circuit.

FIG. 33 shows an action flow example of the selection circuit 228 (see FIG. 22) of this embodiment.

Further, FIGS. 34 through 38 cooperatively show an example of a decoder of a selection circuit for realizing the flow of FIG. 33.

Firstly at steps S211 to S214 in FIG. 33, there is judged the appropriateness of an instruction issuance from the reservation station 222 to the address adders (EAG1) 225 and (EAG2) 226. Namely, when there is no entry which stores an instruction to be issued from the reservation station 222 toward the EAG1, the 0_RSA_GO signal indicative thereof is set to be "1" (steps S211 and S212).

Then, when there is no entry which stores an instruction to be issued from the reservation station 222 toward the EAG2, the 1_RSA_GO signal indicative thereof is set to be "1" (steps S213 and S214). As shown in an upper half of FIG. 34, the 0_RSA_GO signal and the 1_RSA GO signal comprise logical products of minus values of the respective RSAx_G01 signals and RSAx_GO2 signals shown in FIG. 25 and FIG. 27, respectively.

Next, at step S215, it is judged whether the decoded instruction IWR0 at the instruction register 221 is issuable to the EAG1. Namely, when the IWR0 is valid and the EAG1 is useable, IWR0 is directly issued toward the EAG1 (step S216). Further, IWR0 is issued toward the EAG2 when IWR0 is valid and EAG2 is useable, while IWR0 is stored in the reservation station 222 when IWR0 is valid and both of EAG1 and EAG2 are unusable (step S221).

Figures 34, 35:
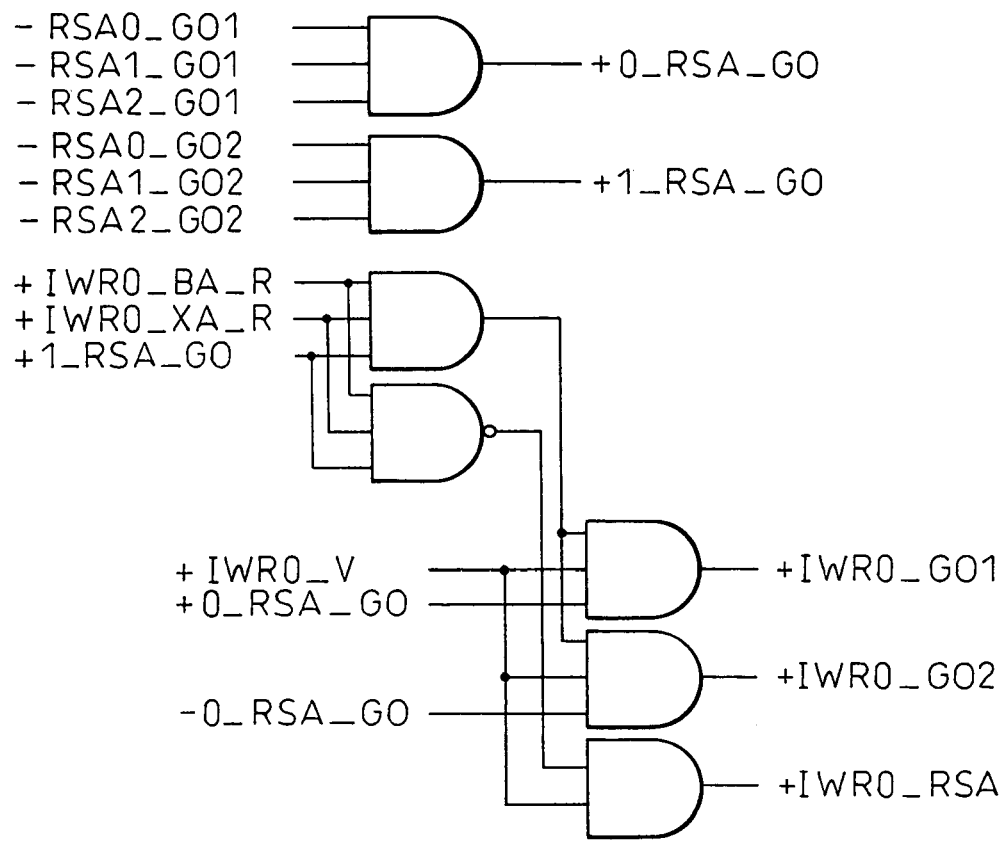
FIG. 34 is a view showing a constitutional example (2-1) of the selection circuit.
FIG. 35 is a view showing a logical table for FIG. 34.

The lower half of FIG. 34 shows an example of a concrete decoder for realizing the above described logic. FIG. 35 shows a logical table therefor. Here, the IWR0 is issued to EAG1 (+IWR0_G01), when IWR0 is valid (+IWR0_BA_R, +IWR0_XA_R and +IWR0_V) and EAG1 and EAG2 are useable (+0_RSA_GO and +1_RSA_GO). Further, IWR0 is issued to EAG2 (+IWR0_GO2) when EAG1 is unusable (−0_RSA_GO). In addition, IWR0 is stored in the reservation station 222 (+IWR0_RSA), when EAG2 is unusable (−1_RSA_GO) though IWR0 is valid (+IWR0_V).

Judgment is also similarly done for the decoded instruction IWR1 in the instruction register 221. Namely, when IWR1 is valid and EAG1 is useable, IWR1 is directly issued to EAG1 (step S223). Further, when IWR1 is valid and EAG2 is useable, IWR1 is issued to EAG2 (step S217). Meanwhile, when IWR1 is valid and EAG1 and EAG2 are both unusable, IWR1 is stored in the reservation station 222 (step S219).

Figure 36:
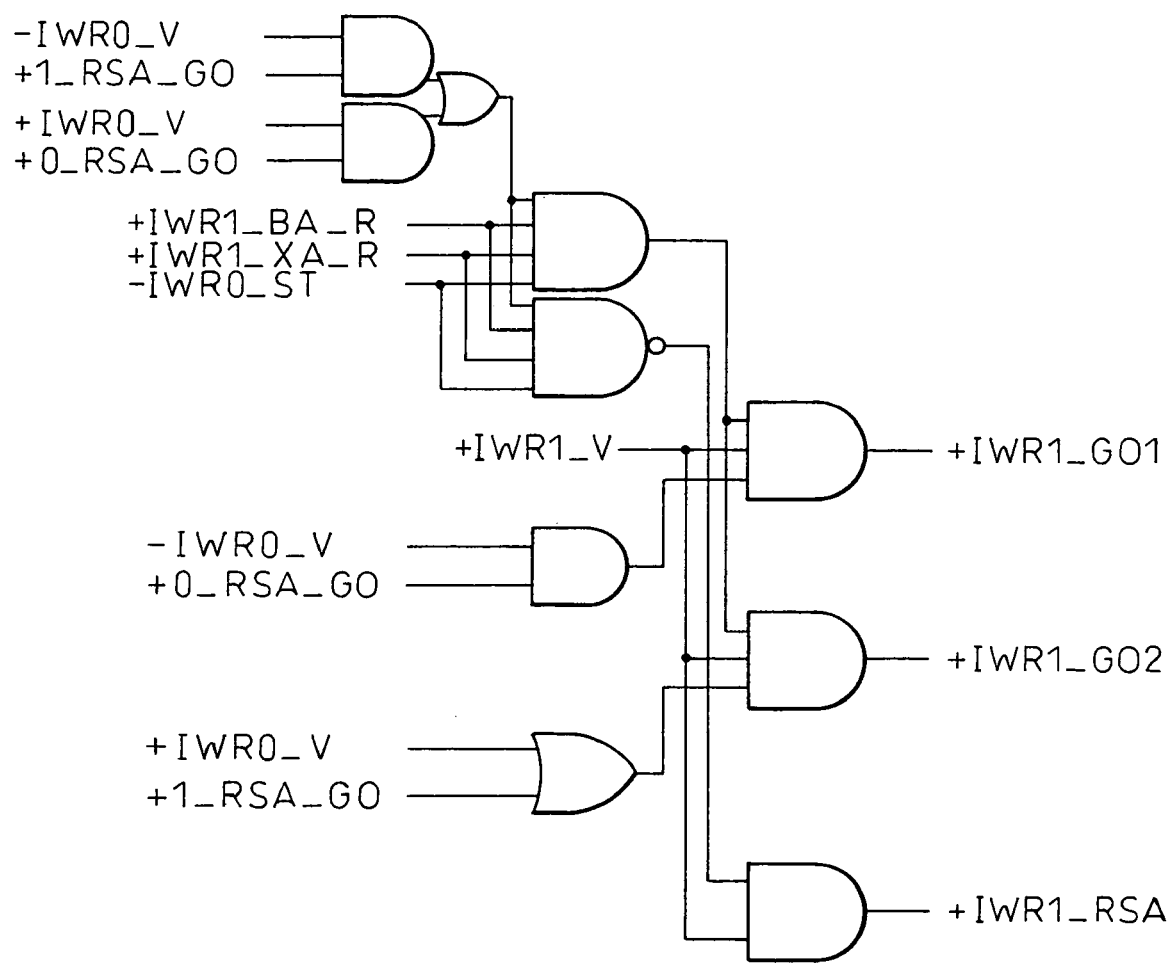
FIG. 36 is a view showing a constitutional example (2-2) of the selection circuit.
Figure 38:
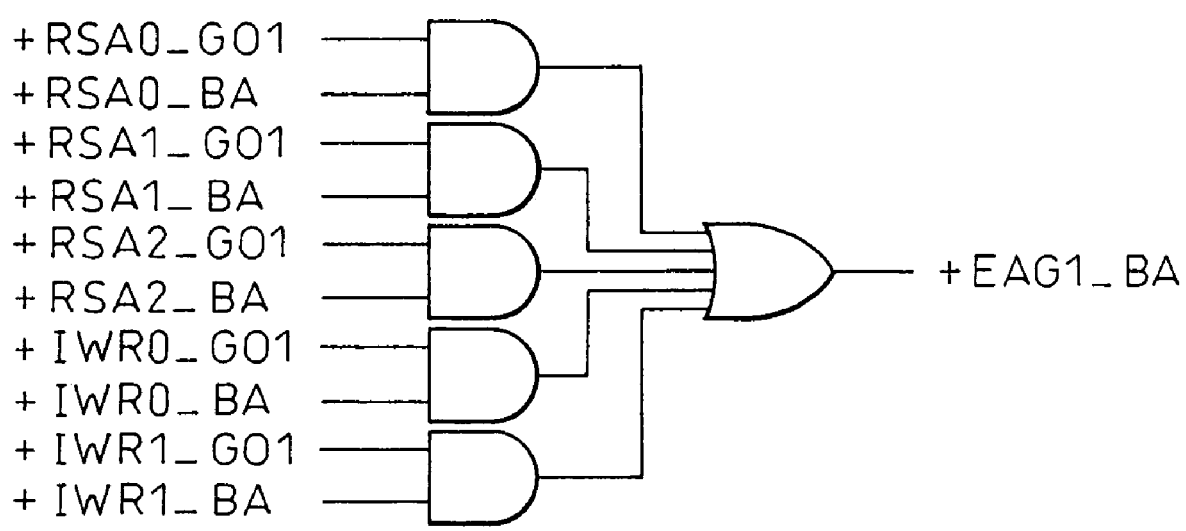
FIG. 38 is a view showing a constitutional example (2-2) of the selection circuit.

FIG. 36 shows an example of a decoder for realizing the above described logic. Further, FIG. 37 shows a logical table therefor. For example, IWR1 is issued to EAG1 (+IWR1_GO1) when IWR0 is not valid nor a STORE instruction (−IWR0_V, −IWR0_ST) and IWR1 is valid (+IWR1_BA_R, +IWR1_XA_R and +IWR1_V) and EAG1 and EAG2 are valid (+0_RSA_GO and +1_RSA_GO).

IWR1 is once stored into the reservation station 222 (+IWR1_RSA) in case of failing an issuance condition that: IWR1 is valid (+IWR1_V) but the address adders 225 and 226 are unusable (−0_RSA_GO, +1_RSA_GO); its source operand is unusable (−IWR1_BA_R, −IWR1_XA_R); and a preceding IWR0 is a STORE instruction the address calculation of which for the reservation station has not been completed (+IWR0_ST). Note, the decoding circuit in FIG. 38 functions identically with that in FIG. 29.

Figure 39:
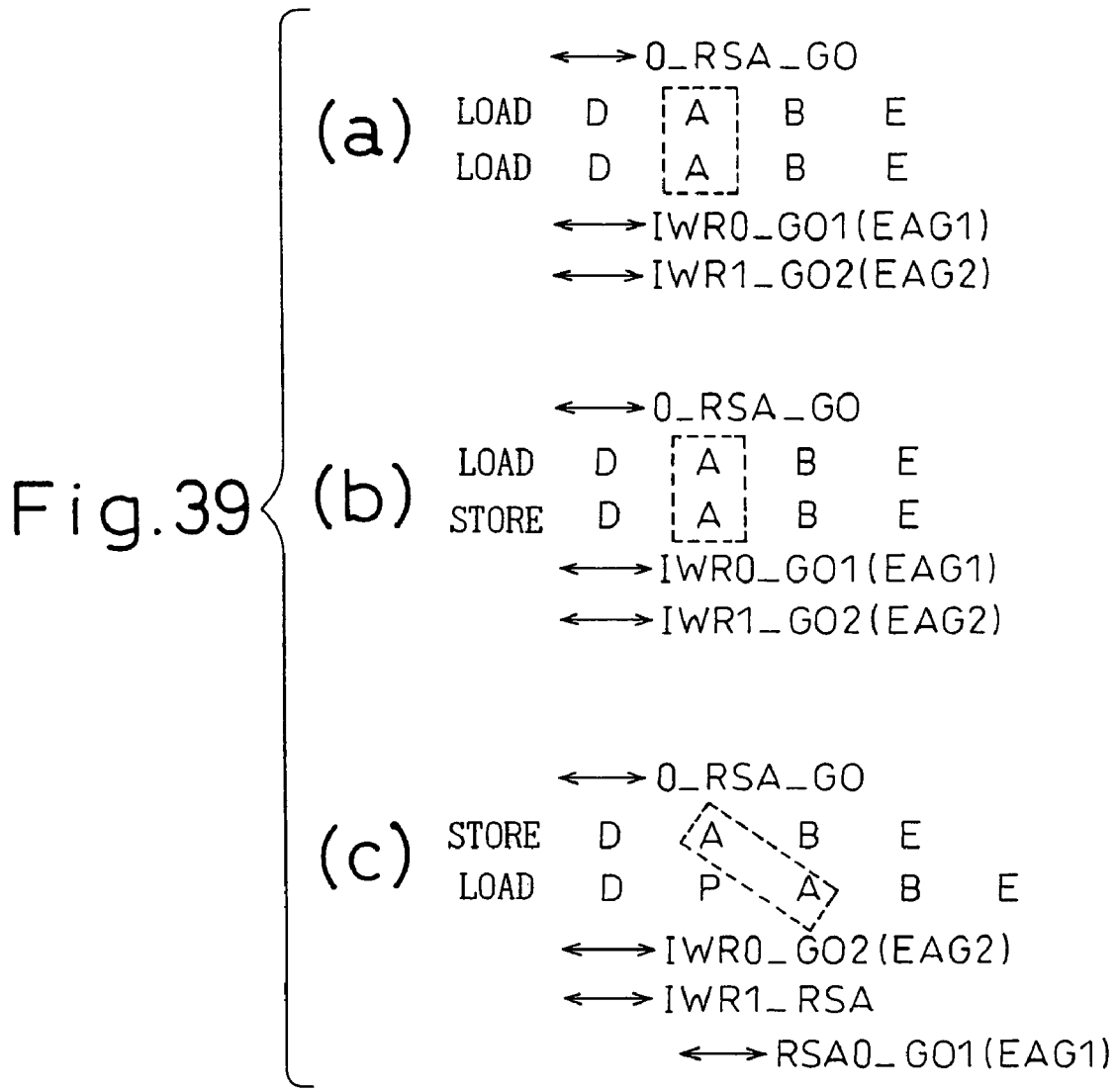
FIG. 39 is a view showing another example of time chart of execution of an operational instruction.

FIG. 39 shows an example of operational action of the instruction control device of FIG. 32.

(*a*) shows a situation where two LOAD instructions are simultaneously issued from the instruction register 221 to the address adders (EAG1) 225 and (EAG2) 226 (+IWR0_G01, +IWR1_G02). In this case, there are no address dependencies between these LOAD instructions, and two instructions are executed independently from each other.

(*b*) shows a situation where a preceding LOAD instruction (IWR0) and a succeeding STORE instruction (IWR1) are simultaneously issued to EAG1 and EAG2, respectively. Also in this case, there are no address dependencies between the preceding LOAD instruction and the succeeding instruction, so that two instructions are executed independently of each other.

(*c*) shows a situation where the preceding instruction is a STORE instruction (IWR0) and the succeeding instruction is a LOAD instruction. In this case, the preceding STORE instruction is issued to the EAG2 (+IWR0_G02), and the succeeding LOAD instruction (IWR1) is once stored in the reservation station 222 (+IWR1_RSA) at the same clock timing. Further, the LOAD instruction is issued from the reservation station 222 to the EAG1 (+RSAx_GO1) at the next clock timing. Thus, also in this case, there is not caused any address dependency due to store/fetch, similarly to that explained in FIG. 30.

According to the second embodiment as described above, there is permitted an execution of high speed calculation of a LOAD instruction following a STORE instruction, by controlling, with simple decoding means, a start time point of address calculation for an instruction issued from the reservation station, to thereby make an address calculation request not to get ahead of that of a preceding instruction.

There will be described hereinafter a third embodiment of the present invention. This embodiment corresponds to the aforementioned problem (3).

Figure 40:
FIG. 40 is a view showing an example of a conventional pipeline processing of instruction issuance and calculation execution.

FIG. 40 shows an example of a conventional pipeline processing of instruction issuance and calculation execution.

(*a*) shows an example of a basic pipeline processing via reservation station, wherein: a D cycle is an instruction decoding cycle; a P cycle is a cycle in which an instruction to be issued on the reservation station is selected; a B cycle is a source operand reading-out cycle; an X cycle is an operation execution cycle; and a U cycle is a register updating cycle.

According to (*a*), at the P cycle of an instruction 1, there is validated a source operand useable indication corresponding to a register number which the instruction 1 should update and, immediately at the next B cycle, there is issued an instruction 2 which uses the register as a source operand. The calculation result of the instruction 1 is forwarded to the instruction 2 as indicated by a dotted line, so that the instruction 1 and instruction 2 are successively pipeline processed.

(*b*) shows an example of operational processings which have the numbers of cycles for calculation, different from each other. Here, four calculation execution cycles (X1 through X4) are required for floating-point multiplication. Meanwhile, two calculation execution cycles (X1 and X2) are required for floating-point addition. In a case that such calculations having calculation execution cycles different from each other are pipeline processed, there has been conventionally performed the following processing.

Namely, assuming that the source operand useable indication is validated always at the P cycle, in case that a preceding instruction executes an instruction such as a floating-point multiplication having longer operation cycles, there has been performed such a processing that the starting of calculations of succeeding instructions are collectively held or stopped and the calculation result of the instruction having longer operation cycles is later forwarded to the succeeding instructions at predetermined timings, respectively. In the example of (b), at the fourth execution cycle X4 where the preceding multiply instruction is completed, the calculation result thereof is forwarded to the succeeding ADD instruction.

As a result, in the conventional pipeline processing, there is a problem in that instruction issuances after a multiply instruction are equally delayed. This problem has also acts as a factor which considerably reduces an operation efficiency of a product sum operation in which multiplication and addition are frequently repeated, like a scientific calculation. Inherently, instructions should be executed independently from one another as shown in (b') when no register interferences exist in an information processing in which an out-of-order instruction execution is allowed, except for such a situation that an register interference exists between instructions.

Figure 41:
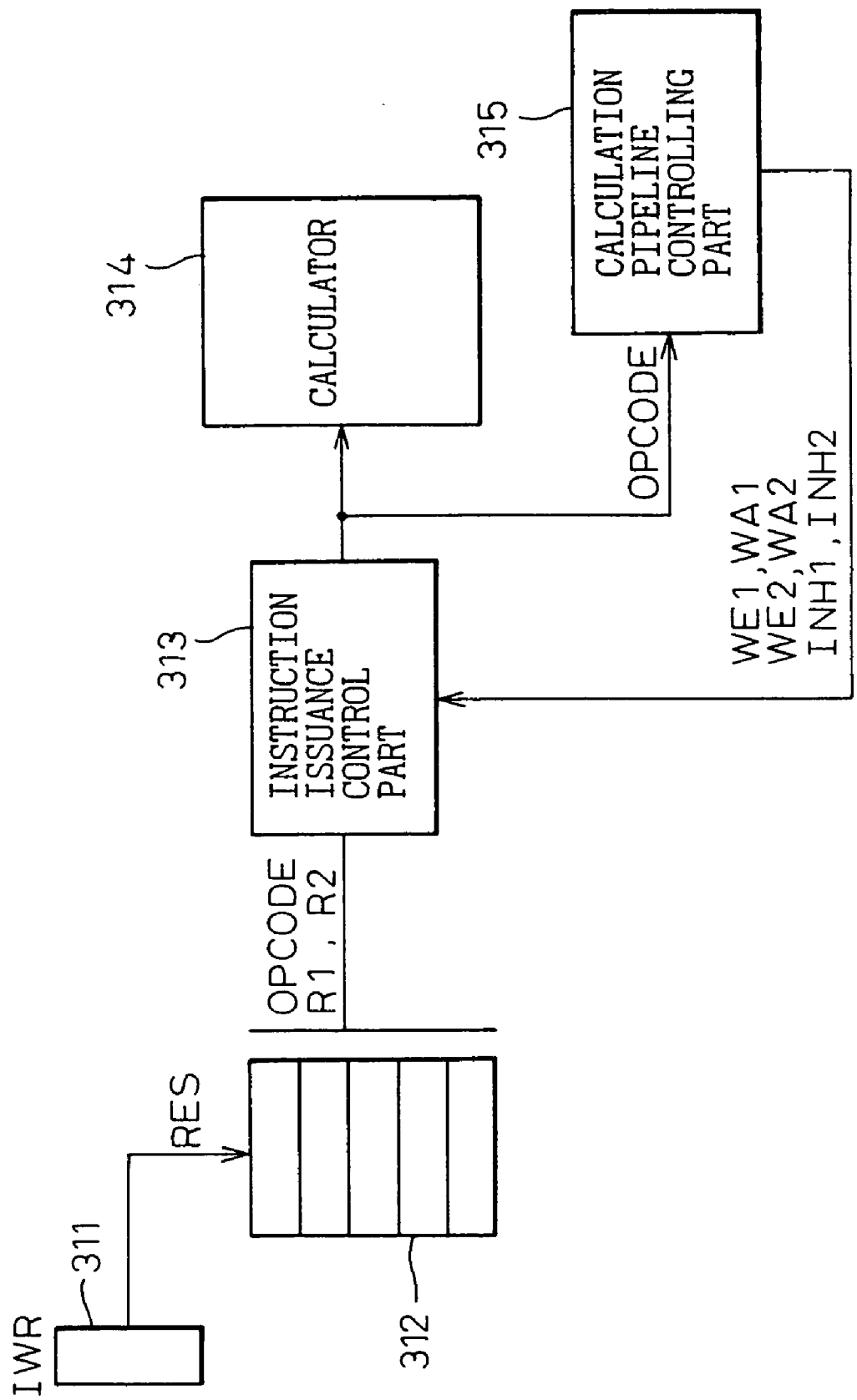
FIG. 41 is a view showing an example of basic constitution of an instruction control device according to a third embodiment of the present invention.

FIG. 41 shows an example of a basic constitution of an instruction control device according to a third embodiment of the present invention.

In FIG. 41, instruction register (IWR) 311 fetches an instruction from an instruction cache (not shown), and the decoded instruction is stored into a reservation station (RES) 312. Those instructions, which have been brought to be useable, on the respective entries of the reservation station 312, are successively selected by an instruction issuance control part 313 and issued to an operator 314.

The issued instruction (OPCODE) is also simultaneously sent to an operation pipeline controlling part 315. The operation pipeline controlling part 315 generates, based on the issued instruction, source operand usability indication update controlling signals (WE1, WA1, WE2, WA2) and instruction issuance inhibition signals (INH1, INH2) for a succeeding instruction, and returns these signals to the instruction issuance control part 313. The instruction issuance control part 313 in turn appropriately controls an issuance timing of the succeeding instruction based on a type of the preceding instruction, making use of the source operand usability indication update controlling signal and the instruction issuance inhibition signal. There will be described hereinafter constitutional elements for realizing the present invention.

Figure 42:
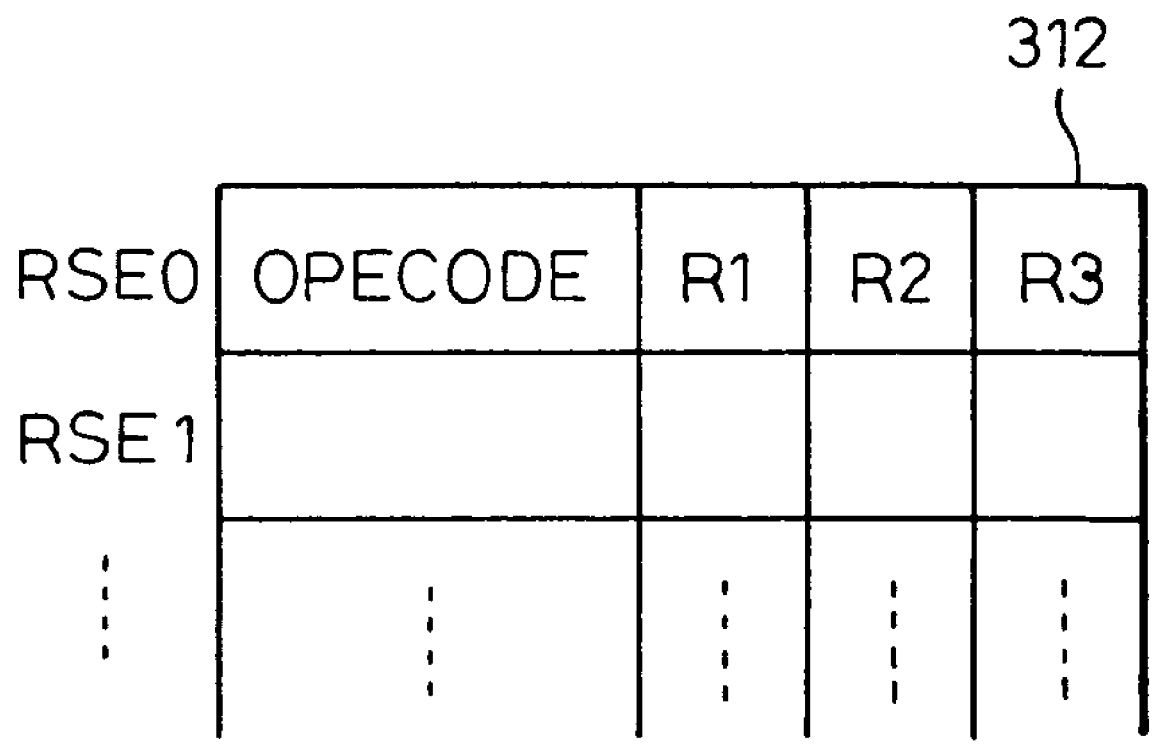
FIG. 42 is a view showing a constitutional example of the reservation station.

FIG. 42 shows a constitutional example of the reservation station 312 of FIG. 41.

In FIG. 42, those instructions decoded by the instruction register 311 are successively stored into the respective entries (RSE0, RSE1, . . . ) of the reservation station 312. As to each entry, OPCODE is a code part indicating a type of calculation, and each of R1 and R2 indicates source register number and R3 indicates a writing register number.

Figure 43:
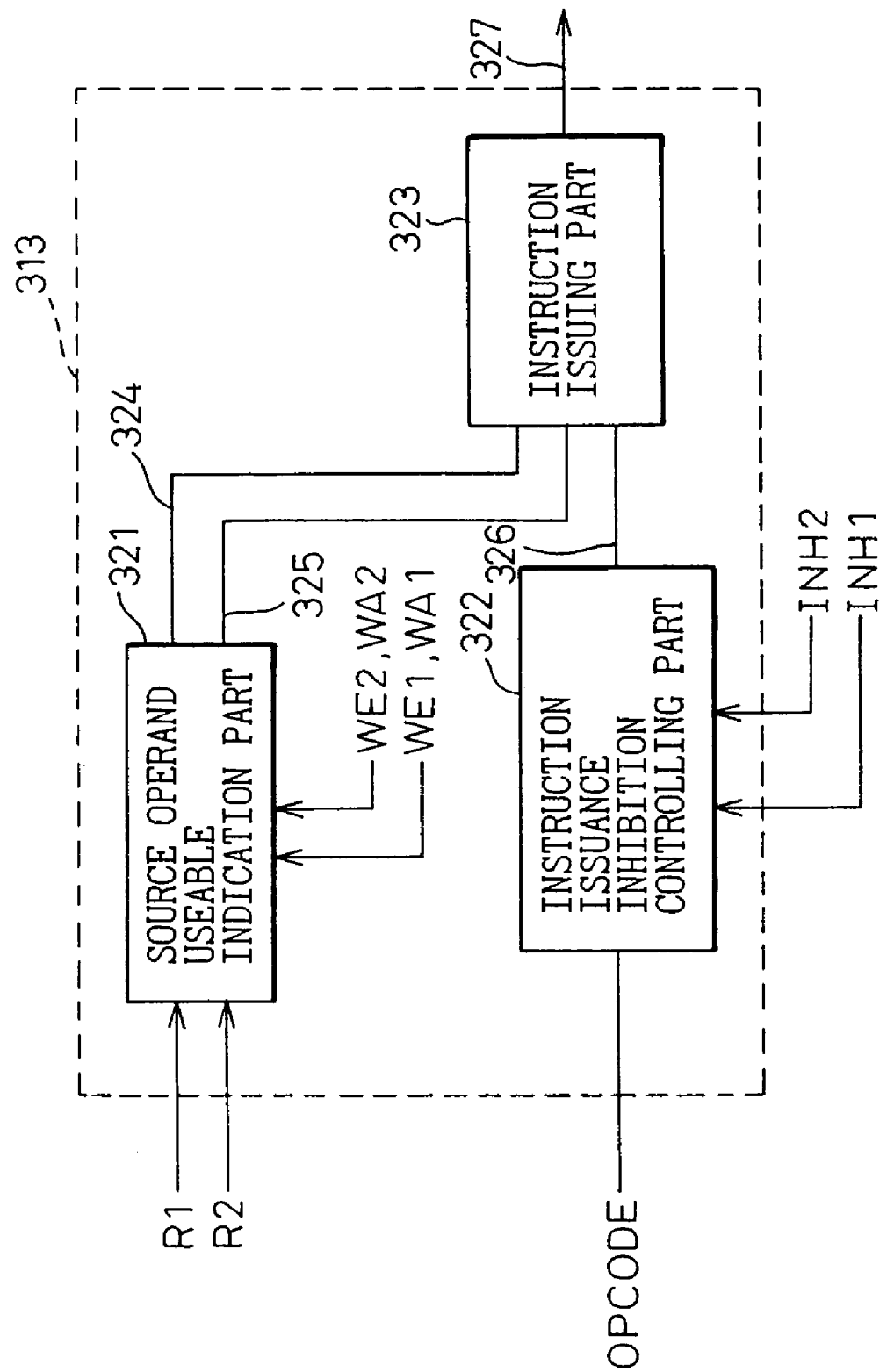
FIG. 43 is a view showing a constitutional example of an instruction issuance control part.

FIG. 43 shows a constitutional example of the instruction issuance control part 313 of FIG. 41.

As shown in FIG. 43, the instruction issuance control part 313 includes a source operand useable indication part 321, an instruction issuance inhibition controlling part 322, and an instruction issuing part 323. The source register numbers R1, R2 issued from entries on the reservation station 312 are supplied to the source operand useable indication part 321, and its OPCODE is issued to the instruction issuance inhibition controlling part 322.

The source operand useable indication part 321 outputs a useable/unusable signal 324 for the source register number R1 and a useable/unusable signal 325 for the source register number R2, which signals 324, 325 being found by referring to a source operand useable indication table provided within the source operand useable indication part 321. The instruction issuance inhibition controlling part 322 outputs a signal 326 instructing issuable/inhibition of the given OPCODE. The instruction issuing part 323 outputs a signal 327 indicating that the instruction is issuable, when the source register R1, R2 are useable and the OPCODE is issuable, i.e., based on the logical product of the above described signals 324 through 326.

The outputs of the signals 324 through 326 are controlled by a signal provided by the operation pipeline controlling part 315 of FIG. 41. The operation pipeline controlling part 315 generates update timing signals (WE1, WE2) including update register addresses (WA1, WA2) based on the issued instruction, to thereby update the source operand useable indication table of the source operand useable indication part 321 in the instruction issuance control part 313. Similarly, the operation pipeline controlling part 315 generates instruction issuance inhibition signals (INH1, INH2) depending on the instruction based on the precedingly issued instruction, and the instruction issuance inhibition controlling part 322 thereby controls an issuance inhibition timing of the succeeding instruction.

Figure 44:
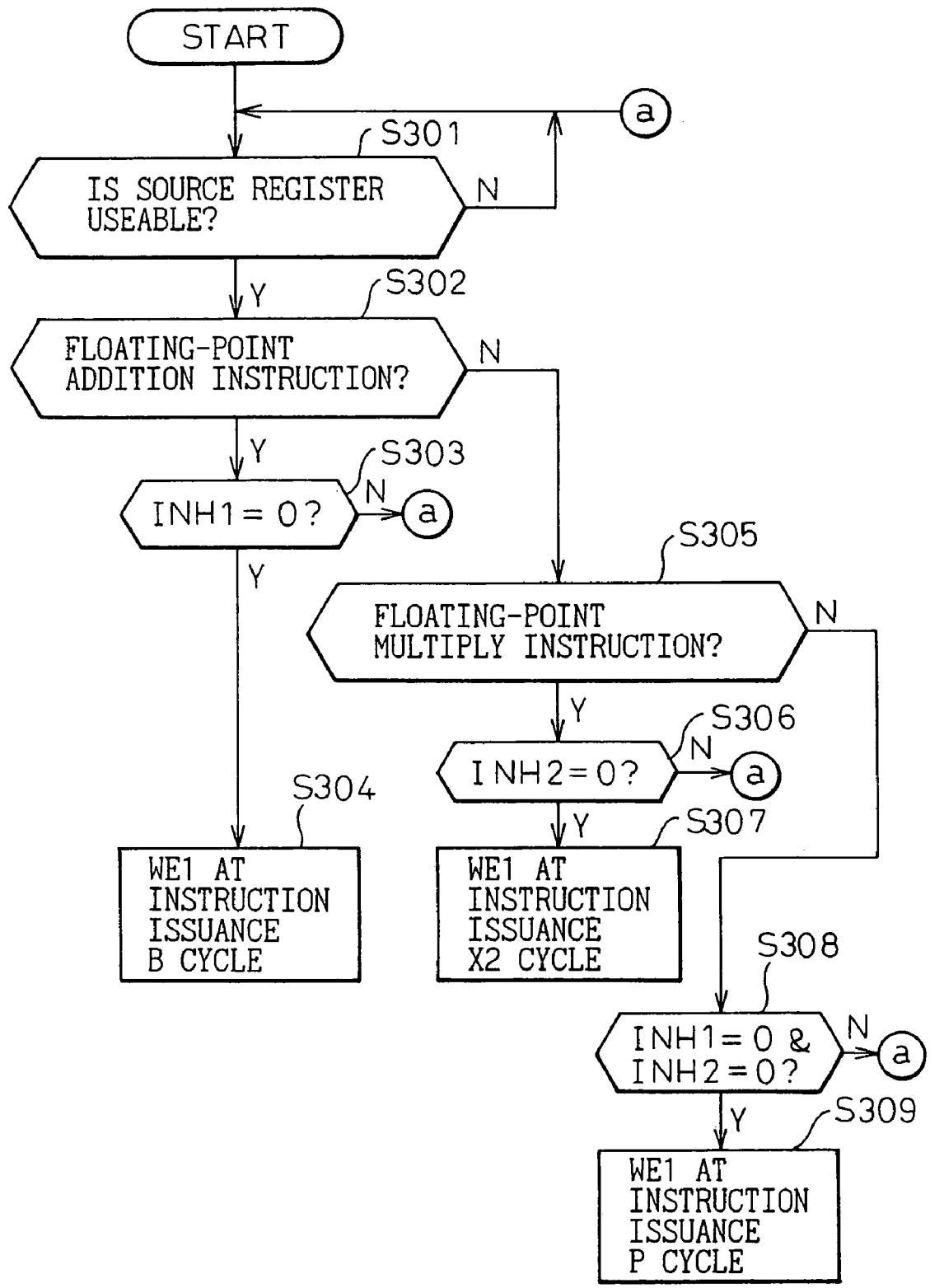
FIG. 44 is a view showing an example of an instruction issuance control flow of the instruction issuance control part.

FIG. 44 shows an example of an instruction issuance control flow of the instruction issuance control part 313.

At step S301 of FIG. 44, selected as an issuance target is that instruction the source register of which is useable, among those decoded instructions stored within the reservation station 312. Next, it is judged whether the selected instruction is a floating-point addition instruction (step S302). If it is the case, there is judged presence/absence of the instruction issuance inhibition signal INH1 (step S303).

If INH1=1, the issuance of the instruction is inhibited until INH1 becomes INH1=0, and the instruction is issued at the time when INH1 becomes INH1=0. Further, the operand useable indicating table is updated at the B cycle of the issued floating-point addition instruction (step S304). If INH1=0, succeeding floating-point addition instruction is issued immediately after the P cycle of an issued preceding instruction, as conventional.

If the selected instruction is a floating-point multiply instruction, there is judged presence/absence of an instruction issuance inhibition signal INH2 which inhibits issuance of multiplication (steps S305 and S306). If INH2=1, the instruction is inhibited until INH2 becomes INH2=0, and the instruction is issued at the time when INH2 becomes INH2=0. Further, the operand useable indicating table is updated at the X2 cycle of the issued floating-point multiply instruction (step S307). If INH2=0, succeeding floating-point multiply instruction is issued immediately after the P cycle of an issued preceding instruction, as conventional.

In case that the selected instruction is an instruction (1 cycle operation instruction) other than a floating-point addition instruction and a floating-point multiply instruction, such an instruction is issued immediately after a P cycle of a preceding instruction at the time INH1=0 and INH2=0, as conventional. Further, there is updated the operand useable indicating table at P cycle of that issued instruction (steps S308 and S309). When INH1=1 or INH2=1, the succeeding instruction issuance is inhibited until INH1 and INH2 become INH1=0 and INH2=0 (step S308).

Figure 45:
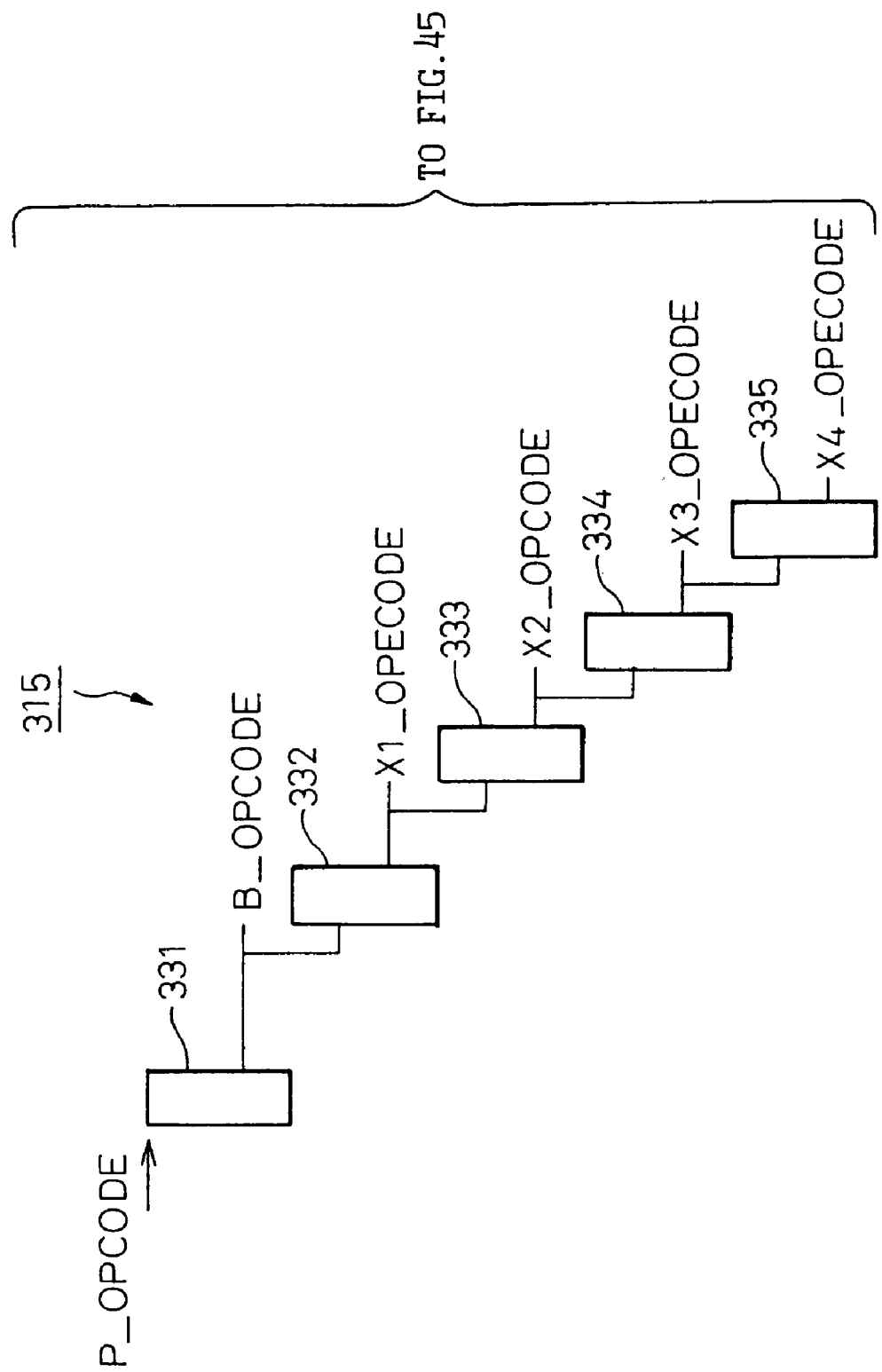
FIG. 45 is a view showing a constitutional example (1) of an operation pipeline controlling part.
Figure 46:
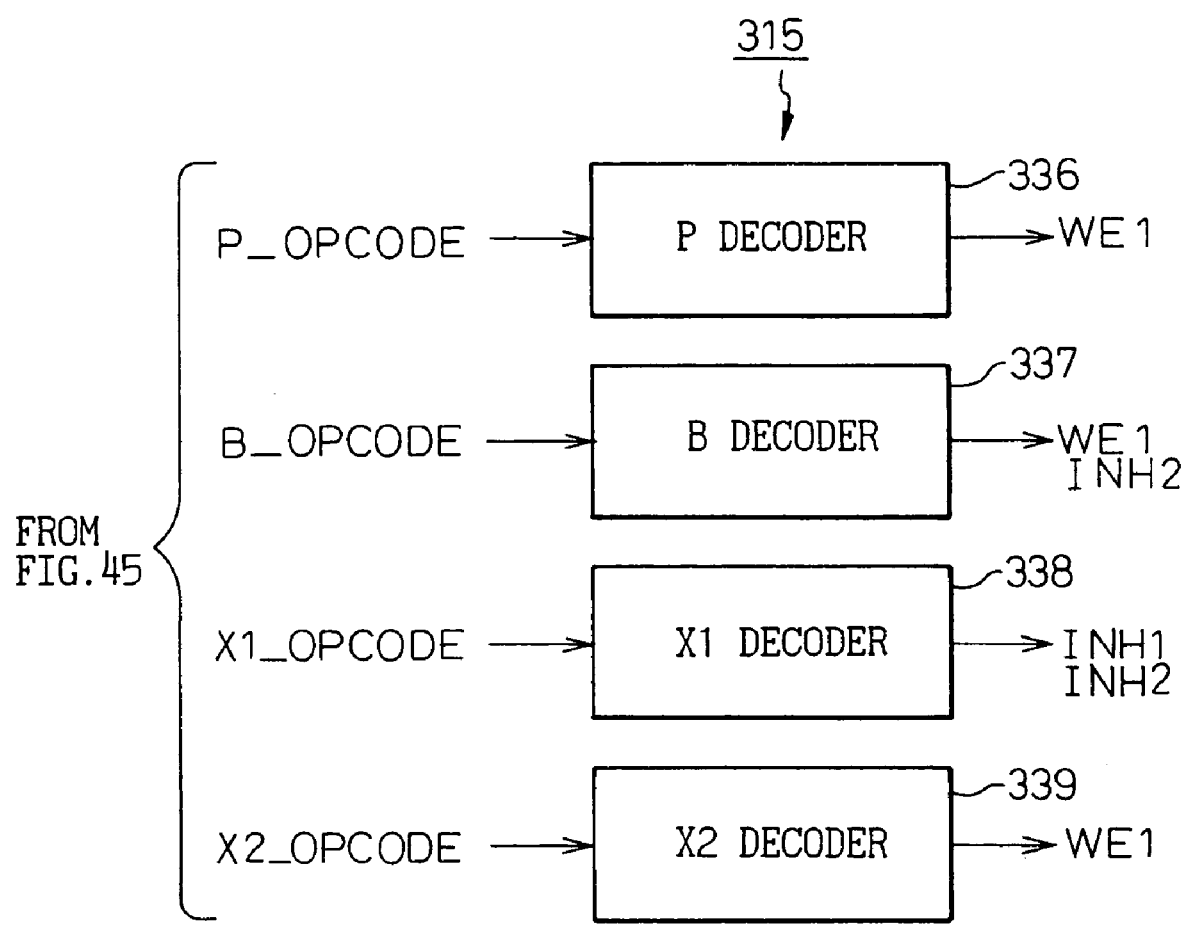
FIG. 46 is a view showing a constitutional example (2) of an operation pipeline controlling part.

FIGS. 45 and 46 show a constitutional example of the operation pipeline controlling part 315 of FIG. 41.

In FIG. 45, the OPCODE issued by the instruction issuance control part 313 is sequentially shifted to respective registers 331 through 335 corresponding to instruction cycles (P, B, X1, X2, . . . ) of the instruction. Further, there are generated update timing signals (WE1, WE2) and instruction issuance inhibition signals (INH1, INH2) corresponding to the type of the issued instruction, by decoders provided for the registers 331 through 335, respectively. Writing register number R3 (not shown) is also held in a shift-register, so as to appropriately generate update register addresses (WA1, WA2).

Concretely, as shown in FIG. 46, the issued instruction (OPCODE) inputted into the P_OPCODE register 331 is decoded by a P decoder 336 at a P cycle, and, if the instruction is a 1 cycle operational instruction, there is outputted an update timing signal WE1 (step S309 of FIG. 44). Next, at a B cycle, the issued instruction shifted from the P_OPCODE register 331 to the B_OPCODE register 332 is decoded by a B decoder 337, and there is outputted an update timing signal WE1 when the instruction is a floating-point addition instruction (step S304 of FIG. 44), or there is outputted an instruction issuance inhibition signal INH2 when the instruction is a floating-point multiply instruction.

The shift and decoding actions at the subsequent instruction cycles are similar to the above, and at an X1 cycle, there are outputted instruction issuance inhibition signals INH1 and INH2 by an X1 decoder 338 in case of a floating-point multiply instruction. Further, at an X2 cycle, there is outputted an update timing signal WE1 by an X2 decoder 339 in case of a floating-point multiply instruction (step S307 of FIG. 44).

In this way, there is conducted an arbitration upon using a commonly used output register, by generating an inhibition timing for an instruction issuance corresponding to each calculation such as addition and multiplication, so that calculations by operators can be performed simultaneously and in parallel. Further, it becomes possible to appropriately forward calculation execution results to succeeding instructions at different timings, by combining a designation of source operand useable and an inhibition timing upon using an output register, for each group of operators for each calculations.

Figure 47:
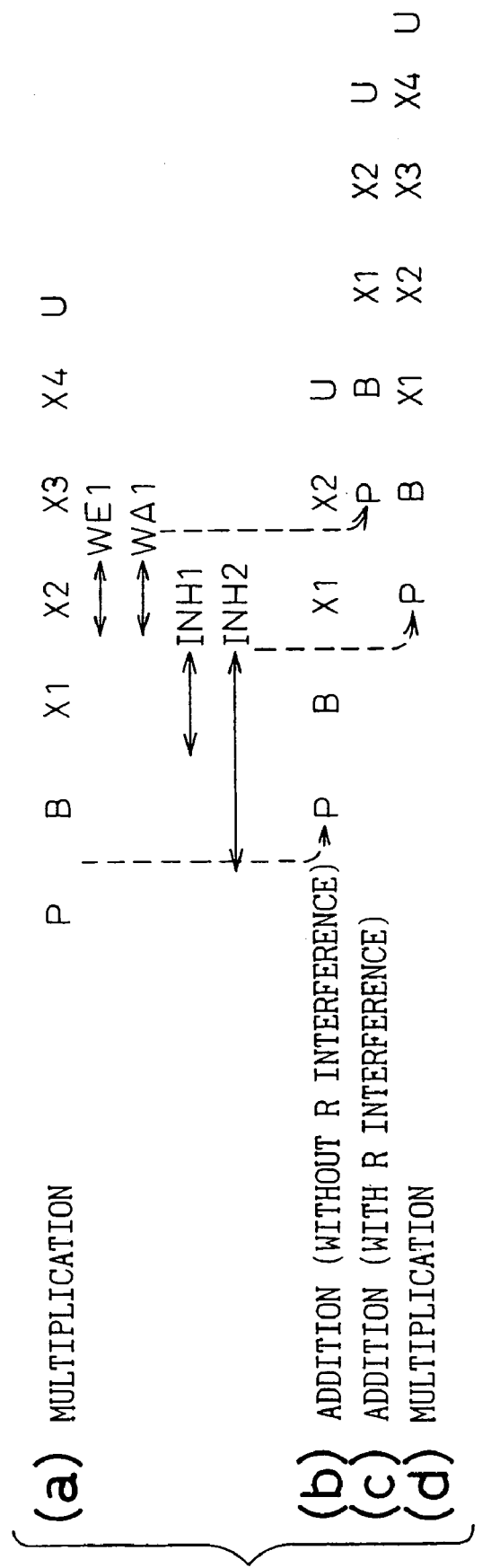
FIG. 47 is a view showing an example of an action time chart of a succeeding instruction following a floating-point multiply instruction.

FIG. 47 shows, as an example of an explanation of the above, an action time chart of a succeeding instruction following a floating-point multiply instruction.

(*a*) shows a situation where a floating-point multiply instruction is inputted into the operation pipeline controlling part 315 as explained in FIGS. 45 and 46 and the instruction is decoded by respective registers, INH2 for inhibiting issuance of multiplication is outputted at B and X1 cycles, INH1 for inhibiting issuance of addition is outputted at X1 cycle, and update timing and address signals WE1 and WA1 for indicating source operand useable are outputted at X2 cycle.

(*b*) shows an example of action in case that the issued floating-point multiply instruction and the succeeding floating-point addition instruction have no register interferences therebetween. Although processing of a succeeding instruction has been equally delayed in the conventional, a succeeding ADD instruction becomes issuable at a B cycle after a P cycle of multiplication in this embodiment if no register interferences exist.

Meanwhile, (*c*) shows an example of action of a preceding multiply instruction and a succeeding ADD instruction having a register interference therebetween. In this case, instruction issuance becomes possible at X3 cycle after X2 cycle at which an operand useable indicating table is updated by a preceding multiply instruction. Thus, this case is identical with that conventional case where updating has been equally delayed (see (*b*) of FIG. 40).

(*d*) shows a case where a succeeding instruction following a preceding floating-point multiply instruction is also a floating-point multiply instruction. In this case, there is issued an instruction at an X2 cycle just after INH2 has become INH2=0. This is to avoid the resources of a multiplier overlapping with each other to interfere with each other. Although instruction issuance is equally performed at an X3 cycle in the conventional device, there is appropriately performed a forwarding processing 1 instruction cycle earlier, in this case.

As described above, the instruction issuance control part 313 obtains information (update information of register, and delay processing timing information) concerning a preceding instruction from the operation pipeline controlling part 315, and appropriately controls issuance timing based thereon. Thus, it becomes possible to commonly use input and output registers and to minimize a delay between operational processings having numbers of necessary cycles different from each other, to thereby perform high speed pipeline processing.

There will be described hereinafter a fourth embodiment of the present invention. This embodiment corresponds to the above described problem (4).

Figure 48:
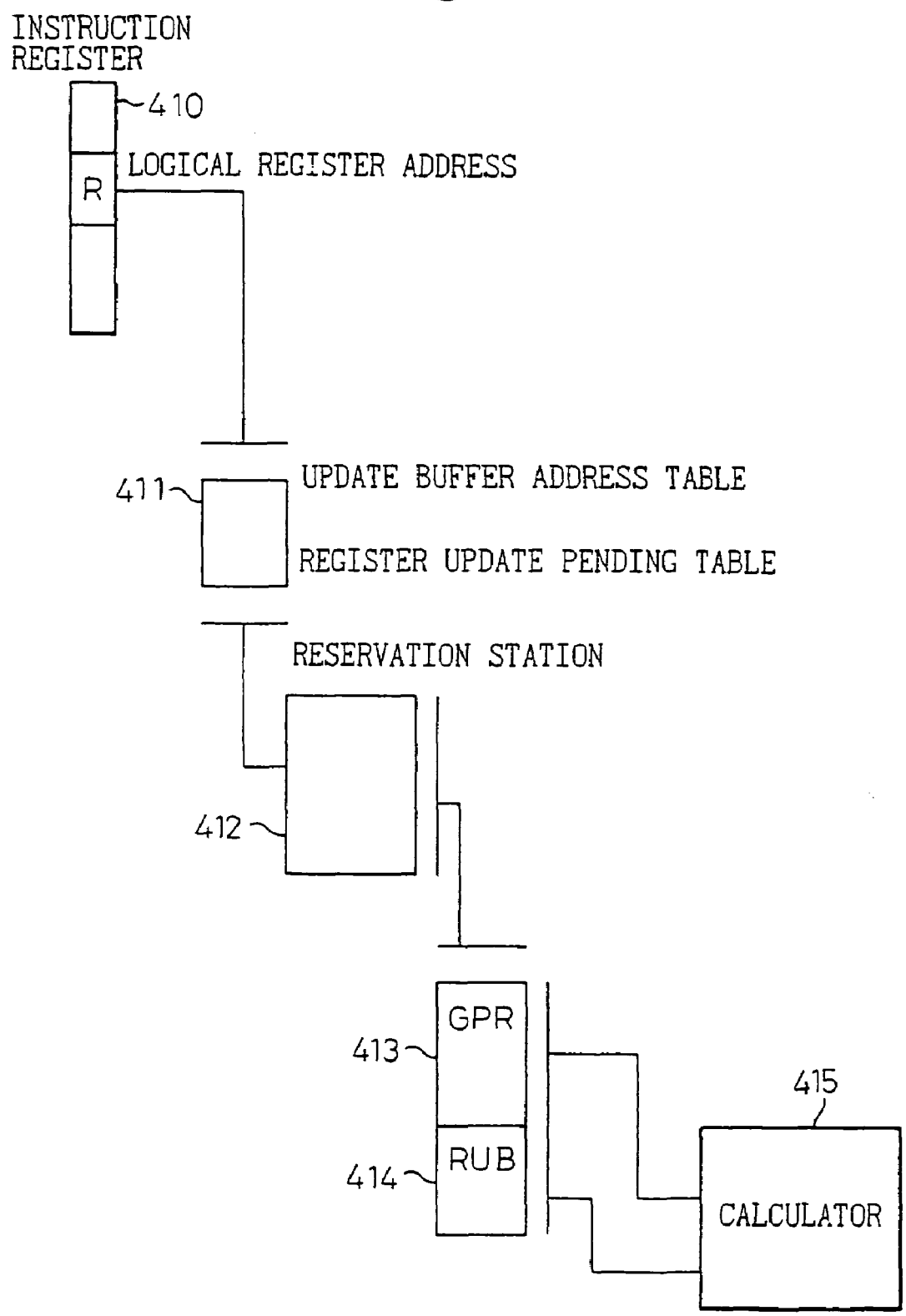
FIG. 48 is a view showing an example of a conventional register renaming technique.

FIG. 48 shows an example of a conventional register renaming technique.

In FIG. 48, in case that an instruction fetched by an instruction register 410 via instruction cache (not shown) is one for updating a content of a logical register R, there is allocated a register update buffer (RUB) 414 instead of the logical register R. For such allocation, an update buffer address table and a register update pending table 411 are looked up, based on a logical register address on the instruction register 410.

The former update buffer address table is stored with addresses of register update buffers 414 corresponding to general purpose registers (GPR's), and the latter register update pending table 411 is stored with register update pending bits each of which indicates usage of one of the general purpose register and the allocated register update buffer. As a result of the above looking up, there are read out an address of update buffer corresponding to a logical register R and an update pending designation, and these address and designation are registered on a reservation station 412 at the next stage.

Upon issuance of instruction to an operator 415, the reservation station 412 designates one of general purpose register (GPR) 413 and register update buffer (RUB) 414, as an operand to be used for a calculation, in accordance with the update pending designation.

Figure 49:
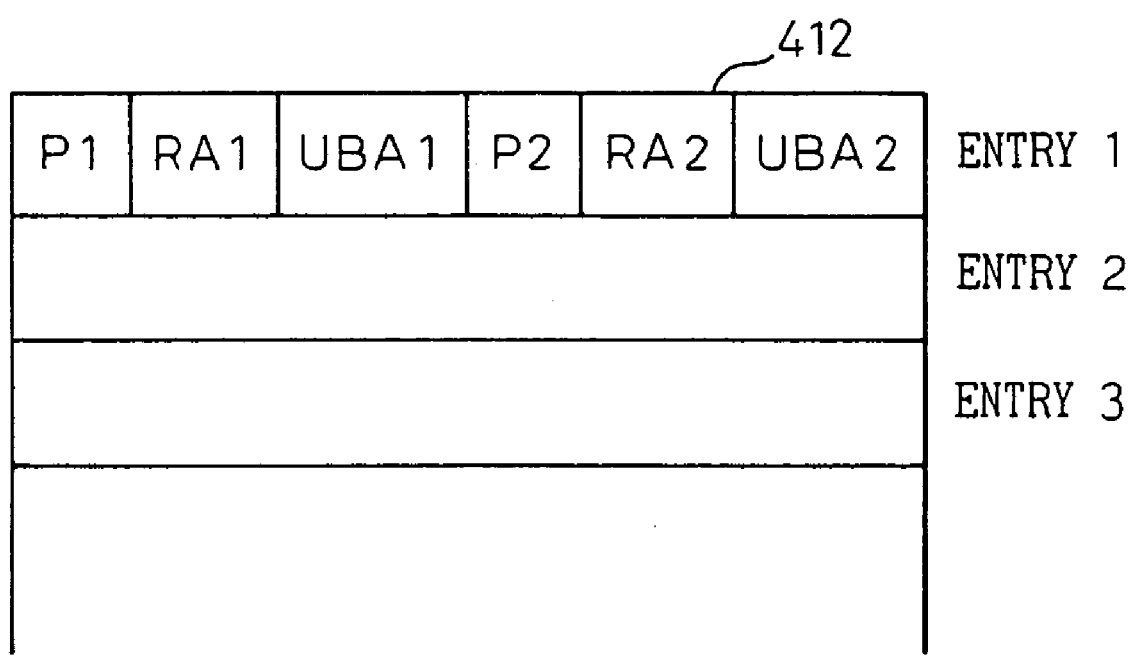
FIG. 49 is a view showing a constitutional example of an operand part of the reservation station.

FIG. 49 shows a constitutional example of an operand part of the reservation station 412.

In FIG. 49, entries 1 through 3 of the reservation station 412 are stored with instructions to be issued toward the operator 415, respectively. First operand of the entry 1 comprises an update pending designation (P1), a register address (RA1), and an update buffer address (UBA1). Similarly, second operand comprises PA2, RA2 and UBA2. Here, RA1 is read out when P1 is ON (=1), and UBA1 is read out when P1 is OFF (=0).

Meanwhile, without being limited to a register, it is necessary to guarantee that a memory content is also updated and referred to in a programmed order. As such, fetch access to a cache memory is conventionally delayed until data is stored into the cache memory, resulting in problematic reduction of an operation performance.

Figure 50:
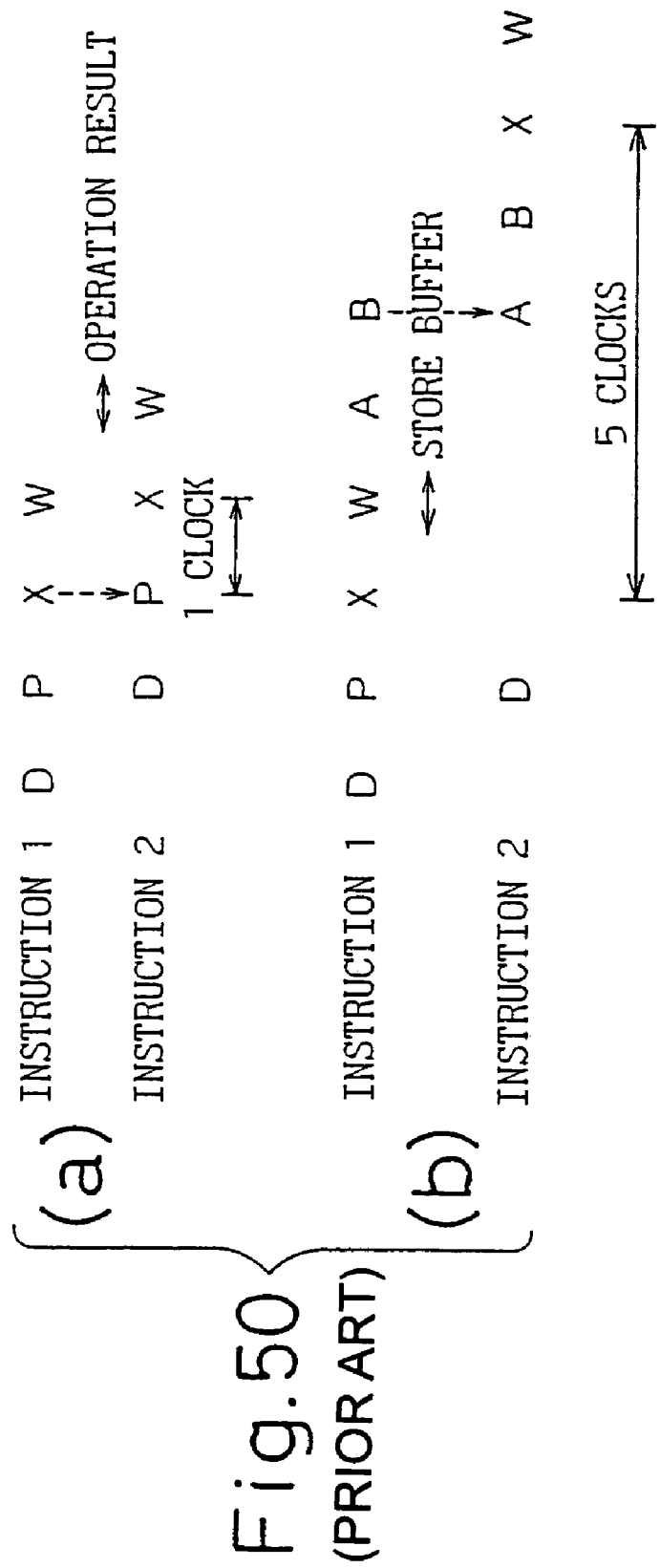
FIG. 50 is a view showing an example of a conventional operational instruction time chart.

FIG. 50 shows an example of a conventional operational instruction time chart.

(a) shows an example of an inter-register-register instruction, and (b) shows an example of an inter-register-memory instruction. Here, a D cycle is an instruction decoding cycle, a P cycle is a register reading out cycle, an X cycle is a calculation execution cycle, and a W cycle is a storing cycle.

Instruction 1 of (a) is a register storing instruction, and its operation result is stored into an update buffer at the W cycle. Next, as to a register reading-out instruction of the instruction 2, the operation result at X cycle of the instruction 1 is immediately read out by the instruction 2 by making use of forwarding processing as indicated by an arrow headed dotted line. In this way, no delays will be caused in a pipeline operation processing even when an update register and a reading-out register interfere with each other.

Instruction 1 of (b) is a memory STORE instruction. At a W cycle, data is stored into a store buffer. At the following A cycle, an address of a cache RAM is set, and at the next B cycle the data is written into the cache RAM. In a memory reading-out instruction as instruction 2, source data is required to be fetched based on the memory address stored in the instruction 1, so that four more clocks are required for the operation execution as compared with the inter-register-register instruction of (a).

Figure 51:
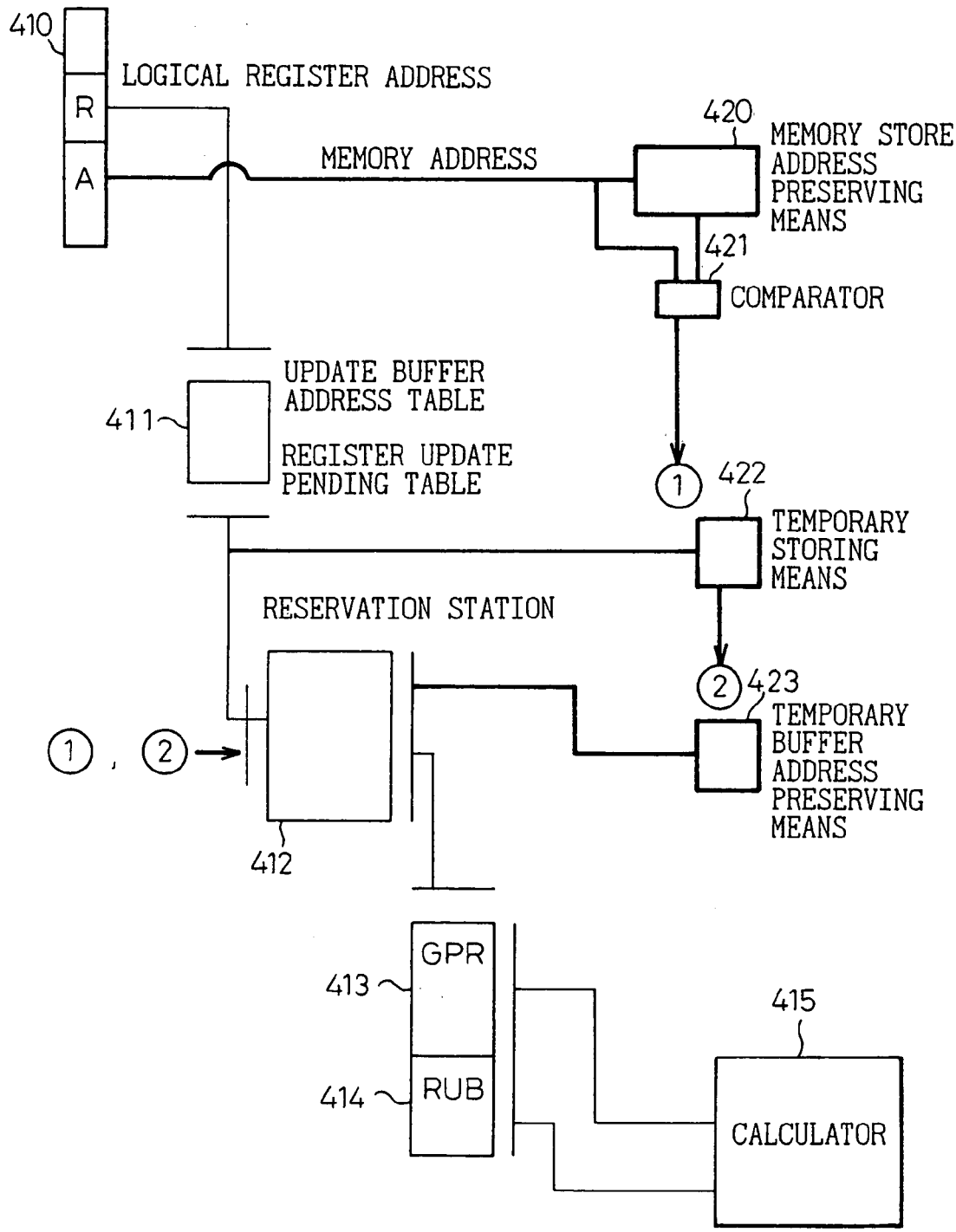
FIG. 51 is a view showing a basic constitution of an instruction control device according to a fourth embodiment of the present invention.

FIG. 51 shows a basic constitution of an instruction control device according to the present invention.

Figure 52:
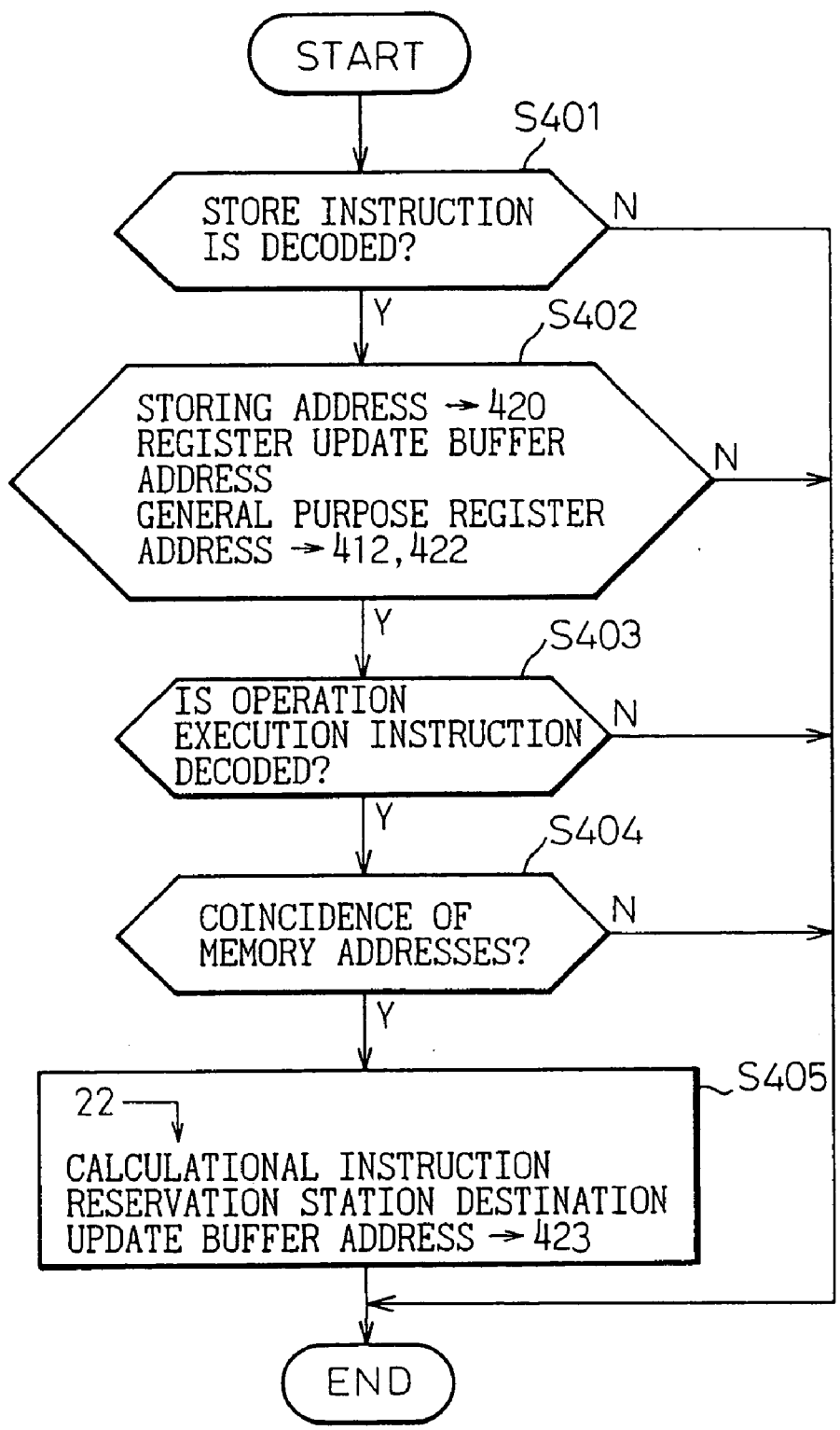
FIG. 52 is a view showing an action flow of the instruction control device of FIG. 51.

FIG. 52 is an action flow of the instruction control device of FIG. 51.

FIG. 51 shows those parts different from the conventional example of FIG. 48, in thick lines. There will be hereinafter described an action of the instruction control device according to the present invention, mainly about the thick lined parts. Further, step numbers in FIG. 52 accompany their corresponding descriptions hereinafter, respectively.

Upon decoding a memory STORE instruction (STORE instruction) at the instruction register 410 (step S401), memory address part A of data store destination is stored into memory store address preserving means 420. Further, there are looked up the update buffer address table and the register update pending table 411 for register renaming, based on an address of the logical register R of data storing source; and the corresponding update pending designation (P1), general purpose register address (RA1) and update buffer address (UBA1) are stored into the reservation station 412. Simultaneously therewith, the above described P1, RA1 and UBA1 are stored into temporary storing means 422 (step S402).

Thereafter, upon decoding a succeeding memory operation instruction (such as memory-register ADD instruction) at the instruction register 410 (step S403), the memory address of its memory address part is compared with a memory address A of a destination preserved by the memory store address preserving means 420, making use of a comparator 421. Upon coincidence therebetween, the comparator 421 outputs a coincidence signal ① (step S404).

By the output of the coincidence signal ①, the corresponding operand in the memory operation instruction entry on the reservation station 412 is copied (②) with a content (P1, RA1 and UBA1) stored in the temporary storing means 422, instead of an update buffer address for storing data to be fetched by a succeeding memory operation instruction from an applicable memory address. Simultaneously therewith, the store destination update buffer address is sent to update buffer address preserving means 423. This update buffer address preserving means 423 generates a controlling signal for controlling fetch data not to update the update buffer (step S405). The details of action of the update buffer address preserving means 423 will be described later.

According to the constitution of the present invention as described above, the content of a general purpose register (i.e., corresponding update buffer) for preserving a source data to be stored into a predetermined memory address in a STORE instruction as a preceding instruction, is substituted for fetch access to a content of the same memory address by a succeeding memory operation instruction. As a result, according to the present invention, an inherently inter-register-register instruction is substituted by an inter-register-register instruction, thereby enabling a high speed pipeline operation making use of a forwarding processing between registers as shown in (a) of FIG. 50.

Figure 53:
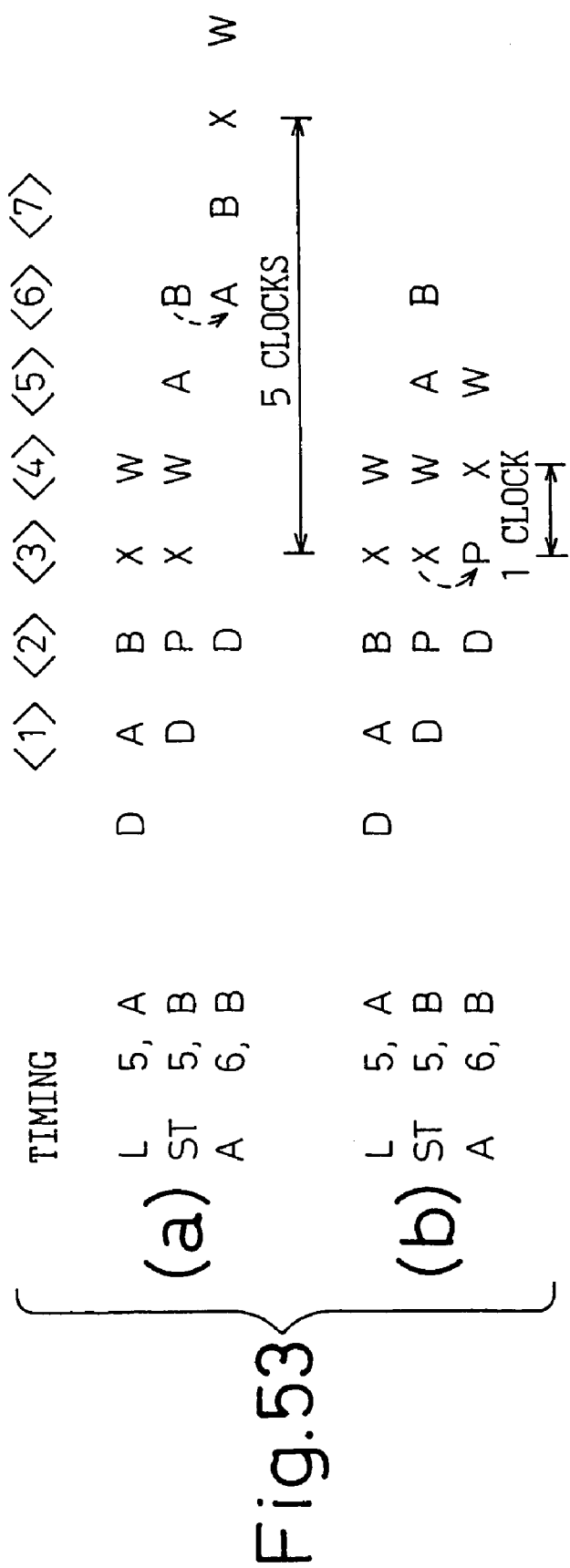
FIG. 53 is a view showing a first example of instruction control action (an inter-register-memory instruction)

FIG. 53 and figures thereafter show an embodiment of the present invention.

Here, there is shown an example of a first instruction control action (an inter-register-memory instruction) in this embodiment.

(b) of FIG. 53 shows an example of action according to the present invention, while (a) shows a conventional example which performs the same action, for comparison with the present invention.

In FIG. 53, content of a memory address A is loaded into a general purpose register 5 by a LOAD instruction (L 5,A). By a following STORE instruction (ST 5,B), content of the general purpose register 5 is stored into a memory address B. Finally, by an ADD instruction (A 6,B), content of a general purpose register 6 and the content of the memory address B are added with each other, and the result is written into the same general purpose register 6.

In the conventional example of (a), a succeeding instruction cannot take out a fetch data from a memory unless after the timing 6 where the result of the STORE instruction has been reflected to the memory. Contrary, in (b), the operation result of the STORE instruction can be immediately used, by forward-processing the operation result.

Figure 54:
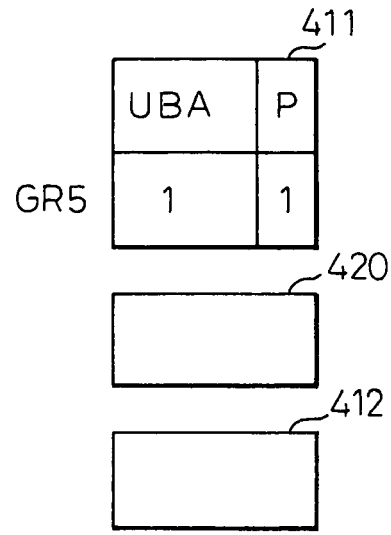
FIG. 54 is a view showing a data setting example at timing 1 of (b) of FIG. 53.
Figure 55:
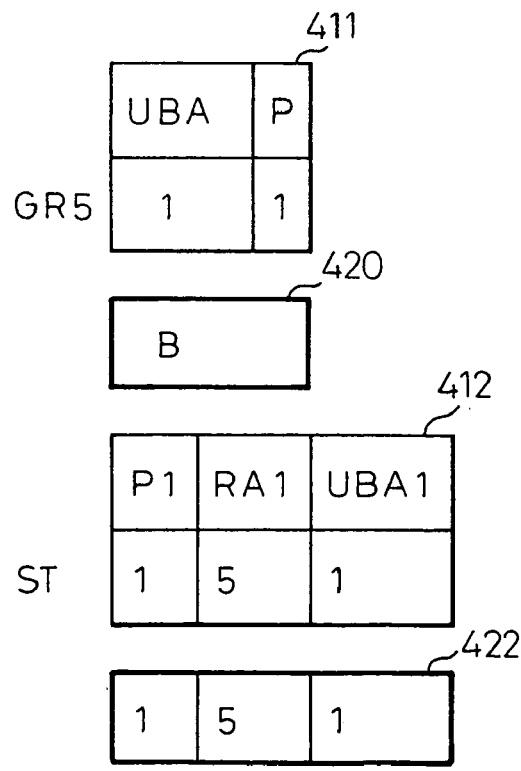
FIG. 55 is a view showing a data setting example at timing 2 of (b) of FIG. 53.
Figures 56, 57:
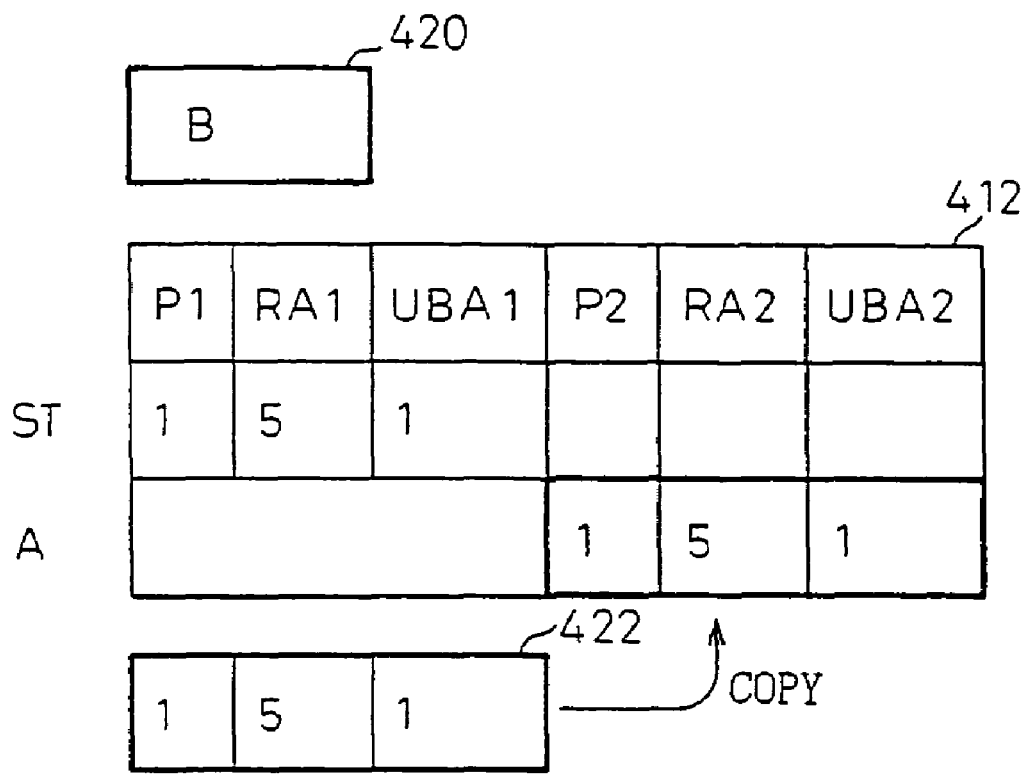
FIG. 56 is a view showing a data setting example at timing 3 of (b) of FIG. 53.
FIG. 57 is a view showing an example of a reservation station in a conventional example of (a) of FIG. 53.

FIGS. 54 through 56 cooperatively show transitions such as of contents within registers in the action according to the present invention of (b) of FIG. 53, in accordance with an instruction cycle sequence.

FIG. 54 shows a setting data example at the timing 1 of (b) of FIG. 53. At this timing 1, the update buffer address table and the register update pending table 411 are updated by the LOAD instruction (L 5,A). In this embodiment, there is allocated an update buffer 1 (P=1, UBA=1) for preserving the content which is fetched from the memory address A so as to update the general purpose register 5 (GR5).

At the timing 2 of FIG. 55, the memory address B of the STORE instruction (ST 5,B) is stored into the memory store address preserving means 420. Simultaneously therewith, the update buffer address table and the register update pending table 411 are looked up based on the general purpose register 5 of the STORE instruction, and the GR5 (UBA=1, P=1) preserving the update result by the LOAD instruction is stored into a STORE instruction entry and into the temporary storing means 422. Further, at the D cycle of the ADD instruction (A 6,B) in the same timing 2, the memory address B on the instruction register 410 is compared with the memory address B stored in the memory store address preserving means 420 by the comparator 421. In this example, the comparison result shows a coincidence, so that the coincidence signal ① is outputted.

At timing 3 of FIG. 56, the content (GR5; UBA=1, P=1) of the temporary storing means 422 is copied, by the output of the coincidence signal ①, into that area of the reservation station 412 which indicates a fetch data store destination of the ADD instruction entry. As a result, the content of the update buffer 1 preserving the operation result of the preceding STORE instruction (in case P=1) is forwarded, and the succeeding ADD instruction is immediately executed. In this way, the ADD instruction uses the general purpose register 5 or the register update buffer 1 preserving the result of the L instruction as source data, instead of fetch data from a memory, in this embodiment. Thus, before a preceding STORE instruction stores data into a memory, a succeeding instruction can start an operation using that data.

FIG. 57 shows an example of an ADD instruction entry in the reservation station 412 in the conventional example of (*a*) of FIG. 53, for comparison purpose.

As shown in FIG. 57, the above described forward processing according to the present invention is not performed at the timing 3, and an update buffer address (in this example, UBA2=2) for storing data to be fetched from the memory address B is designated for the update buffer (UB2). As such, the succeeding ADD instruction is started at the time when the storing by the preceding STORE instruction has been completed.

Figure 58:
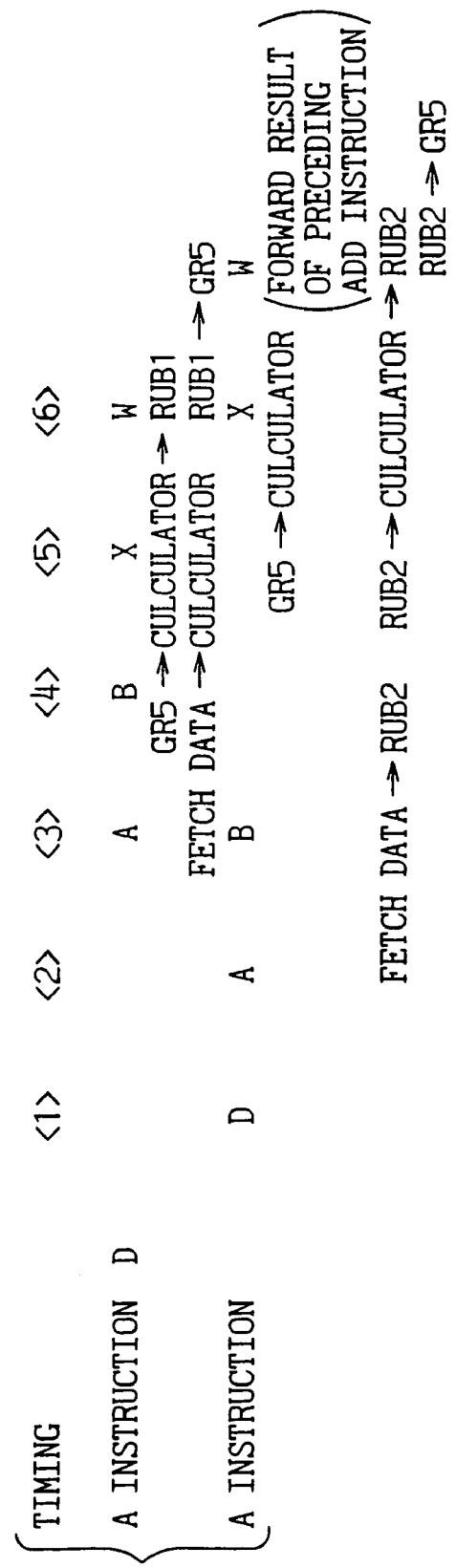
FIG. 58 is a view showing another example of action of an ADD instruction.

Meantime, FIG. 58 shows an example where a fetch data from a memory in a preceding ADD instruction is delayed than a fetch data of a succeeding ADD instruction.

Both ADD instructions in FIG. 58 add fetch data from a memory to a general purpose register GR5, and update the GR5 by the result of such an addition.

FIG. 59 shows an example of the reservation station 412 which is extended or enhanced so as to cope with the above situation.

In FIG. 59, there is provided a destination update buffer address (DUBA) for preserving a result of newly updated general purpose register. This will be described with reference to the register contents shown in FIG. 60 and FIG. 61, making use of the example of FIG. 58.

As shown in FIG. 60, at timing 1 of FIG. 58, the update buffer address table and the register update pending table 411 are looked up based on the decryption result of the preceding ADD instruction, and an update buffer 1 (RUB1) corresponding to the general purpose register 5 (GR5) is obtained. This update buffer 1 is allocated to a DUBA preserving the update result of the general purpose register 5.

Figure 61:
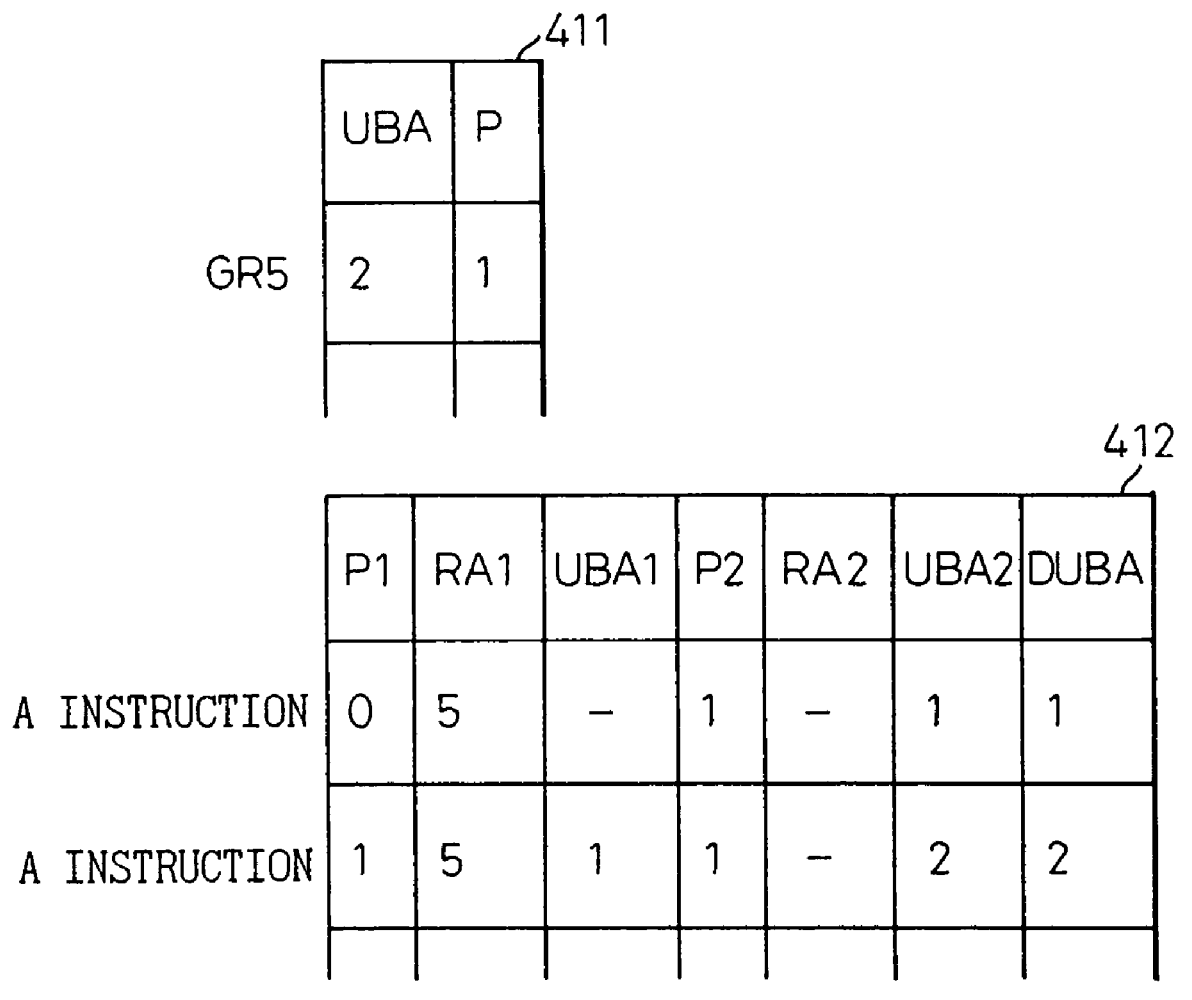

On the other hand as shown in FIG. 61, at the timing 2 of FIG. 58, the update buffer address table and the register update pending table 411 are looked up based on the decoding result of the succeeding ADD instruction, and the next update buffer 2 is allocated to the same general purpose register 5 (GR5). Further, similarly to the above, the DUBA is also allocated with the update buffer 2. Here, considering a situation that the fetch data of a preceding instruction is delayed more than fetch data of a succeeding instruction, fetch data from a memory is temporarily stored into the update buffer 2 designated by the DUBA. At the time when the data for the general purpose register will have been completely collected for the instruction, the data of the general purpose register and the update buffer are supplied to the operator.

Next, when the operation result of the preceding ADD instruction is outputted to the update buffer 1 designated by the DUBA (P1=1, UBA1=1), its forward processing is performed and a succeeding operation is started. Its operation result is stored into an update buffer 2 designated by the DUBA, and is written into the general purpose register 5 at the next W cycle.

However, in a machine for performing the above described operational action, if, after a STORE instruction which is a first instruction control action of this embodiment, a fetch action from the same memory address is executed, there will be caused such a situation that the calculation result from the operator and the fetch data from the memory are simultaneously written into the same update buffer.

Figure 62:
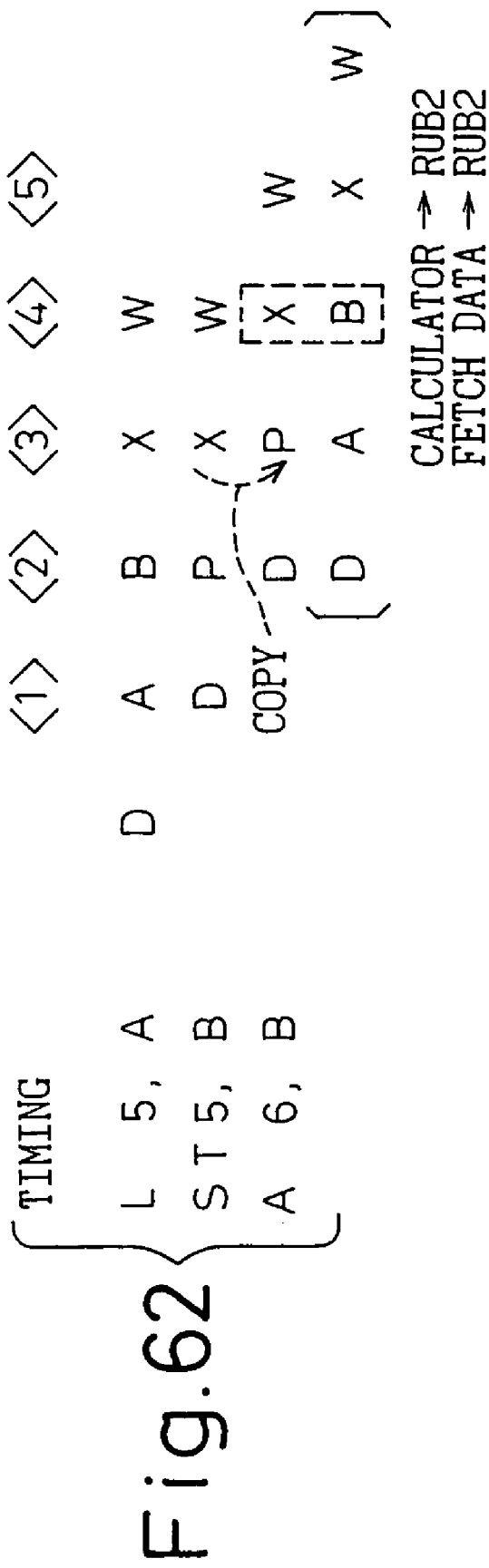
FIG. 62 is an explanatory view of simultaneous writing by a store fetch forwarding processing.

FIG. 62 shows an example thereof.

In FIG. 62, simultaneously with the time when the ADD instruction (A 6,B) utilizing the forward processing (store-fetch forwarding) according to this embodiment writes its calculation result into the update buffer 2 (RUB2) at an X cycle, fetch data of a succeeding memory operation instruction is written into the same update buffer 2 (RUB2) at a B cycle of the succeeding memory operation instruction.

As is apparent from the example of FIG. 57, update buffer 2 (RUB2) is allocated to the DUBA of a normal ADD instruction which does not perform store-fetch forwarding. AS such, the calculation result of an ADD instruction after copy processing of FIG. 56 is temporarily written into the update buffer 2 (operator RUB2). Meanwhile, as shown in the brackets of FIG. 62, a B cycle at the time of execution of a normal ADD instruction (fetch data RUB2) coincides with the X cycle at the time of store-fetch forwarding processing. As a result, only when the store-fetch forwarding processing according to this embodiment is performed, there occur two simultaneous writing processings into the same update buffer (RUB2 in this embodiment).

Figure 63:
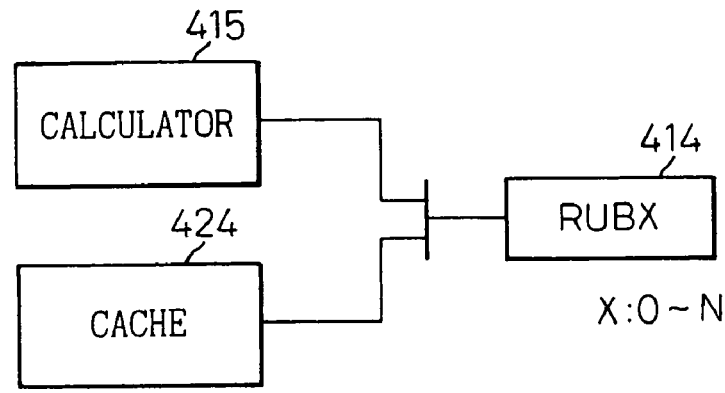
FIG. 63 is an action explanatory view (1) of update buffer address holding means.
Figure 64:
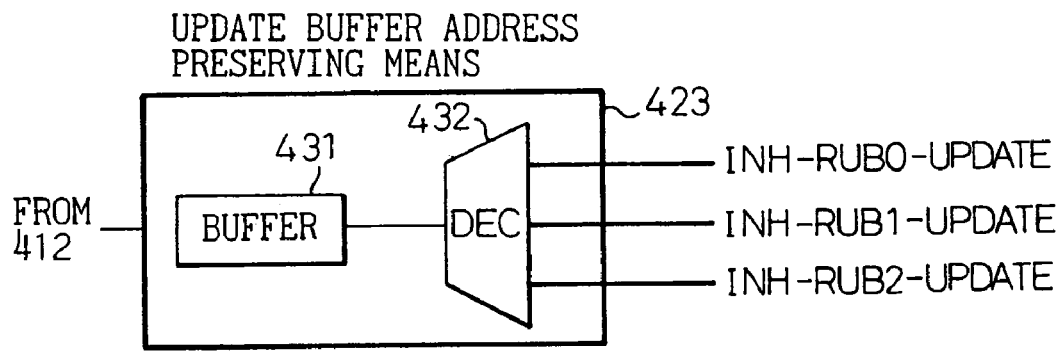
FIG. 64 is an action explanatory view (2) of update buffer address holding means.
Figure 65:
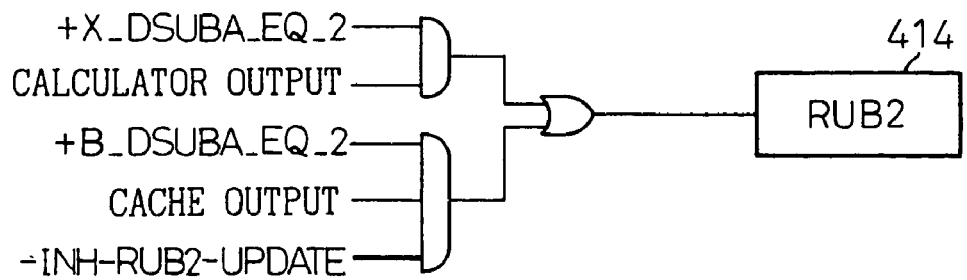
FIG. 65 is an action explanatory view (3) of update buffer address holding means.

FIGS. 63 through 65 are explanatory views of the update buffer address preserving means 423 for avoiding the above described two simultaneous writings.

FIG. 63 shows a general constitutional example for selecting one of the operator 415 and data cache 424, to thereby store the selected one into the update buffer X (RUBX: X=0 to n) 414. Speaking in FIG. 62, calculation result of ADD instruction or memory fetch data is written into the update buffer 2.

FIG. 64 shows a constitutional example of the update buffer address preserving means 423. As described above, at a timing just before a data store destination information of a STORE instruction is copied to a succeeding ADD instruction on the reservation station 412, the content of DUBA of the ADD instruction is preserved into a buffer 431. The content of the buffer 431 is decoded by a decoder 432, and there is outputted a flag signal (INH_RUBX_UPDATE) for inhibiting an update processing of an update buffer X by memory fetch data from the data cache 424 of the two writing processings which simultaneously occur upon the above described store-fetch forwarding processing.

As shown in FIG. 65, the flag signal gates an output of the cache side, to thereby inhibit an update of the update buffer 2 by the memory fetch data. Here, +X_DSUBA_EQ_2 signal is an enable signal of the update buffer 2 at the X cycle, and +B_DSUBA_EQ_2 signal is an enable signal of the update buffer 2 at the B cycle. As a result, the update buffer 2 is stored with only an operator output, and that fetch data from the cache 424 which becomes unnecessary due to the forward processing is not used, here, only the update buffer 2 is shown, but identical circuits are provided for update buffers X, respectively, and they operate identically.

Figure 66:
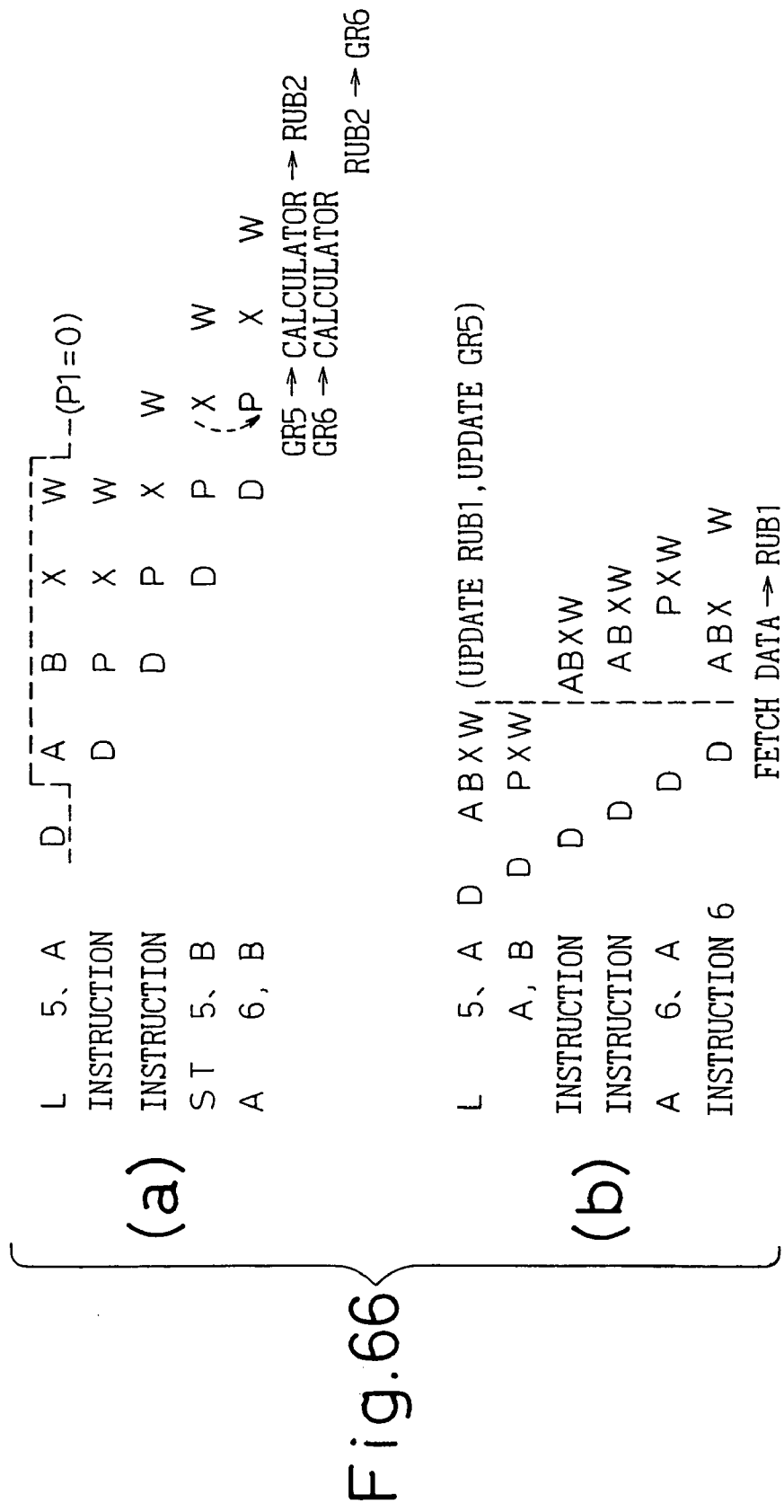
FIG. 66 is a view showing another calculation example using a STORE instruction.

FIG. 66 shows another example of operation sequence using a memory STORE instruction.

In (*a*), a P bit of the STORE instruction (ST 5,B) on the reservation station 412 is turned OFF (P1=1) at the W cycle of the LOAD instruction (L 5,A). This means that a correct value is preserved in the general purpose register 5, and in this case, the forward processing of memory fetch data in the succeeding ADD instruction (A 6,B) is performed not from an update buffer but from the general purpose register 5.

Concerning an instruction which stores a content of a general purpose register like this example, the forward processing instead of fetch of memory data as described above can be executed without any inconsistency. Here, "instruction" means a general instruction having a sequence of DPXW. By the way, STORE instructions include one which adds a memory data to another memory data, and stores the sum into a memory.

(*b*) shows an example of such an instruction. In this case, data to be forwarded exists only within an update buffer. Thus, in trying to forward the data at the timing after the W cycle of the preceding instruction shown in (*a*), normal operation may not be obtained.

(*b*) shows a situation where, in total, five update buffers are actually mounted. Here, the LOAD instruction (L 5,A) uses an update buffer 1 so as to preserve update data of the general purpose register 5, and stores the content of the update buffer 1 into the general purpose register 5 at W cycle. As a result, succeeding instruction 6 is permitted to use the update buffer 1. By the way, a STORE instruction (AP A,B in this example) to be executed after a LOAD instruction does not use a general purpose register as a source, but uses the as-stored content of the update buffer 1 as a source.

A succeeding ADD instruction (A 6,B) forwards the content of the update buffer 1 instead of reading out the content of the memory address A according to the present invention. However, in this example, the instruction 6, which was permitted to use the update buffer 1, has already rewritten the content of the update buffer 1 to fetch data at the B cycle. As such, the result to be obtained by an X cycle of an ADD instruction to be executed thereafter is in error.

Figure 67:
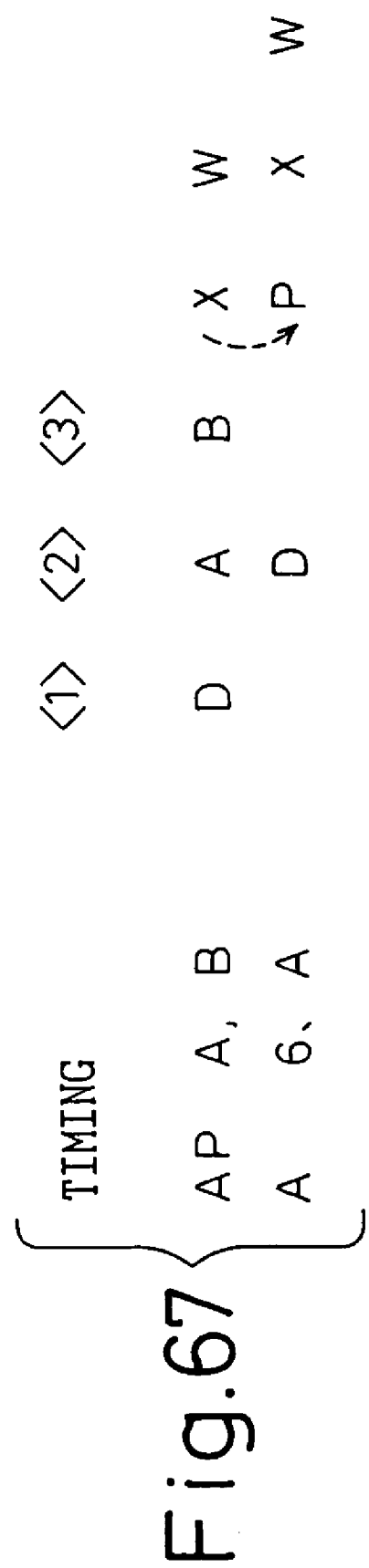
FIG. 67 is a view showing an example of a second instruction control action (an inter-memory-memory instruction)

FIG. 67 shows an example of a second instruction control action (an inter-memory-memory operational instruction) according to this example.

FIG. 67 shows a situation where AP instruction is used as an example of a memory operation instruction which does not use a general purpose register. AP instruction is to add a content of memory A and a content of memory B, and stores the result into the memory A. Here, it is possible to use up to five update buffers X, X=1 to 5, for updating general purpose register, and update buffer 6 is allocated as an update buffer dedicated to an AP instruction.

Figure 68:
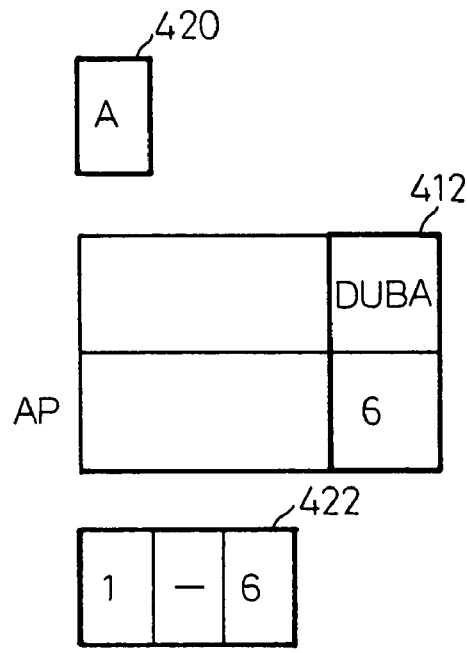
FIG. 68 is a view showing a data setting example at timing 2 of FIG. 67.
Figure 69:
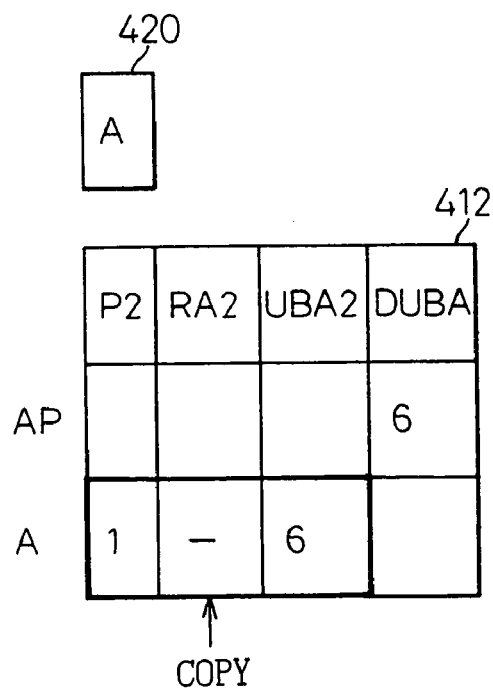
FIG. 69 is a view showing a data setting example at timing 3 of FIG. 67.

FIG. 68 and FIG. 69 show data setting examples at timing 2 and timing 3 in FIG. 67, respectively.

In FIG. 68, when an AP instruction (AP A,B) is decoded at the instruction register 410, the memory address part A of the data store destination is stored into the memory store address preserving means 420. On the other hand, as fetch destination of memory address B to be added thereto, the update buffer 6 dedicated to an AP instruction is allocated. It is stored in DUBA of an AP instruction operand on the reservation station 412, and simultaneously stored in the temporary storing means 422. Note, since the AP instruction in this example does not use general purpose register, the update buffer address table and the register update pending table 411 are not looked up.

In FIG. 69, the memory address part A in a succeeding ADD instruction (A 6,A) decoded by the instruction register 410, and the preceding memory address A preserved by the memory store address preserving means 420, are compared with each other by the comparator 421. Since they coincide with each other in this example, the content stored in the temporary storing means 422 is copied to a corresponding operand on the reservation station 412 by the coincidence signal. The action thereafter is identical with the first instruction control action according to this embodiment.

Nonetheless, the data for fetch data forwarding of the ADD instruction is still preserved even at the time when the AP instruction is completed, and the P2 bit is not reset. As a result, forward processing of fetch data is possible making use of the update buffer 6 dedicated to an AP instruction, from any timing. In case that a succeeding AP instruction is to be newly executed before the ADD instruction performs its forward processing, decoding of the succeeding AP instruction is suspended until such a forward processing is completed.

According to the constitution according to the present invention as described above, there is allocated an AP instruction dedicated update buffer which preserves a source data used to be stored into a predetermined memory address in an AP instruction as a preceding instruction. Thus, the succeeding memory operation instruction, which is inherently an inter-register-memory instruction, is also substituted by an inter-register-register instruction here, so that a high speed pipeline operation is permitted by the forward processing using the update buffer 6 dedicated to an AP instruction. In this way, according to this embodiment, it becomes possible to effectively realize a store-fetch forwarding function also concerning a memory operation instruction, in an information processor which performs register renaming.

According to the present invention as described above, it becomes possible to provide an instruction control device which is rendered to have a totally and remarkably high performance in that the device is improved such that: (i) constitution of high speed reservation station is permitted by a minimum amount of components; (ii) high-speed operation execution of a LOAD instruction following a STORE instruction is permitted; (iii) it becomes possible to commonly use input and output registers and to minimize a delay between operational processings the numbers of cycles required for operations of which are different from each other, to thereby perform a pipeline processing at high speed; and (iv) it becomes possible to effectively realize a store-fetch forwarding function also concerning a memory operation instruction in an information processor which performs register renaming.

The invention claimed is:

1. An instruction control device comprising:
   an instruction issuance control part for performing an issuance control for an OPCODE part of a decoded instruction, a source operand of which is brought to be useable, in a reservation station for storing a plurality of decoded instructions; and
   an operation pipeline controlling part receiving a preceding instruction issued by said instruction issuance control part and, by decoding said preceding instruction in every operation cycle, generating an update timing signal of source operand usability information for a succeeding instruction and a plurality of issuance inhibition signals for inhibiting issuance of a succeeding instruction corresponding to a type of said preceding instruction issued, and
   wherein each of said plurality of issuance inhibition signals inhibits issuance of said succeeding instruction over a particular operation cycle or cycles of said preceding instruction determined in advance according to a type of said succeeding instruction, and
   wherein said instruction issuance control part duly controls timing of an issuance of said succeeding instruction in accordance with said update timing signal and one of said issuance inhibition signals from said operation pipeline controlling part, said one of said inhibition signals being selected based on a type of said succeeding instruction.

2. An instruction control device of claim 1, wherein said instruction issuance control part includes:
   a source operand useable indication parthaving a table indicating a source operand usability information of an instruction supplied from said reservation station, referring to said table and outputting a useable/unusable information of a source register;
   an instruction issuance inhibition controlling part outputting an issuable/inhibition information of the instruction supplied from said reservation station; and
   an instruction issuing part issuing an instruction to an operator when said instruction issuing part is supplied with a usage allowance information from said source operand useable indication part and supplied with an issuance allowance information of an operation code from said instruction issuance inhibition controlling part.

3. An instruction control device of claim 2, wherein said source operand usability information is updated by said update timing signal, and output of timing of said issuable/inhibition information of said operation code is controlled by said issuance inhibition signal.

4. An instruction control device of claim 1, wherein said operation pipeline controlling part includes:
   a group of registers storing issued instructions corresponding to respective instruction cycles; and
   decoders provided for respective registers of said group of registers, each of said decoders duly generating an update timing signal and/or an issuance inhibition signal corresponding to a type of said issued instructions.

5. An instruction control device comprising:
storing usabilities of source operands indicative of corresponding times of said operands;
issuing instructions from a reservation station to be executed at corresponding times indicated in said usabilities of the operands; and
validating said operands at said corresponding times indicated for operators based on a type of operation to be performed and performing parallel operations using the operators by inhibiting issuances of instructions using operators that have a common output register and operating at different operation cycles, where said inhibiting over an operation cycle is determined in advance according to a type of a succeeding instruction.

* * * * *

UNITED STATES PATENT AND TRADEMARK OFFICE
CERTIFICATE OF CORRECTION

PATENT NO. : 7,313,674 B2 Page 1 of 1
APPLICATION NO. : 10/747291
DATED : December 25, 2007
INVENTOR(S) : Takeo Asakawa It is certified that error appears in the above-identified patent and that said Letters Patent is hereby corrected as shown below:

Column 27, Line 7, change "parthaving" to --part having--.

Signed and Sealed this

Twenty-ninth Day of July, 2008

JON W. DUDAS
*Director of the United States Patent and Trademark Office*